United States Patent
Iwano

(10) Patent No.: US 7,130,525 B1
(45) Date of Patent: Oct. 31, 2006

(54) METHOD OF DETERMINING ACCESS POSITION ON RECORDING MEDIUM AND METHOD OF MANAGING RECORDING MEDIUM

(75) Inventor: Yuri Iwano, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1203 days.

(21) Appl. No.: 09/980,802

(22) PCT Filed: Jul. 28, 2000

(86) PCT No.: PCT/JP00/05116

§ 371 (c)(1),
(2), (4) Date: Jan. 18, 2002

(87) PCT Pub. No.: WO01/10119

PCT Pub. Date: Feb. 8, 2001

(30) Foreign Application Priority Data

Jul. 29, 1999 (JP) .................................. 11/214980

(51) Int. Cl.
*H04N 5/93* (2006.01)
*H04N 5/91* (2006.01)

(52) U.S. Cl. .......................................... 386/53; 386/95

(58) Field of Classification Search ...................... None
See application file for complete search history.

(56) References Cited

U.S. PATENT DOCUMENTS

| | | | |
|---|---|---|---|
| 4,947,265 A | 8/1990 | Hayashi et al. | |
| 6,330,394 B1 | 12/2001 | Itoi | |
| 6,370,209 B1 * | 4/2002 | Zeller et al. | 375/343 |
| 6,782,189 B1 * | 8/2004 | Ando et al. | 386/68 |
| 6,954,584 B1 * | 10/2005 | Kashiwagi et al. | 386/105 |
| 7,054,543 B1 * | 5/2006 | Ando et al. | 386/95 |

FOREIGN PATENT DOCUMENTS

| | | |
|---|---|---|
| CN | 1144962 A | 3/1997 |
| EP | 0 903 738 A | 3/1999 |
| EP | 0 924 704 A2 | 6/1999 |
| JP | 7-170488 A | 7/1995 |
| JP | 9-259573 A | 10/1995 |
| JP | 08-045249 | 2/1996 |
| JP | 9-219838 A | 8/1997 |
| JP | 11-144378 A | 5/1999 |
| JP | 11-155130 | 6/1999 |
| JP | 11 312368 A | 11/1999 |

\* cited by examiner

*Primary Examiner*—Thai Tran
*Assistant Examiner*—Heather R. Jones
(74) *Attorney, Agent, or Firm*—Birch, Stewart, Kolasch & Birch, LLP

(57) ABSTRACT

A management system for a recording medium recorded with a multimedia data stream wherein in a first data made up of video and sound, an amount of data for a predetermined playback period is managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the second unit (VU) on the recording medium is held as management information for every second unit, so that the positional information of the first unit (EU) on the recording medium is calculated based on the positional information of the second unit (VU) on the recording medium.

33 Claims, 54 Drawing Sheets

FIG. 5

EUS Information

| BP | Length | Field Name | Content |
|---|---|---|---|
| 0 | 4 | EUSI ID | Object ID |
| 4 | 4 | EUSI Size | Uint32 |
| 8 | 23 | Title Text | String[23] |
| 31 | 1 | Character Code | Uint8 |
| 32 | 6 | Time Stamp-Creation | RT Format |
| 44 | 6 | Time Stamp-Modification | RT Format |
| 50 | 10 | Text Information | Uint80 |
| 60 | 10 | Thumbnail Information | Uint80 |
| 70 | 2 | Data File ID | Uint16 |
| 72 | 4 | Data File Size | Uint32 |
| 76 | 4 | Start PT | PT Format |
| 80 | 4 | End PT | PT Format |
| 84 | 2 | EUS Property | Uint16 |
| 86 | 2 | Video Property | Uint16 |
| 88 | 4 | Camera Propety | Uint32 |
| 92 | 2 | Audio Propety(Original) | Uint16 |
| 94 | 2 | Post Recording Unit Size | Uint16 |
| 96 | 2 | Post Recording Property | Uint16 |
| 98 | 64 | Source Information | - |
| 162 | 64 | Copyright Information | - |
| 226 | 2 | Number of Still Pictures | Uint16 |
| 228 | - | Still Picture Information | - |
| - | - | Address LUT | - |
| - | - | Reference Information | - |

FIG. 6

Program Information

| BP | Length | Field Name | Content |
|----|--------|------------|---------|
| 0 | 4 | Program ID | Object ID |
| 4 | 4 | Program Size | Uint32 |
| 8 | 23 | Title Text | String[23] |
| 31 | 1 | Character Code | Uint8 |
| 32 | 6 | Time Stamp-Creation | RT Format |
| 44 | 6 | Time Stamp-Modification | RT Format |
| 50 | 10 | Text Information | Uint80 |
| 60 | 10 | Thumbnail Information | Uint80 |
| 70 | 4 | Number of EUS Stream Info | Uint32(=NOES) |
| 74 | n*NOES | EUS Stream Information | |

FIG. 7

EUS Stream Information

| BP | Length | Field Name | Content |
|----|--------|------------|---------|
| 0 | 4 | Referenced EUSI ID | Object ID |
| 4 | 4 | Start PT | PT Format |
| 8 | 4 | End PT | PT Format |
| 12 | 10 | Text Information | Uint80 |
| 22 | 10 | Thumbnail Information | Uint80 |

FIG. 12

Address LUT

| BP | Length | Field Name | Content |
|---|---|---|---|
| 0 | 4 | Address Offset | Uint32 |
| 4 | 4 | PB Time of EU | PT Format |
| 8 | 4 | PB Time of VU | PT Format |
| 12 | 4 | Number of PRU Information | Uint32(=NOPI) |
| 16 | 4 | Number of VU Information | Uint32(=NOVI) |
| 20 | 4*NOPI | PRU Information | |
| - | n*NOVI | VU Information | |

FIG. 13

PRU Information

| BP | Length | Field Name | Content |
|---|---|---|---|
| 0 | 3 | RLBN of PRU | Uint24 |
| 3 | 1 | PRU Status | Uint8 |

FIG. 14

PRU Status

| Bit | Field Name | Content |
|---|---|---|
| 0 | PR Existence | ZERO or ONE |
| 1-7 | Reserved | ZERO |

FIG. 15

VU Information (Case1)

(a)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8 (=NOIP) |
| 5 | 2*NOIP | End RLBN of IP Pictures | Uint16 |

VU Information (Case2)

(b)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8 (=NOIP) |
| 5 | 4*NOIP | RLBN of IP Pictures | Uint32 |

FIG. 16

VU Status (Case1)

(a)

| Bit | Field Name | Content |
|---|---|---|
| 0 | PR Existence | ZERO or ONE |
| 1 | Closed GOP | ZERO or ONE |
| 2-7 | Reserved | ZERO |

VU Status (Case2)

(b)

| Bit | Field Name | Content |
|---|---|---|
| 0 | PR Existence | ZERO or ONE |
| 1 | Closed GOP | ZERO or ONE |
| 2 | Non Contiguous Point | ZERO or ONE |
| 3-7 | Reserved | ZERO |

FIG. 22

Address LUT

| BP | Length | Field Name | Content |
|---|---|---|---|
| 0 | 4 | Address Offset | Uint32 |
| 4 | 4 | PB Time of EU | PT Format |
| 8 | 4 | PB Time of VU | PT Format |
| 12 | 4 | Number of EU Information | Uint32(=NOPI) |
| 16 | 4 | Number of VU Information | Uint32(=NOVI) |
| 20 | 4*NOPI | EU Information | |
| – | n*NOVI | VU Information | |

FIG. 23

EU Information

| BP | Length | Field Name | Content |
|---|---|---|---|
| 0 | 3 | RLBN of EU | Uint24 |
| 3 | 1 | EU Status | Uint8 |

FIG. 24

(a) EU Status (Case1)

| Bit | Field Name | Content |
|---|---|---|
| 0-4 | PRU Position | ZERO or ONE |
| 5 | PR Existence | ZERO or ONE |
| 6-7 | Reserved | ZERO |

(b) EU Status (Case1)

| Bit | Field Name | Content |
|---|---|---|
| 0-4 | PRU Position | ZERO or ONE |
| 5 | PR Existence | ZERO or ONE |
| 6 | Non Contiguous Point | ZERO or ONE |
| 7 | Reserved | ZERO |

FIG. 25

VU Information (Case1)

(a)
| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8(=NOIP) |
| 5 | 2*NOIP | End RLBN of IP Pictures | Uint16 |

VU Information (Case2)

(b)
| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8(=NOIP) |
| 5 | 4*NOIP | RLBN of IP Pictures | Uint32 |

FIG. 26

VU Status

| Bit | Field Name | Content |
|---|---|---|
| 0 | PR Existence | ZERO or ONE |
| 1 | Closed GOP | ZERO or ONE |
| 2-7 | Reserved | ZERO |

FIG. 33

Address LUT

| BP | Length | Field Name | Content |
|---|---|---|---|
| 0 | 4 | Address Offset | Uint32 |
| 4 | 4 | PB Time of EU | PT Format |
| 8 | 4 | PB Time of VU | PT Format |
| 12 | 4 | Number of VU Information | Uint32(=NOVI) |
| 16 | n*NOVI | VU Information | |

FIG. 34

VU Information (Case1)

(a)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8(=NOIP) |
| 5 | 2*NOIP | End RLBN of IP Pictures | Uint16 |

VU Information (Case2)

(b)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8(=NOIP) |
| 5 | 4*NOIP | RLBN of IP Pictures | Uint32 |

FIG. 35

VU Status(Case1)

(a)

| Bit | Field Name | Content |
|---|---|---|
| 0-4 | PRU Position | Number of LBs |
| 5 | PR Existence | ZERO or ONE |
| 6 | Closed GOP | ZERO or ONE |
| 7 | Reserved | ZERO |

VU Status(Case2)

(b)

| Bit | Field Name | Content |
|---|---|---|
| 0-4 | PRU Position | Number of LBs |
| 5 | PR Existence | ZERO or ONE |
| 6 | Closed GOP | ZERO or ONE |
| 7 | Non Contiguos Point | ZERO or ONE |

FIG. 51

EUS Information

| BP | Length | Field Name | Content |
|---|---|---|---|
| 0 | 4 | EUSI ID | Object ID |
| 4 | 4 | EUSI Size | Uint32 |
| 8 | 23 | Title Text | String[23] |
| 31 | 1 | Character Code | Uint8 |
| 32 | 6 | Time Stamp-Creation | RT Format |
| 44 | 6 | Time Stamp-Modification | RT Format |
| 50 | 10 | Text Information | Uint80 |
| 60 | 10 | Thumbnail Information | Uint80 |
| 70 | 2 | Data File ID | Uint16 |
| 72 | 4 | Data File Size | Uint32 |
| 76 | 2 | PRS File ID | Uint16 |
| 78 | 4 | PRS File Size | Uint32 |
| 82 | 4 | Start PT | PT Format |
| 86 | 4 | End PT | PT Format |
| 90 | 2 | EUS Property | Uint16 |
| 92 | 2 | Video Property | Uint16 |
| 94 | 4 | Camera Propety | Uint32 |
| 98 | 2 | Audio Propety(Original) | Uint16 |
| 100 | 2 | Post Recording Unit Size | Uint16 |
| 102 | 2 | Post Recording Property | Uint16 |
| 104 | 64 | Source Information | – |
| 168 | 64 | Copyright Information | – |
| 132 | 2 | Number of Still Pictures | Uint16 |
| 134 | – | Still Picture Information | – |
| – | – | Address LUT | – |
| – | – | Reference Information | – |

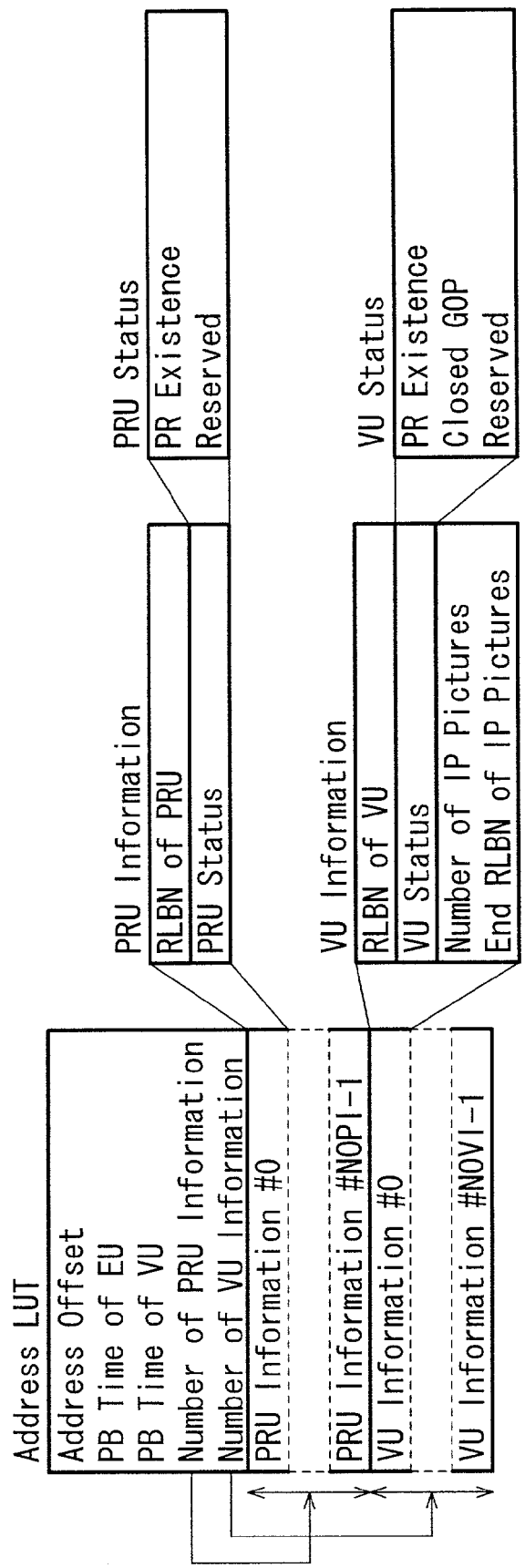

FIG. 53

Address LUT

| BP | Length | Field Name | Content |
|---|---|---|---|
| 0 | 4 | Address Offset | Uint32 |
| 4 | 4 | PB Time of EU | PT Format |
| 8 | 4 | PB Time of VU | PT Format |
| 12 | 4 | Number of PRU Information | Uint32(=NOPI) |
| 16 | 4 | Number of VU Information | Uint32(=NOVI) |
| 20 | 4*NOPI | PRU Information | |
| - | n*NOVI | VU Information | |

FIG. 54

PRU Information

| BP | Length | Field Name | Content |
|---|---|---|---|
| 0 | 3 | RLBN of PRU | Uint24 |
| 3 | 1 | PRU Status | Uint8 |

FIG. 55

PRU Status

| Bit | Field Name | Content |
|---|---|---|
| 0 | PR Existence | ZERO or ONE |
| 1-7 | Reserved | ZERO |

FIG. 56

VU Information (Case1)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8 (=NOIP) |
| 5 | 2*NOIP | End RLBN of IP Pictures | Uint16 |

(a)

VU Information (Case2)

| BP | Length | Field Name | Content |
|---|---|---|---|
| 0 | 3 | RLBN of VU | Uint24 |
| 3 | 1 | VU Status | Uint8 |
| 4 | 1 | Number of IP Pictures | Uint8 (=NOIP) |
| 5 | 4*NOIP | RLBN of IP Pictures | Uint32 |

VU Status (Case1)

| Bit | Field Name | Content |
|---|---|---|
| 0 | PR Existence | ZERO or ONE |
| 1 | Closed GOP | ZERO or ONE |
| 2-7 | Reserved | ZERO |

(a)

VU Status (Case2)

| Bit | Field Name | Content |
|---|---|---|
| 0 | PR Existence | ZERO or ONE |
| 1 | Closed GOP | ZERO or ONE |
| 2 | Non Contiguous Point | ZERO or ONE |
| 3-7 | Reserved | ZERO |

(b)

METHOD OF DETERMINING ACCESS POSITION ON RECORDING MEDIUM AND METHOD OF MANAGING RECORDING MEDIUM

This application is the national phase under 35 U.S.C. § 371 of PCT International Application No. PCT/JP00/05116 which has an International filing date of Jul. 28, 2000, which designated the United States of America.

TECHNICAL FIELD

The present invention relates to a recording media management system for managing a recording medium such as a disk or the like on which variable-length coded data such as MPEG data has been recorded, or specifically relates to a method of locating access positions in a recording medium and a managing device of the recording medium.

BACKGROUND ART

With the recent development of multimedia, demands for recording various types of multimedia data such as movie pictures, music, still pictures, onto recording media have increased. Among such recording media, tape media such as video tape and audio tape were widely accepted in the past, but in recent years, disk media such as hard disks, magnetic disks and the like have become prevalent to store data.

Tape media are recording media with which recording and reproduction of data is performed sequentially from the top of the tape, i.e., by sequential access, so that they are poor in random accessibility. For example, if with a video tape, playback from a specified position is wanted, the tape needs to be advanced by fast-forward or rewound by the rewind function to adjust the designated position before reproduction.

If some index information indicating the target position has been set beforehand, the access can be implemented by simply searching the index but still needs the physical operation of moving the tape to the target position. If no index information is provided, it is necessary to locate the target position by implementing fast-forward whilst playing back in order to locate the target position, or it is necessary to implement approximate fast-forward adjustment using guesswork and final location of the target by playing back in order to obtain access to the target position. In the above way, tape media, if they are used, are not suitable to random access because they need physical tape movement.

In contrast, disk media are excellent in random accessibility, and the access time to an arbitrary location is negligible compared to that of tape media. That is, wherever data is on the disk, it is possible to have an access instantaneously.

As typical utility examples of disk media, MD is known for audio and DVD is known for video, these are widely spread because of their random accessibility.

Now, a case where video data encoded by the MPEG format is recorded on to a disk will be described. For recording video data onto a disk or for transmitting it via a transmission line, it is not practical if the video data is directly transmitted without being compressed because the amount of data is too bulky. Therefore, it is necessary to compress video data to reduce the amount of data by using the MPEG technique or the like.

In the MPEG technique, in compressing the amount of data, the variable-length coding technique is used. Specifically, video data is efficiently reduced in its amount using three types of image compression, namely the intraframe coding picture(I-picture) which is encoded independently using the data within that video frame, the interframe forward predictive coding picture(P-picture) which is encoded based on the information of the previous frame and the bi-directional predictive coding picture(B-picture) which is encoded based on the previous and subsequent frames.

Of these encoded pictures, the compression ratios become higher in the following order, I-picture, P-picture and B-picture. Therefore, depending on the encoding picture type, the amount of data for one frame of video differs from that of another while the amount of data also differs depending on the content of the original video data. For example, if video data has less motion, the P-picture and B-picture little differ from the associated I-picture so that the data can be compressed markedly efficiently.

Illustratively, the amounts of data for individual frames of video data are different as shown in the recording sequence (on the disk) in FIG. 64, and there is no means by which it is possible to compute the amount of data of each frame of MPEG data which has been once encoded, without implementing actual decoding of the MPEG data.

In the case where MPEG data which has been variable-length coded is recorded, the amounts of data for individual frames are different, therefore, it is impossible to grasp where MPEG data corresponding to each frame has been recorded on the disk until the recorded MPEG data is read out from the start of data and decoded sequentially.

In other words, if reproduction is wanted to start from an arbitrary point in the recorded MPEG data, the data cannot be played back from such a partway point because the position on the disk where the MPEG data, which corresponds to the frame from where the start of playback is wanted, has been recorded cannot be known.

Therefore, in order to play back the MPED data recorded on the disk from an arbitrary point, or in order to implement special playback using arbitrary frames, it is necessary to obtain management information for managing the data record positions on the disk corresponding to individual frames. Using this management information, it becomes possible to refer to the recorded location of an tributary frame on the disk.

Also, as stated already, MPEG data is efficiently reduced in amount of data by using three types of image compression, namely the intraframe coding picture (I-picture), interframe forward predictive coding picture (P-picture) and bi-directional predictive coding picture(B-picture). Since the P-picture and B-picture is generated based on the associated I-picture, it is impossible to decode that data only.

No problem will occur when MPEG data is decoded and played back serially from the front, but when MPEG data is played back from a frame partway in the data or when special playback by picking up arbitrary frames is implemented, the following problem occurs. That is, if the frame from which the start of playback is wanted is a P-picture or B-picture, it is impossible to decode the frame without the I-picture and/or P-picture data based on which the frame in question has been constructed.

To deal with such a situation, the MPEG scheme has a structure called GOP (Group of Pictures) made up of a number of frames. This GOP structure is featured by inclusion of at least one I-picture in one GOP.

Accordingly, if each GOP structure is assumed to be the access unit, the GOP necessarily includes the I-picture based on which P-pictures and B-pictures have been constructed, so that decoding of the target frame can be assured.

In this way, for realizing random access to MPEG data, the access should be made to each GOP structure by assuming it to be a unit. For example, even when the start of playback is wanted from a frame partway within a GOP structure, the control of the playback should be performed such that the whole data of the GOP is decoded first, then actual display may be started from the target frame. This produces the same result as if playback were merely started from target frame.

As described above, in order to start playback from an arbitrary frame within MPEG data, it is necessary to at least have positional information on the disk of the GOP that includes target frame, instead of positional information on the disk of each frame.

That is, in the case where positional information of all the frames is given as management information, if the data of the frame from which the start of playback is wanted is a B-picture or P-picture, the frame of data from which the start of playback is wanted has little meaning because the data cannot be decoded unless the data of the I-picture used as the reference.

On the other hand, for a case of special playback such as fast-playback in which only I-pictures and P-pictures are reproduced, the positional information of I-pictures and P-pictures on the disk is needed.

As one prior art for recording MPEG data onto disk media, there is the read-only type DVD. In DVD, video data constituting one GOP and audio data associated with it are multiplexed with a piece of management information called a NV (Navigation) pack added to the front of the data.

Use of NV packs as the information for implementing special playback makes it possible to grasp the positions at which the next and previous NV packs have been recorded on the disk, with respect to the site being currently played back.

Japanese Patent Application Laid-Open Hei 11 No.155130 discloses an example of the address management information when MPEG data is recorded into rewritable media. According to this disclosure, the address management information is configured of time map information including a VOBU (Video Object Unit) map presenting the address of each VOBU as one management unit in the MPEG scheme in association with time information, address information offering the addresses of the VOBUs to be reproduced at intervals of a fixed time period and identification information for identifying each VOBU.

Usually, in rewritable recording media, since some MPEG streams may be deleted or moved on the disk, the management information or the like could be changed disorderedly. In the case where the management information is changed disorderedly, the system response will be improved if the management information can be read or written by a single access.

However, for the aforementioned DVD, management information is constructed on the assumption of ROM media, the management information is multiplexed within the MPEG stream every NV pack so it is scattered in pieces on the disk. Accordingly, to update the management information, it is necessary to make accesses to pieces of the management information scattered on the disk, one by one, which is unfeasible.

Further, an access to the MPEG stream assumed to be made in the above disclosure described in Japanese Patent Application Laid-Open Hei 11 No.155130 is implemented by unitwise—VOBU random access. In this case, the number of video frames to be managed by a single VOBU is variable.

In other words, the playback time corresponding to one VOBU is variable, so that when a certain frame is tried to be designated by time information, a search of the VOBU including that frame wanted to be reproduced cannot be made by a simple calculation. In this case, it is necessary to locate the VOBU by checking the playback period of time of each VOBU one by one sequentially from the front VOBU, for example.

When the target VOBU is located within a short distance from the front VOBU, it does not take much time for searching, but when the target is located some distance from the front, it takes much time to search it. To deal with this, in this disclosure of Japanese Patent Application Laid-Open Hei 11 No.155130, other than the VOBU map information for managing addresses of all VOBUs and time information, the time map information indicating VOBUs corresponding to the addresses of the VOBUs to be reproduced at intervals of a fixed period of time is used.

That is, for searching the VOBU containing a target video frame, the time map information should be referred to first before access to the VOBU information is made. Further, the VOBU map information searched based on the time map information does not always hit the VOBU containing the target video frame, VOBU information following the searched VOBU information needs to be searched serially until the target VOBU is found.

As above, since in the prior art, to search the target video frame, a rough search is made first using the time map reference information then an exact search is performed using the VOBU information to thereby identify the corresponding address on the disk, the prior art has the problem of such complicated process being needed.

Moreover, when post recording such as audio dubbing, superimposition of images, etc., is added, post recording units(PRUs) for securing areas for this post recording information within the MPEG stream or separately outside the stream need to be defined in the stream. However, the above described prior art cannot deal with such streams.

The present invention has been devised in view of what has been discussed above, and it is therefore an object of the present invention to provide a recording media management system, including the method of locating access positions in a recording medium and managing device of the recording medium, which is able to determine the address of a target video frame in a simple manner and is adapted to deal with streams having PRUs defined therein.

DISCLOSURE OF INVENTION

In order to solve the above problem the present invention is configured as follows:

The first aspect of the present invention resides in a data access position locating method for locating access positions in a data recording medium in which a data sequence of a continuous recording period in a first data stream having video data is managed as a base unit of data, the method comprising the steps of: based on presentation time information as to a specified piece of video data and reference time information related to reference position information of a target base unit of data, determining a relative time from the reference time information to the presentation time information; identifying a target subunit of data including the specified piece of video data by operation based on the relative time as to the specified piece of video data and a playback time of a subunit of data; and identifying start position information of the target subunit of data from relative distance information stored beforehand in a management information area, wherein the base unit of data comprises a plurality of subunits of data, each having an identical playback time within a single base unit of data, and for each of the base units of data, reference position information that is the start position information of the base unit of data and relative distance information from the reference position information to start position information of each of the subunits of data in the base unit of data are stored beforehand in the management information area of a recording medium.

According to the first aspect of the present invention, in a multimedia data stream, the positional information of an arbitrary frame on the recording medium can be easily obtained without the necessity of complex calculation.

The second aspect of the present invention resides in the data access position locating method defined in the first aspect, wherein the subunit of data is a first unit of data that is an independently editable minimum unit of data.

According to the second aspect of the present invention, in a multimedia data stream, the positional information of a first unit of data, which is the minimum editable unit for an arbitrary frame, on the recording medium can be easily obtained without the necessity of complex calculation.

The third aspect of the present invention resides in the data access position locating method defined in the first aspect, wherein the subunit of data is a second unit of data that is an independently reproducible minimum unit of data, and a plurality of the second units of data each having an identical playback time constitute one first unit of data that is an independently editable minimum unit of data, and a plurality of the first units of data each having an identical playback time within a single base unit of data.

According to the third aspect of the present invention, in a multimedia data stream, the positional information of a second unit of data required for access to an arbitrary frame, on the recording medium can be easily obtained without the necessity of complex calculation.

Further, since positional information of second units of data which are frequently referenced is given as management information, it is possible to refer to management information efficiently without the necessity of calculation of the positional information.

The fourth aspect of the present invention resides in the data access position locating method defined in the third aspect further comprising the step of identifying start position information of the first unit of data, using start position information of the second units of data.

According to the fourth aspect of the present invention, in a multimedia data stream, the positional information of a second unit of data required for access to an arbitrary frame on the recording medium as well as the positional information of a first unit of data, which is the minimum editable unit for an arbitrary frame, on the recording medium can be easily obtained without the necessity of complex calculation.

The fifth aspect of the present invention resides in the data access position locating method defined in the second through fourth aspects, wherein the data recording medium has in association with the first units of data, audio data units for post recording for storing post recording audio data, which differs from the original audio data associated with video data and is recordable and reproducible in synchronization with the video data and the management information area has stored beforehand third relative distance information as the start position information of the audio data unit for post recording for each base unit of data, the method further comprising the step of identifying the start position information of the target audio data unit for post recording corresponding to the target first unit of data, based on the third relative distance information stored in the management information area.

The sixth aspect of the present invention resides in the data access position locating method defined in the fifth aspect, wherein the third relative distance information is relative distance information from the reference position information to the start position information of the audio data unit for post recording.

The seventh aspect of the present invention resides in the data access position locating method defined in the fifth aspect, wherein the third relative distance information is relative distance information from the start position information of the first unit of data to the start position information of the audio data unit for post recording.

According to the fifth to seventh aspects of the present invention, the positional information of post recording audio data on the recording medium, which should be reproduced in synchronization with the predetermined data, can be easily obtained in relation with the positional information of the individual units of data without the necessity of complex calculation.

The eighth aspect of the present invention resides in a data access position locating method for locating access position in a data recording medium in which a data sequence of a continuous recording period in a first data stream having video data is managed as a base unit of data, the method comprising the steps of: based on presentation time information as to a specified piece of video data and reference time information related to the reference position information of the target base unit of data, determining a relative time from the reference time information to the presentation time information; identifying a target first unit of data including a specified piece of video data, by operation based on the relative time as to the specified piece of video data and the playback time of the first unit of data; and identifying start position information of the target audio data unit for post recording, corresponding to the target first unit of data, from third relative distance information stored beforehand in a management information area, wherein the base unit of data comprises a plurality of first units of data, each having an identical playback time within a single base unit of data and being an independently editable minimum unit of data; the data recording medium has in association with the first units of data, audio data units for post recording for storing post recording audio data, which differs from original audio data associated with the video data and is recordable and reproducible in synchronization with the video data; for each of the base units of data, third relative distance information that is start position information of each of the audio data units for post recording is stored beforehand in the management information area of a recording medium.

The ninth aspect of the present invention resides in the data access position locating method defined in the eighth aspect, wherein the third relative distance information is relative distance information from reference position information representing the start position information as to the base unit of data to the start position information of the audio data unit for post recording.

The tenth aspect of the present invention resides in the data access position locating method defined in the eighth aspect, wherein the third relative distance information is relative distance information from start position information of the first unit of data to the start position information of the audio data unit for post recording.

According to the eighth to tenth aspects of the present invention, the positional information of post recording audio data on the recording medium, which should be reproduced in synchronization with the predetermined data, can be easily obtained without the necessity of complex calculation.

The eleventh aspect of the present invention resides in the data access position locating method defined in the fifth or eighth aspect, wherein the audio data unit for post recording is provided inside each first unit of data. According to the eleventh aspect of the present invention, reading and writing of a plurality of pieces of management information can be done in a short period of time.

The twelfth aspect of the present invention resides in the data access position locating method defined in the fifth or eighth aspect, wherein the audio data unit for post recording is provided outside the base units of data.

According to the twelfth aspect of the present invention, since the data area and the management information area are separated clearly, no file of management information will be created in the data area. Therefore, contiguous arrangement of data in the data area can be realized.

The thirteenth aspect of the present invention resides in the data access position locating method defined in the first or eighth aspect, wherein the management information area is provided inside the data recording medium.

According to the thirteenth aspect of the present invention, the data to be reproduced is arranged in proximity to the management information so that it is possible to realize an increased processing speed.

The fourteenth aspect of the present invention resides in the data access position locating method defined in the first or eighth aspect, wherein the management information area is provided in a recording medium outside the data recording medium.

According to the fourteenth aspect of the present invention, since the management information area is provided for a recording medium having a higher access speed than the data recording medium, it is possible to realize a faster response.

The fifteenth aspect of the present invention resides in a data recording media managing device for managing a data sequence of a continuous recording period in a first data stream having video data as a base unit of data, comprising a controller which manages the data by the steps of: constructing the base unit of data with a plurality of first units of data, each being an independently editable minimum unit of data; constructing the first unit of data with a plurality of second units of data each being an independently reproducible minimum unit of data; making the first playback time for reproducing each of the first units of data identical within a single base unit of data and controlling the second playback time for reproducing each of the second units of data to be identical within a single first unit of data; and managing for each base unit of data, reference position information as the start position information of the base unit of data and first relative distance information from the reference position information to start position information of a first unit of data in the base unit of data, in a manner that allows them to be written in, or read out from, the data recording medium or the management information area arranged somewhere with respect to holder of the data recording medium.

The sixteenth aspect of the present invention resides in a data recording media managing device for managing a data sequence of a continuous recording period in a first data stream having video data as a base unit of data, comprising a controller which manages the data by the steps of: constructing the base unit of data with a plurality of first units of data, each being an independently editable minimum unit of data; constructing the first unit of data with a plurality of second units of data each being an independently reproducible minimum unit of data; making the first playback time for reproducing each of the first units of data identical within a single base unit of data and controlling the second playback time for reproducing each of the second units of data to be identical within a single first unit of data; and managing for each base unit of data, the reference position information as the start position information of the base unit of data and second relative distance information from the reference position information to the start position information of a predetermined second unit of data in the base unit of data, in a manner that allows them to be written in, or read out from, the data recording medium or the management information area provided for the holder of the data recording medium.

According to the fifteenth and sixteenth aspects of the present invention, the data recording media managing device, in a data recording medium in which the base unit of data is divided into the first units of data and the second units of data based on playback time, manages the reference position information and the first relative distance information in the management information area. Therefore, the managing device, using time information as the key information, can convert it into positional information by a simple process, thus making it possible to have easy access to an arbitrary frame in the unit of data.

Further, even when a plurality of pieces of management information should be read or written, it is possible to have it done in a short period of time. Since the data area and the management information area are separated clearly, no file of management information will be created in the data area. Therefore, contiguous arrangement of data in the data area can be realized.

The seventeenth aspect of the present invention resides in the data recording media managing device defined in the fifteenth or sixteenth aspect, wherein the controller constructs in the data recording medium an audio data unit for post recording for storing post recording audio data, which differs from the original audio data associated with the video data and is recordable and reproducible in synchronization with the video data, and manages third relative distance information from the reference position information to the start position information of the audio data unit for post recording, in association with each of the first units of data, in a manner that allows it to be written in or read out from the management information area.

According to the seventeenth aspect of the present invention, since the positional information of post recording audio data can be also obtained by a simple process, using time information as the key information, post recording audio data can be reproduced efficiently.

The eighteenth aspect of the present invention resides in the data recording media managing device defined in the seventeenth aspect, wherein the audio data unit for post recording is provided inside the first unit of data.

According to the eighteenth aspect of the present invention, the data to be reproduced is arranged in proximity to the management information so that it is possible to realize an increased processing speed.

The nineteenth aspect of the present invention resides in the data recording media managing device defined in the seventeenth aspect, wherein the audio data unit for post recording is created outside the base units of data.

According to the nineteenth aspect of the present invention, this configuration will not make the stream composition complex, so makes it easy to access the other units of data.

The twentieth aspect of the present invention resides in the data recording media managing device defined in the fifteenth or sixteenth aspect, wherein the controller manages offset information that gives an offset value for positional information in a manner that allows it to be written in or read out from the management information area.

According to the twentieth aspect of the present invention, since when some front part of the multimedia stream has been deleted, the positional information of the deleted data is recorded as the management information, i.e., the offset value, this makes it unnecessary to renew each piece of positional information in various pieces of management information, thus making it possible to save the editing job.

The twenty-first aspect of the present invention resides in the data recording media managing device having the fifth aspect, wherein the controller is able to compute a data playback rate of the first unit of data, based on the first relative distance information and the first playback time.

According to the twenty-first aspect of the present invention, since the playback rate of video data in the first unit of data can be determined by calculation, it is possible to grasp the playback rate of data beforehand, without reproducing the video data.

The twenty-second aspect of the present invention resides in the data recording media managing device defined in the sixteenth aspect, wherein the controller is able to compute a data playback rate of the second unit of data, based on the second relative distance information and the second playback time.

According to the twenty-second aspect of the present invention, since the playback rate of video data in the second unit of data can be determined by calculation, it is possible to grasp the playback rate of data beforehand, without reproducing the video data.

The twenty-third aspect of the present invention resides in the data recording media managing device defined in the fifteenth or sixteenth aspect, wherein the positional information is given in a relative address representation which disregard any divided arrangement on the recording medium.

According to the twenty-third aspect of the present invention, since start addresses are given in a relative address representation, which disregards the divided arrangement of the stream on the recording medium, the data amount of the data managed by the first or second unit can be known from the relationship between one start address and the next.

The twenty-fourth of the present invention resides in the data recording media managing device defined in the seventeenth aspect, wherein the controller manages post recording presence/absence information that indicates whether the post recording audio data to be reproduced in synchronization has been stored in the audio data unit for post recording in a manner that allows it to be written in or read out from the management information area.

According to the twenty-fourth aspect of the present invention, since upon data reproduction it is possible to grasp whether post recording audio data should be read out in advance, this makes the process more efficient.

The twenty-fifth of the present invention resides in the data recording media managing device defined in the seventeenth, wherein the controller manages post recording presence/absence information that indicates whether the post recording audio data to be reproduced in synchronization with the first unit of data has been stored in the audio data unit for post recording in a manner that allows it to be written in or read out from the management information area.

According to the twenty-fifth aspect of the present invention, since upon data reproduction it is possible to grasp whether post recording audio data should be read out in advance for every first unit, this makes the process more efficient.

The twenty-sixth of the present invention resides in the data recording media managing device defined in the seventeenth aspect, wherein the controller manages post recording presence/absence information that indicates whether the post recording audio data to be reproduced in synchronization with the second unit of data has been stored in the audio data unit for post recording in a manner that allows it to be written in or read out from the management information area.

According to the twenty-sixth aspect of the present invention, since upon data reproduction it is possible to grasp whether post recording audio data should be read out in advance for every second unit, this makes the process more efficient.

The twenty-seventh of the present invention resides in the data recording media managing device defined in the fourteenth or fifteenth aspect, wherein the controller manages data contiguousness information that indicates whether the data corresponding to the first unit of data and the data corresponding to the subsequent first unit of data, which are continuous temporally, are arranged logically and contiguously on the recording medium, in a manner that allows it to be written in or read out from the management information area.

According to the twenty-seventh aspect of the present invention, since it is possible to grasp whether the observed first unit is arranged logically and contiguously to the previous first unit, on the recording medium, without referring to the logical filesystem information, this makes the process more efficient.

The twenty-eighth of the present invention resides in the data recording media managing device defined in fifteenth or sixteenth aspect, wherein the controller manages information that indicates whether or not a GOP at the front of the second unit of data is a closed GOP, in a manner that allows it to be written in or read out from the management information area.

According to the twenty-eighth aspect of the present invention, before reproduction of a second unit of data, it is possible to grasp whether it is necessary to access to the previous second unit in order to perform correct reproduction of the frames in the GOP within the second unit of data.

The twenty-ninth of the present invention resides in the data recording media managing device defined in the fifteenth or sixteenth aspect, wherein the controller manages video frame information that indicates the number of video frames of MPEG data to be managed in the second unit of data, in a manner that allows it to be written in or read out from the management information area.

According to the twenty-ninth aspect of the present invention, each of the second units of data is allowed to manage not a fixed number of frames but an arbitrary number of frames.

The thirtieth of the present invention resides in the data recording media managing device defined in the fifteenth or sixteenth aspect, wherein the controller manages a video frame of MPEG data to be managed in a second unit of data by allowing end position information that represents an end address of a reference picture on the recording medium to be written in or read out from the management information area.

According to the thirtieth aspect of the present invention, since the amount of data to be read from the start of the second unit of data to the target reference picture can be grasped in advance, this facilitates achievement of special playback.

The thirty-first aspect of the present invention resides in the data recording media managing device defined in the fifteenth or sixteenth aspect, wherein the controller manages reference picture start position information that represents a start address on the disk of a reference picture for the video frame of MPEG data to be managed in a second unit of data and reference picture end position information that represents an end address thereof, in a manner that allows them to be written in or read out from the management information area.

According to the thirty-first aspect of the present invention, when a recording medium having a high enough access performance is used, the target reference pictures can be read selectively based on the positional information from which data should be read. This feature facilitates achievement of special playback.

The thirty-second aspect of the present invention resides in the data recording media managing device defined in the fifteen or sixteen, wherein the controller manages a video frame of MPEG data to be managed in the second unit of data by allowing start position information that represents a start address of a reference picture on the recording medium to be written in or read out from the management information area.

According to the thirty-second aspect of the present invention, since the start addresses of all the frames are managed, it is possible to easily determine the amount of data of each frame from the difference from the start address to the next frame and to selectively read out the data of an arbitrary frame when a recording medium having a high enough access performance is used. Therefore, these features facilitate achievement of special playback.

The thirty-third aspect of the present invention resides in a data recording media managing device for managing a data sequence of a continuous recording period in a first data stream having video data as a base of data, wherein the base unit of data comprises a plurality of subunits of data, the device comprising a controller which manages each base unit of data in a manner that reference position information as start position information of the base unit of data, relative distance information of each of individual subunits of data in the base unit of data from the base position information to the start position information of the individual subunit of data and post recording presence/absence information that indicates whether post recording audio data to be reproduced in synchronization has been stored in a post recording audio data unit, are allowed to be written in or read out from, the data recording medium, or the management information area arranged somewhere with respect to a holder of the data recording medium.

According to the thirty-third aspect of the present invention, since upon data reproduction it is possible to grasp whether post recording audio data should be read in advance, this makes the process more efficient.

The recording media management system according to the thirty-fourth aspect of the present invention is a management system for a recording medium recorded with a multimedia data stream wherein in a first data (original data) made up of video and sound, an amount of data for a predetermined playback period is managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the second unit (VU) on the recording medium is held as management information for every second unit, so that the positional information of the first unit (EU) on the recording medium is calculated based on the positional information of the second unit (VU) on the recording medium.

According to the thirty-fourth aspect of the present invention, in a multimedia data stream, the positional information of the second unit on the recording medium needed to have access to an arbitrary frame and the positional information of the first unit on the recording medium as a minimum unit of destructive edit can be easily obtained without the necessity of complex calculation.

Further, since the positional information of a second unit which is referenced frequently is provided as management information, it is possible to refer to management information efficiently without the necessity of calculation of the positional information.

The recording media management system according to the thirty-fifth aspect of the present invention is a management system for a recording medium recorded with a multimedia data stream wherein in a first data (original data) made up of video and sound, an amount of data for a predetermined playback period and second data (post recording data) to be reproduced in synchronization with the above data are managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the second data (post recording data) on the recording medium is held as management information for every piece of second data while the positional information of the second unit (VU) on the recording medium is held as management information for every second unit, so that the positional information of the first unit (EU) on the recording medium is calculated based on the positional information of the second data (post recording data) on the recording medium and the positional information of the second unit (VU) on the recording medium.

According to the thirty-fifth aspect of the present invention, in a multimedia data stream, the positional information of a second unit on the recording medium required for access to an arbitrary frame, the positional information of second data on the recording medium, to be reproduced in synchronization with the predetermined data, and the positional information of the first unit as the minimum unit for destructive edit on the recording medium can be easily obtained without the necessity of complex calculation.

Further, since the positional information of a second unit which is referenced frequently and the positional information of second data are provided as management information, it is possible to refer to management information efficiently without the necessity of calculation of the positional information.

The recording media management system according to the thirty-sixth aspect of the present invention is a management system for a recording medium recorded with a multimedia data stream wherein in a first data (original data)

made up of video and sound, an amount of data for a predetermined playback period is managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the first unit (EU) on the recording medium is held as management information for every first unit and the positional information of the second unit (VU) on the recording medium is held as management information for every second unit.

According to the thirty-sixth aspect of the present invention, in a multimedia data stream, the positional information of a second unit on the recording medium required for access to an arbitrary frame and the positional information of the first unit as the minimum unit for destructive edit can be easily obtained without the necessity of complex calculation.

The recording media management system according to the thirty-seventh aspect of the present invention is a management system for a recording medium recorded with a multimedia data stream wherein in a first data (original data) made up of video and sound, an amount of data for a predetermined playback period and second data (post recording data) to be reproduced in synchronization with the above data are managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the first unit (EU) on the recording medium and the distance information from the starting position of each first unit (EU) on the recording medium to the starting position of the second data (post recording data) on the recording medium are held as management information for every first unit while the positional information of the second unit (VU) on the recording medium is held as management information for every second unit.

According to the thirty-seventh aspect of the present invention, in a multimedia data stream, the positional information of a second unit on the recording medium required for access to an arbitrary frame, the positional information of second data on the recording medium, to be reproduced in synchronization with the predetermined data, and the positional information of the first unit as the minimum unit for destructive edit can be easily obtained without the necessity of complex calculation.

The recording media management system according to the thirty-eighth aspect of the present invention is a management system for a recording medium recorded with a multimedia data stream wherein in a first data (original data) made up of video and sound, an amount of data for a predetermined playback period and second data (post recording data) to be reproduced in synchronization with the above data are managed as a first unit (EU), an individually reproducible minimum unit of data in the first unit (EU) is managed as a second unit (VU), each of the first units (EUs) is adapted to have an equal period of playback time to others, and each of the second units (VUs) is adapted to have an equal period of playback time to others. In this management system, the positional information of the second unit (VU) on the recording medium and the distance information from the starting position of each first unit (EU) on the recording medium to the starting position of the second data (post recording data) on the recording medium are held as management information for every second unit while the positional information of the first unit (EU) on the recording medium is calculated based on the positional information of the second unit (VU) on the recording medium.

According to the thirty-eighth aspect of the present invention, in a multimedia data stream, the positional information of a second unit on the recording medium required for access to an arbitrary frame, the positional information of second data on the recording medium, to be reproduced in synchronization with the predetermined data, and the positional information of the first unit as the minimum unit for destructive edit can be easily obtained without the necessity of complex calculation.

Further, since only the positional information of the second unit is held as management information, management can be performed with subminimal information.

The thirty-ninth aspect of the present invention resides in the recording media management system written in the above thirty-fourth to thirty-eighth aspects, wherein the management information includes a piece of information that gives an offset value for positional information.

According to the thirty-ninth aspect of the present invention, since when some front part of the multimedia stream has been deleted, the number of blocks of the deleted data is recorded into the management information as the offset value, this makes it unnecessary to renew each piece of positional information in various pieces of management information, thus making it possible to save the editing job.

The fortieth aspect of the present invention resides in the recording media management systems defined in the inventions of the above thirty-fourth to thirty-eighth aspects which include the management information indicating the playback time of the video data managed by each of the first units.

According to the fortieth invention, use of the management information indicating the playback time of the video data within each first unit makes it possible to identify the first unit to which an arbitrary frame belongs by the time stamp information of the frame.

The forty-first aspect of the present invention resides in the recording media management system defined in the above fortieth aspect, wherein the playback rate of video data in a first unit is calculated based on the positional information of the first unit on the recording medium and the playback time of the video data managed by the first unit.

According to the forty-first aspect of the present invention, since the playback rate of video data in a first unit of data can be determined by calculation, it is possible to grasp the playback rate of data beforehand, without reproducing the video data.

The forty-second aspect of the present invention resides in the recording media management systems defined in the above thirty-fourth to thirty-eighth aspects which include the management information indicating the playback time of the video data managed by the second unit.

According to the forty-second of the present invention, use of the management information indicating the playback time of the video data within the second unit makes it possible to identify the second unit to which an arbitrary frame belongs by the time stamp information of the frame.

The forty-third aspect of the present invention resides in the recording media management system defined in the above forty-second aspect, wherein the playback rate of video data in a second unit is calculated based on the positional information of the second unit on the recording medium and the playback time of the video data managed by the second unit.

According to the forty-third aspect of the present invention, since the playback rate of video data in a second unit can be determined by calculation, it is possible to grasp the playback rate of data beforehand, without reproducing the video data.

The forty-fourth aspect of the present invention resides in the recording media management systems defined in the above thirty-fourth to thirty-eighth aspects, wherein the management information includes as positional information of a unit or data, a piece of information indicating the start address of the unit or data on the recording medium.

According to the forty-fourth aspect of the present invention, since the start address of each piece of data on the recording medium is used as positional information, it is possible to obtain the start position of access to the data managed by various pieces of management information.

The forty-fifth aspect of the present invention resides in the recording media management system defined in the above forty-fourth aspect, wherein the start address on the recording medium is represented by the relative address which disregards any divided arrangement of the stream on the recording medium.

According to the forty-fifth aspect of the present invention, since the start address is given by a relative address representation, which disregards the divided arrangement of the stream on the recording medium, the data amount of the data managed by the first or second unit can be known from the relationship between one start address and the next.

The forty-sixth aspect of the present invention resides in the recording media management systems defined in the above thirty-fourth to thirty-eighth aspects, wherein the management information for each of the second units includes the information representing whether the second data contains the data to be reproduced in synchronization with the second unit.

According to the forty-sixth aspect of the present invention, it is possible to grasp for each of the second units, whether the second data needs to be read in advance upon reproduction of data, based on the management information representing whether the second data contains data to be reproduced in synchronization with the second unit.

The forty-seventh aspect of the present invention resides in the recording media management systems defined in the above thirty-fifth to thirty-seventh aspects, wherein the management information for each of the first units or the management information for the second data includes information representing whether the second data contains the data to be reproduced in synchronization with the first unit.

According to the forty-seventh aspect of the present invention, it is possible to grasp for each of the first units, whether the second data needs to be read in advance upon reproduction of data, based on the management information representing whether the second data contains data to be reproduced in synchronization with the first unit.

The forty-eighth aspect of the present invention resides in the recording media management systems defined in the above thirty-fourth to thirty-eighth aspects, wherein the management information for each of the second units or the management information for each of the first units includes information indicating whether the data corresponding to the first units temporally continuous are arranged logically and contiguously on the recording medium.

According to the forty-eighth aspect of the present invention, it is possible to grasp whether the observed first unit is arranged logically and contiguously to the previous first unit, on the recording medium, without referring to the logical filesystem information.

The forty-ninth aspect of the present invention resides in the recording media management systems defined in the above thirty-fourth to thirty-eighth aspects, wherein the management information for each of the second units includes information indicating whether or not the GOP at the front of the second unit is a closed GOP.

According to the forty-ninth aspect of the present invention, before reproduction of a second unit, it is possible to grasp whether it is necessary to access to the previous second unit in order to perform correct reproduction of the frames in the GOP in the second unit.

The fiftieth aspect of the present invention resides in the recording media management systems defined in the above thirty-fourth to thirty-eighth aspects, wherein the management information for each of the second units includes information indicating the number of the positional information of video frames of MPEG data to be managed in the second unit.

According to the fiftieth aspect of the present invention, each of the second units is allowed to manage not a fixed number of frames but an arbitrary number of frames.

The fifty-first aspect of the present invention resides in the recording media management systems defined in the above thirty-fourth to thirty-eighth aspects, wherein the management information for each of the second units includes information indicating the end addresses of reference pictures on the recording medium, as the positional information of the video frames of MPEG data to be managed in the second unit.

According to the fifty-first aspect of the present invention, since the amount of data to be read from the start of the second unit to the target reference picture can be grasped in advance, this facilitates achievement of special playback.

The fifty-second aspect of the present invention resides in the recording media management systems defined in the above thirty-fourth to thirty-eighth aspects, wherein the management information for each of the second units includes information indicating the start addresses end addresses of reference pictures on the recording medium, as the positional information of the video frames of MPEG data to be managed in the second unit.

According to the fifty-second aspect of the present invention, when a recording medium having a high enough access performance is used, the target reference pictures can be read selectively based on the positional information from which data should be read. Therefore, this facilitates achievement of special playback.

The fifty-third aspect of the present invention resides in the recording media management systems defined in the above thirty-fourth to thirty-eighth aspects, wherein the management information for each of the second units includes information indicating the start addresses of all the pictures therewithin on the recording medium, as the positional information of all the video frames of MPEG data in the second unit.

According to the fifty-third aspect of the present invention, since the start addresses of all the frames are managed, it is possible to easily determine the amount of data of each frame, based on the difference from the start address to the start address of the next frame and to selectively read out the data of an arbitrary frame when a recording medium having a high enough access performance is used. Therefore, these features facilitate achievement of special playback.

The fifty-fourth aspect of the present invention resides in the recording media management systems defined in the above thirty-fourth to fifty-third aspects, wherein the management information is recorded in a predetermined management area on the recording medium.

According to the fifty-fourth aspect of the present invention, it is possible to read and write a plurality of pieces of management information in a short period of time. Further, since the data area and the management information area are separated clearly, no file of management information will be created in the data area. Therefore, contiguous arrangement of data in the data area can be realized.

BRIEF DESCRIPTION OF DRAWINGS

FIG. 5 is an illustrative view showing the content of management information 'EUS Information' in the first embodiment of a recording media management system of the present invention;

FIG. 6 is an illustrative view showing the content of management information 'Program Information' in the first embodiment of a recording media management system of the present invention;

FIG. 7 is an illustrative view showing the content of management information 'EUS Stream Information' in the first embodiment of a recording media management system of the present invention;

FIG. 12 is an illustrative view showing the content of an Address LUT in the first example of the recording media management system of the present invention;

FIG. 13 is an illustrative view showing the content of PRU Information in the first example of the recording media management system of the present invention;

FIG. 14 is an illustrative view showing the content of PRU Status in the first example of the recording media management system of the present invention;

FIG. 15 is an illustrative view showing the content of VU Information in the first example of the recording media management system of the present invention;

FIG. 16 is an illustrative view showing the content of VU Status in the first example of the recording media management system of the present invention;

FIG. 22 is an illustrative view showing the content of an Address LUT in the second example of the recording media management system of the present invention;

FIG. 23 is an illustrative view showing the content of EU Information in the second example of the recording media management system of the present invention;

FIG. 24 is an illustrative view showing the content of EU Status in the second example of the recording media management system of the present invention;

FIG. 25 is an illustrative view showing the content of VU Information in the second example of the recording media management system of the present invention;

FIG. 26 is an illustrative view showing the content of VU Status in the second example of the recording media management system of the present invention;

FIG. 33 is an illustrative view showing the content of an Address LUT in the third example of the recording media management system of the present invention;

FIG. 34 is an illustrative view showing the content of VU Information in the third example of the recording media management system of the present invention;

FIG. 35 is an illustrative view showing the content of VU Status in the third example of the recording media management system of the present invention;

FIG. 51 is an illustrative view showing the content of management information 'EUS Information' in the second embodiment of a recording media management system of the present invention;

FIG. 52 is an illustrative view showing the scheme of an Address LUT in the second embodiment of a recording media management system of the present invention;

FIG. 53 is an illustrative view showing the content of an Address LUT in the second embodiment of a recording media management system of the present invention;

FIG. 54 is an illustrative view showing the content of PRU Information in the second embodiment of a recording media management system of the present invention;

FIG. 55 is an illustrative view showing the content of PRU Status in the second embodiment of a recording media management system of the present invention;

FIG. 56 is an illustrative view showing the content of VU Information in the second embodiment of a recording media management system of the present invention;

FIG. 57 is an illustrative view showing the content of VU Status in the second embodiment of a recording media management system of the present invention;

BEST MODE FOR CARRYING OUT THE INVENTION

The embodiments of the present invention will be described hereinbelow with reference to the drawings.

The First Embodiment

The first embodiment of a recording media management system of the present invention will be described in detail with reference to FIGS. 1 to 47. First, the MPEG stream composition to be handled in this embodiment will be described with reference to FIGS. 1 to 8.

In the case when variable-length coded data such as MPEG data has been recorded on a recording medium such as a disk, memory device, or the like, in order to realize random access such as starting playback from an arbitrary point or implementing special playback using only arbitrary selected frames, it is necessary to have management information for managing the positional information at which the wanted pieces of data are recorded on the disk.

This is because the amount of data of each video frame of MPEG data recorded on the recording medium is variable, so that it is impossible to determine the recorded position of an arbitrary frame on the disk by calculation or other means.

The description of the present embodiment will be described on the assumption that the MPEG technology is used as an example of variable-length coding with use of a disk as a recording medium. It should be understood that the present embodiment can be realized with use of semiconductor memory devices or others as the recording media, in a similar configuration to the case with use of a disk.

To begin with, the structure of an MPEG stream to be handled in the embodiment will be described. It is assumed that video data is encoded at variable rates by the MPEG encoding and audio data, both the original and the post recording (audio dubbing) data, is encoded at a fixed rate.

Figure 1:
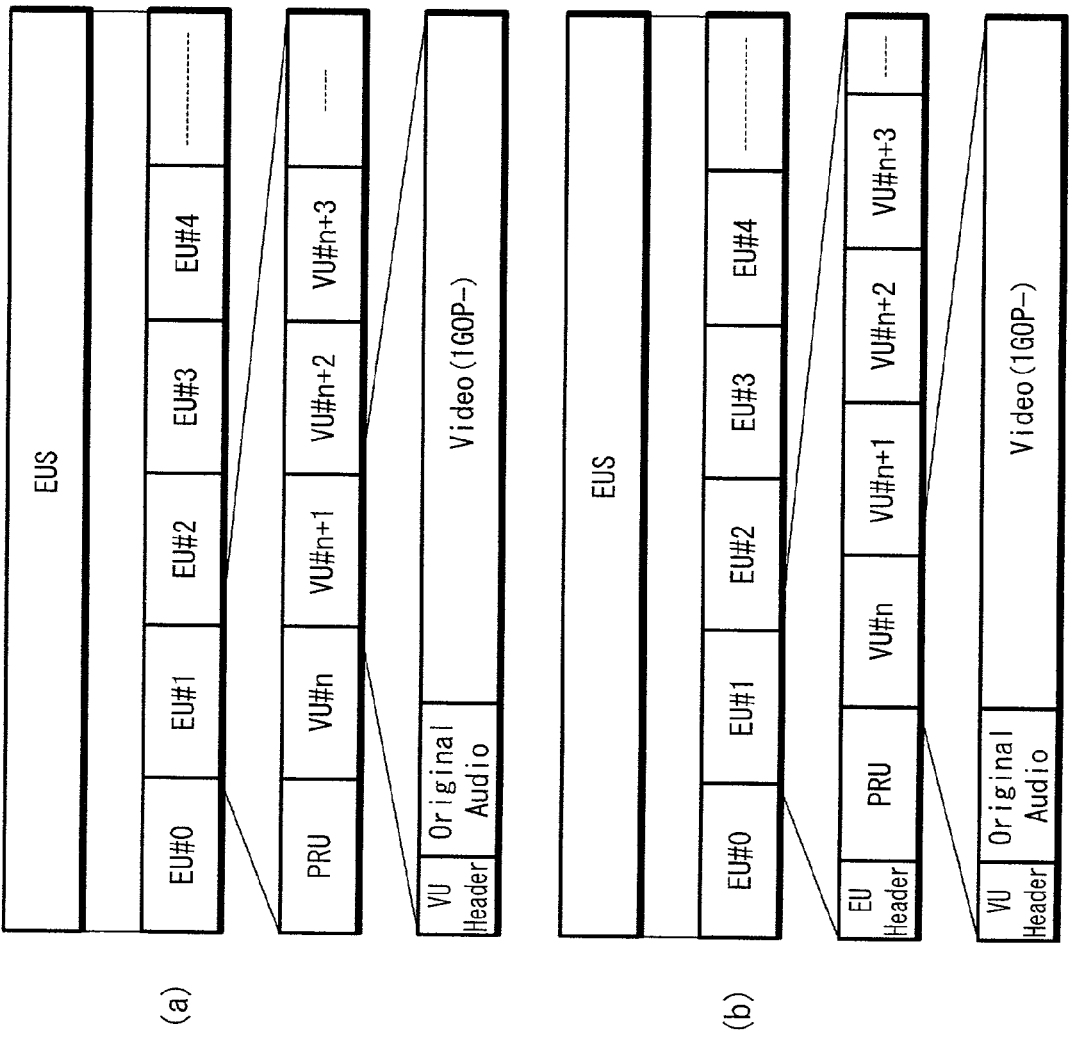
FIG. 1 is an illustrative view showing an MPEG stream composition used in the first embodiment of a recording media management system of the present invention.

In the stream configuration shown in FIG. 1, an editable unit sequence (to be abbreviated as 'EUS' hereinbelow) is composed of a multiple number of editable units (to be abbreviated as 'EUs' hereinbelow) and corresponds to the unit from start of recording (Rec Start) to the stop of recording (Rec Stop) or to a pause of recording (Rec Pause). The MPEG data managed by one EUS has to be added with time stamp which is the management information relating to sequential time.

Here, EU is the minimum unit for destructive edit. Destructive edit means an act of editing accompanied by a move or deletion on the disk. The minimum unit of destructive edit means that move and deletion on the disk can be done only by EU by EU.

If some EUs are deleted from the middle of one EUS by destructive edit, the time stamp of the MPEG stream presents discontinuity, so that the EUS needs to be divided.

EU is composed of video units (to be abbreviated as 'VUs' hereinbelow) and a post recording unit (to be abbreviated as 'PRU' hereinbelow), and has to be recorded continuously on the disk. There may exist a stream configuration having no PRU.

It is possible to add a constraint that the start position and end position of a PRU on the disk should be located at the boundary of error correction code block or ECC block. Since PRU is the area for post recording of data to be reproduced in synchronization with the video data within the EU, it should at least have an area size capable of recording the data equivalent to the presentation time of the video data in the EU.

As the EU structures, FIG. 1(a) shows the case where no EU header EU Header (to be abbreviated as 'EU Header' and to be described hereinbelow) is provided at the front of the EU and FIG. 1(b) shows the case where an EU header is provided at the front of the EU. The EU Header is a packet added at the front of the EU for storing header information for managing the EU. When this EU Header is defined, the management information of the stream as to the EU can be recorded.

VU is a unit comprised of a VU Header, one or greater number of GOPs of video data, and associated audio data. The presentation time of all the EUs and that of all the VUs in one EUS are set constant. The presentation time of VU corresponds to the playback time of video data managed by one VU. Similarly, the presentation time of EU indicates the playback time of video data managed by one EU.

The EUS is divided into blocks having a fixed length of 2048 bytes. One block is stored into one logical block. Principally, one block is constructed of one packet. The packet used here conforms to PES Packet defined by ISO/IEC 13818-1, and packets of this type should be recorded onto the disk.

Figure 2:
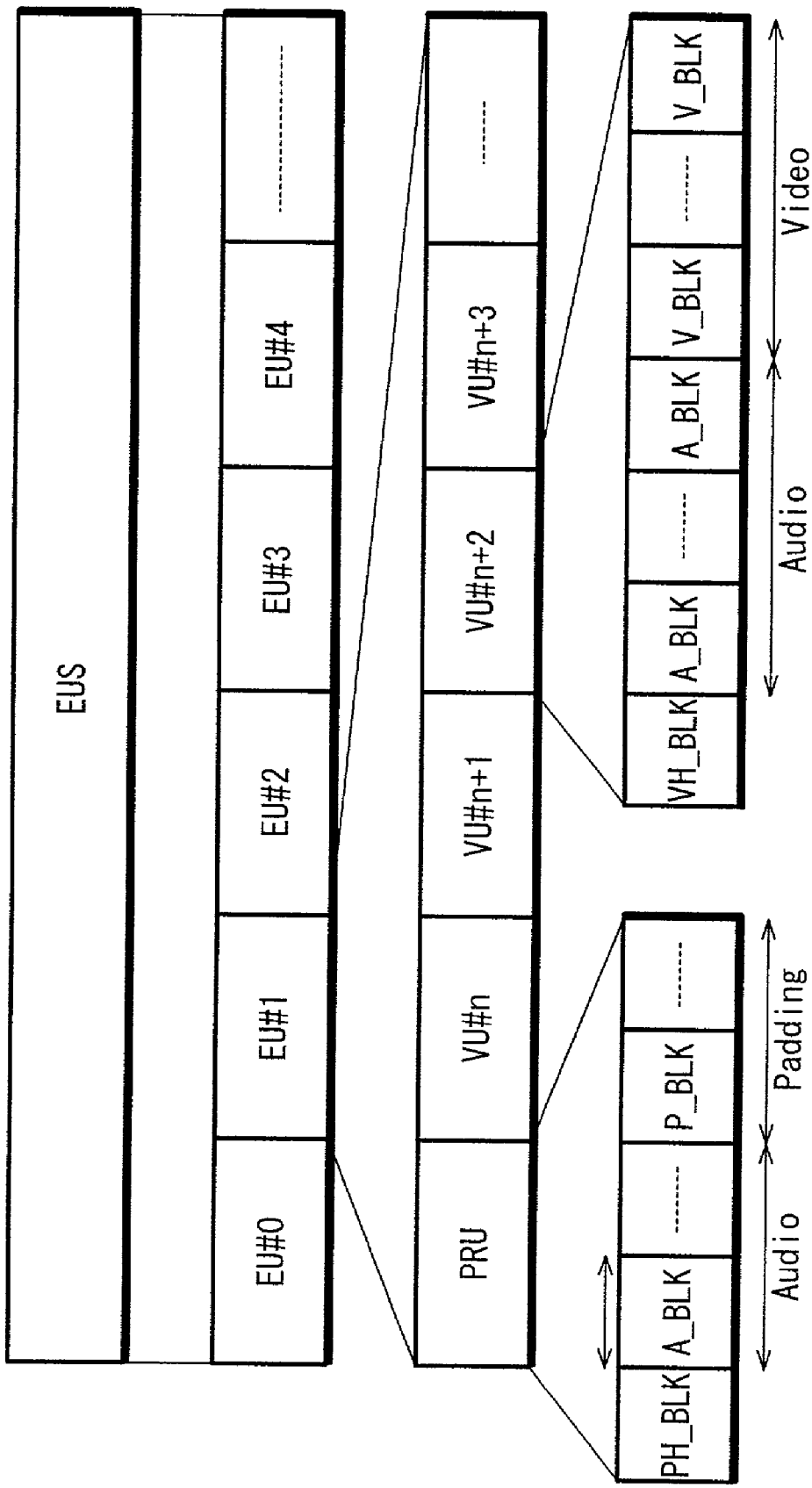
FIG. 2 is an illustrative view showing the relationship of blocks in an MPEG stream used in the first embodiment of a recording media management system of the present invention.

FIG. 2 shows the relationship between the EUS and blocks. In this figure, a PRU is composed of a PRU header block PH BLK (to be abbreviated as 'PH BLK' hereinbelow), audio blocks A BLK (to be abbreviated as 'A BLKs') and padding blocks P BLK (to be abbreviated as 'P BLKs'). PH BLK stores a packet of the header information relating to the PRU. A BLK stores an audio packet defined by ISO/IEC 13818-3. P BLK stores a padding packet defined by ISO/IEC 13818-1.

A VU is composed of a VU header block VH BLK (to be abbreviated as 'VH BLK' hereinbelow), A BLKs (audio blocks) and video blocks V BLK (to be abbreviated as 'V BLKs'). VH BLK stores a packet of the header information relating to the VU. A BLK stores an audio packet defined by ISO/IEC 13818-3. V BLK stores a packet of video data defined by ISO/IEC 13818-2.

For a stream where EU headers are defined, an EH header block EH BLK (to be abbreviated as 'EH BLK' hereinbelow) is stored at the front of each EU.

The PRU area other than the header block PH BLK is padded with padding blocks (P BLKs) when no post recording data exists as in the initial state. When post recording is made, actual data such as of A BLKs or audio blocks is recorded. This audio data will be reproduced in synchronization with the video data within the corresponding VU.

In a VU, the audio component is composed of a multiple number of A BLKs and the video data component is composed of a multiple number of V BLKS. This audio data will be reproduced in synchronization with the video data.

When using a disk with an MPEG stream recorded thereon and playback from an arbitrary frame is started or a special playback such as reproducing arbitrarily selected frames is implemented, it is impossible, as stated above, to determine the recorded position of an arbitrary frame on the disk by calculation or the like because the amounts of data of individual frames of MPEG data recorded on the disk are different from one another.

This is why management information for making an access to an arbitrary frame is needed. In this embodiment, this management information is called an address look up table (to be abbreviated as 'Address LUT' hereinbelow) and will be explained hereinbelow. The definitions of the terms used here will also be described.

In this embodiment, post recording means audio dubbing that is the recording only sound afterwards over the already recorded original data. A PRU is an area for recording post recording data when audio dubbing is implemented.

Logical Block Number LBN (to be abbreviated as 'LBN' hereinbelow) is the address attached to each Logical Block as the minimum management unit on the disk offered by the logical filesystem. There exist areas, on the disk, which cannot be actually seen from the user side, such as areas to which data is written in, areas for recording error correction codes for written data, areas for substituting portions which are unable to be used in any way.

To deal with this, the areas which can be actually used by the user can be assigned with addresses in ascending order. This ascending order of addresses of user usable areas are called logical block numbers, and this management unit is called a logical block. A Relative Logical Block Number RLBN (to be abbreviated as 'RLBN' hereinbelow) indicates the relative representation of a logical block number.

A Presentation Time Stamp PTS (to be abbreviated as 'PTS' hereinbelow) is a management format of the time stamp in the MPEG standard and is of 33 bits of data. This PTS is the information for mainly managing time at which MPEG data should be displayed, and the time information is represented by components of 90 KHz.

Here, the most significant bit of the PTS component is removed so that it is handled as 32 bits of data. This is because it is unusual to handle data of 33 bits for microcomputer and the like and information of 32 bits is enough to provide sufficient management. This data which is converted to 32 bits is called PT (Presentation Time) Format (FIGS. 5 and 7).

RT (Real Time Stamp) Format (FIGS. 5 and 6) is the format for management of the date at which the management information is created. ECC (Error Correction Code) is a code for correcting errors. This ECC is additionally recorded every determined unit when data is recorded on the disk. For example, one ECC is additionally recorded every 32 KB.

In view of disk access, the unit of ECC is of a great significance because reading data from and writing data onto the disk is implemented in ECC block units.

When viewed from the user side, reading and writing can be implemented in logical block units. For example, if the size of one logical block is 2 KB, access can be implemented in 2 KB units. However, actual disk access for reading is implemented by reading out the ECC block including the data of 2 KB to be read and discarding unnecessary portion.

For recording of 2 KB data, 30 KB of dummy data may be added, if some data has been written already, the written data should be once read out to replace the data to be modified and then the modified data is recorded onto the disk. In this way, it is necessary to be aware of ECC blocks to implement the high-speed disk access.

Object ID (FIGS. 5 to 7) is the ID for identifying individual management information. String (FIGS. 5 and 6) is a format representing a character series. Unit N (FIGS. 5 to 7) is a format for managing an integer of N bits with no sign.

Address LUT is the management information for giving information as to the position on the disk to which an access should be made for an arbitrary frame in the MPEG data recorded on the disk. For this access, as the key information for designating an arbitrary frame the time information (time stamp) of the frame is used.

Specifically, the Presentation Time PT (to be abbreviated as 'PT' hereinbelow) corresponding to an arbitrary frame is used to give the positions of the front ends (FIG. 3) of the VU and EU including the frame and the positions, on the disk, where data of the I-pictures and P-pictures within the VU has been recorded. When the stream has PRUs therein, the position on the disk where the PRU in the EU containing the VU starts is also determined by PT.

It should be noted that the PT used here is information of 4 bytes of data, which has been attached to the MPEG stream or which is the corresponding PTS from which the most significant bit is removed.

Figure 3:
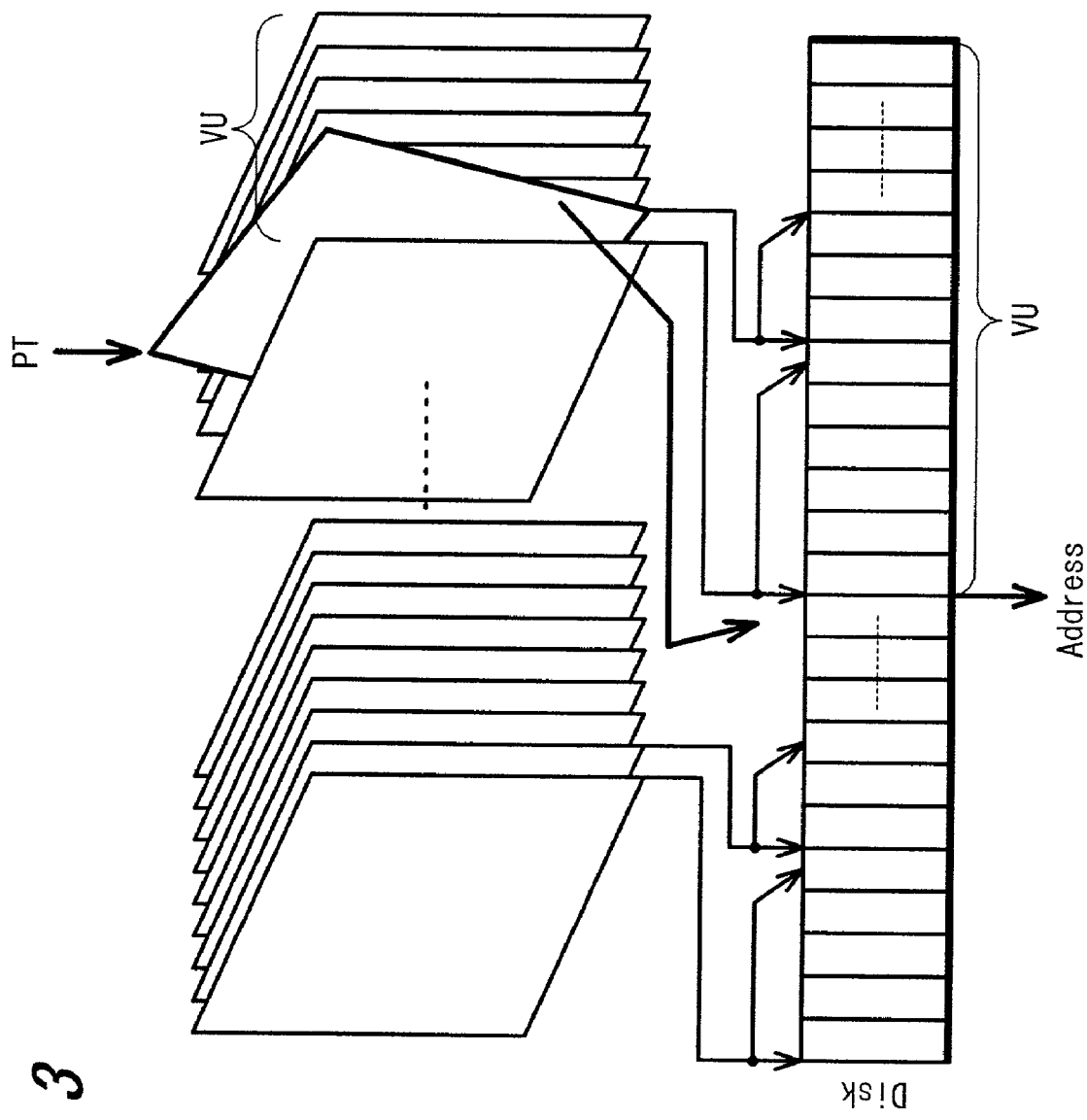
FIG. 3 is an illustrative view showing the start address of a VU offered by an Address LUT in order to have access to a target frame, in the first embodiment of a recording media management system of the present invention.

As shown in FIG. 3, in order to make an access to a target frame, the start address of the VU including that frame is given instead of locating the data of the frame on the disk. This is because in view of MPEG characteristics, the target frame, which is even in the VU, cannot be decoded if reference data such as I-pictures and P-pictures existing in that VU is not obtained.

As an example, if an access needs to be made to the tenth frame of the video data recorded on the disk, the PT for designating the tenth frame is given as 3003×10=30030.

Here, 3003 is the PT-value, represented in decimal, corresponding to the presentation time of one frame, when NTSC video is encoded by the MPEG. That is, 30030 serves as the key information for locating the recorded position on the disk using Address LUT.

As another example, when one VU has fifteen video frames, the total presentation time of one VU amounts to 15×3003=45045. If the frame wanted to be seen is the one-hundredth frame from the top frame, the VU number to which the frame belongs is (100×3030)/45045+1=7.67. From this calculation, the one-hundredth frame of video is known to be included in the seventh VU from the front. That is, it is understood that the management information of the seventh VU should be referred to.

Next, description will be made of under what situation Address LUT may be used. A section of MPEG data recorded by the user from its recording start 'Rec Start' to recording stop 'Rec Stop' or to temporary stop 'Pause' is defined as one EUS.

Figure 4:
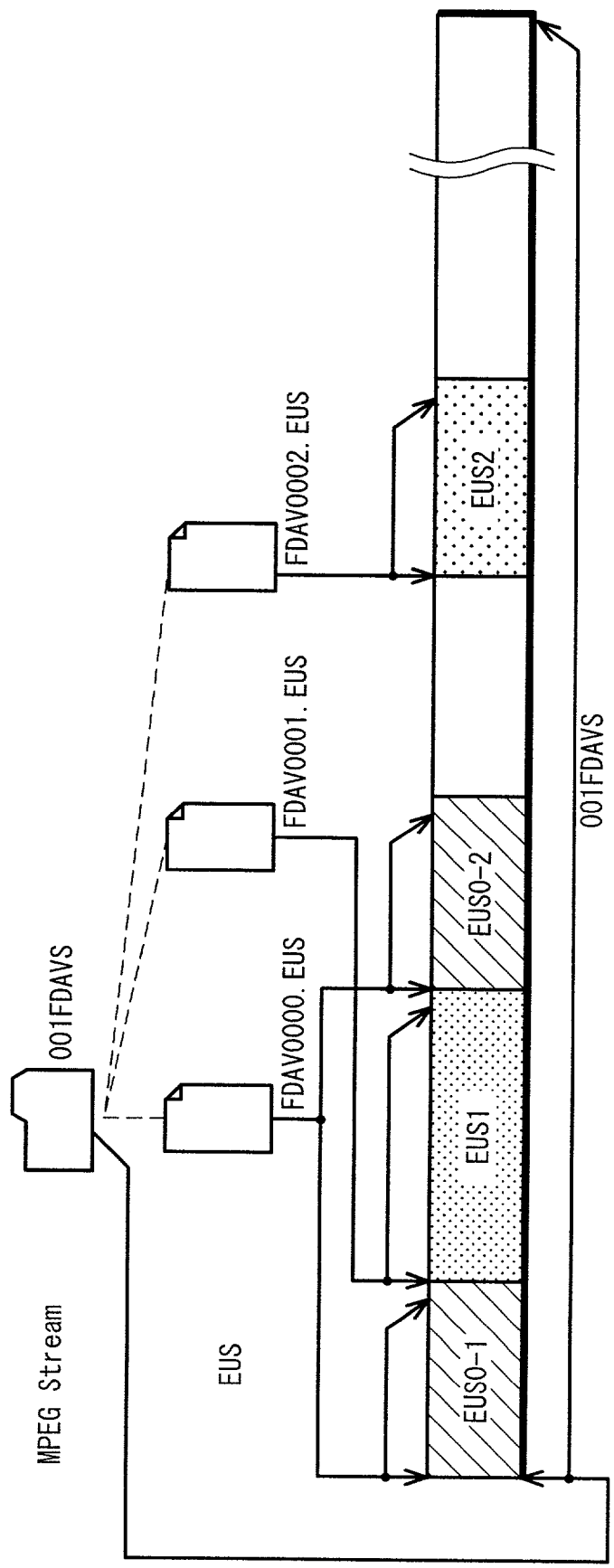
FIG. 4 is an illustrative view showing an EUS managed as a file by a logical filesystem in the first embodiment of a recording media management system of the present invention.

It is assumed that actual MPEG data is handled by EUS unit files, using a logical filesystem which manages the positional information of data on the disk by file names. This configuration is shown in FIG. 4. In this example, EUS0 is managed as a file name of FDAV0000.EUS by the logical filesystem.

Though this file name FDAV0000.EUS represents one EUS, on the actual disk, the data has been recorded in parts as file names EUS0–1 and EUS0–2, as shown in the figure. Similarly, EUS1 and EUS2 are managed as file names FDAV0001. EUS and FDAV0002.EUS, respectively.

To manage actual EUS data in EUS units, management information called 'EUS Information' is created. That is, if the user recorded multiple scenes, each corresponding to data from recording start 'Rec Start' to recording stop 'Rec Stop', the same amount of management information 'EUS Information' (to be abbreviated as 'EUS Information' hereinbelow) is also created.

One example of EUS Information is shown in FIG. 5. EUS Information is to manage an EUS recorded on the disk. As shown in the field name column in FIG. 5, this EUS Information has its ID for distinction, size, title information, creation date and updated date of the EUS, text information, thumbnail information for managing a representative thumbnail of the EUS, data ID for identifying the EUS file managed by the logical filesystem, data file size representing the data size of the EUS, property information such as EUS, video, audio, camera, post recording, source, copyright, still picture, etc.

The EUS information also has reference information which reveals the programs which refer to the EUS managed thereby. Further, as the management information of importance, field names <Start PT>, <End PT>, <Post Recording Unit Size> and <Address LUT> can be mentioned. Hereinbelow, management information is represented by its field name enclosed by < >.

Recorded into <Start PT> and <End PT> are PTS values, attached to the first and last display frames of the data stream of the EUS managed by this EUS Information, or the corresponding PTS value, converted in PT format. Since one EUS always manages video data having continuous time stamps, the total presentation time of the EUS can be calculated by subtracting <Start PT> from <End PT>, for example.

<Post Recording Unit Size> is the information as to the size of the PRU in each EU. It should be noted that the size of the PRU in each EU does not vary within the same EUS. <Address LUT> is the management information which provides where on the disk an access should be made to for an arbitrary frame in the MPEG data recorded on the disk.

In the above way, based on the EUS Information, it is possible to obtain the information as to an EUS recorded as a file on the disk.

When the MPEG data recorded by the user is played back serially from the top in the recorded order, it is possible to perform playback without the aforementioned <Address LUT>. However, if, taking advantage of random accessibility of the disk, for example, the user tries to select an arbitrary number of arbitrary sections from EUSs which are the original data in its recorded state and reproduce in an arbitrary order, the management information of <Address LUT> will be needed.

First, the management information for selecting an arbitrary number of arbitrary sections from one EUS as original data and reproducing the selected sections in an arbitrary order is assumed to be a program. This program manages the information for designating the EUS to be referenced to and start points and end points of arbitrary sections wanted to be selected from the data of that EUS.

FIG. 6 shows one example of the management information of the program. As shown in FIG. 6, managed in a program is information including the ID for identifying the program, size, title, creation date, text information, representative thumbnail of the program and the like.

The information of importance related to the aforementioned <Address LUT> is the information of <Number of EUS Stream Information> and <EUS Stream Information>. The information of <Number of EUS Stream Information> represents the number of scenes handled by this program. That is, an identical number of EUS Stream Information is recorded.

As shown in FIG. 7, the management information <EUS Stream Information> manages <Referenced EUS ID> for managing the ID number of the management information <EUS Information> to which this scene refers, and <Start PT> and <End PT> indicating the selected EUS portion being referenced. The <Start PT> and <End PT> are recorded by values, attached to the referenced EUS or corresponding values, represented in an absolute PT system. Further, the EUS Stream Information can also manage the text information for this scene and a representative thumbnail of the scene.

The program can be used to manage a plurality of sets of the information for designating EUSs and information as to start and end points thereof, whereby it becomes possible to select an arbitrary number of arbitrary sections and play them back in an arbitrary order.

Figure 8:
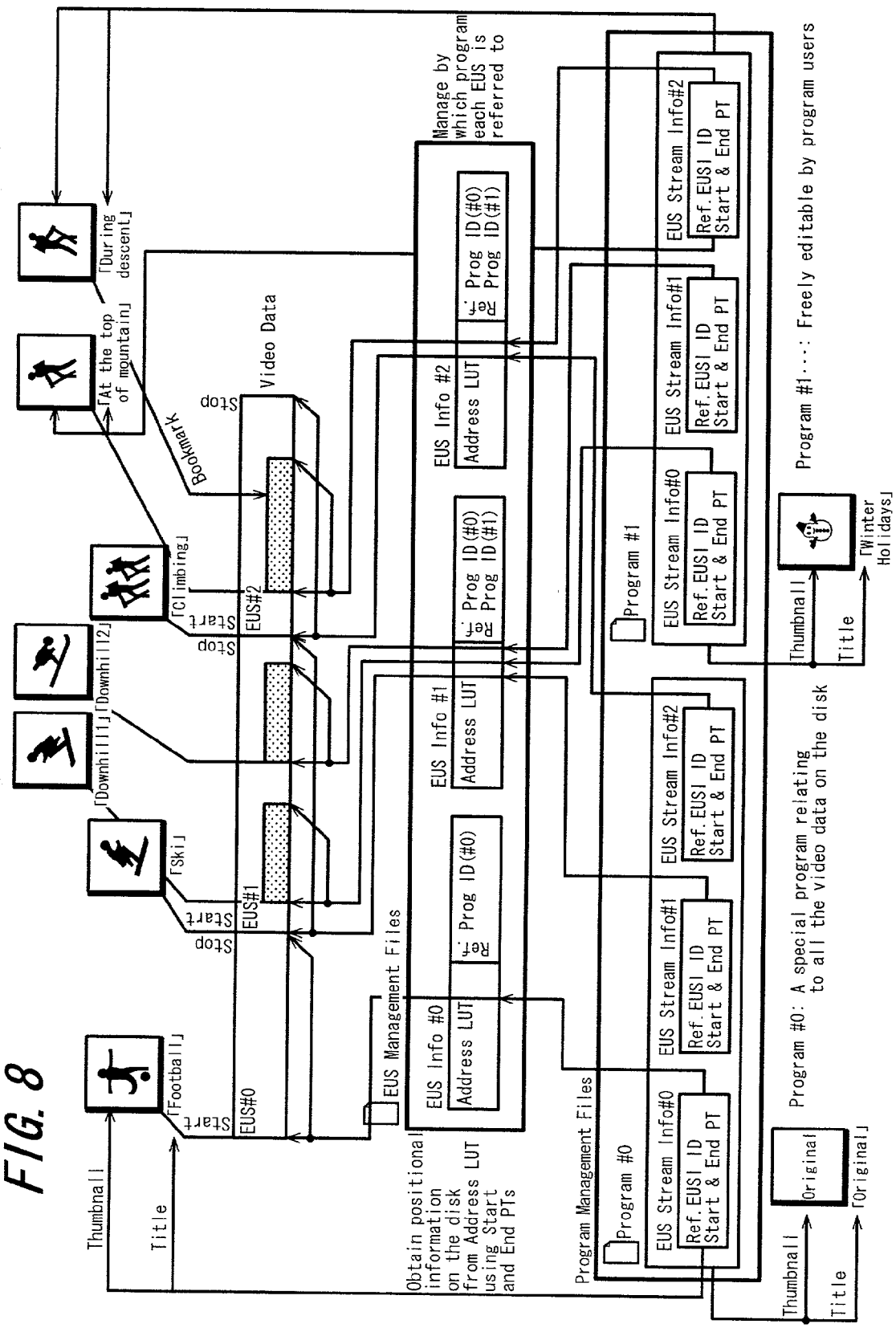
FIG. 8 is an illustrative view showing the relationship between EUS Information and EUSs in the first embodiment of a recording media management system of the present invention.

FIG. 8 shows the relationship between <EUS Information> and EUSs (actual data). As shown in FIG. 8, <Program #0> is a special program which corresponds to the entire video data on the disk and handled as the original program. In one word, this program permits the recorded entire video scenes to be viewed in the order recorded.

The <Program #1> and downwards are freely editable programs which are created by the user and will be called user programs. <Program #1> in the example of the drawing manages three scenes. The first and second scenes are parts selected from <EUS#1> and the third scene is part selected from <EUS#2>.

As above, in a user program, an arbitrary section from an arbitrary EUS can be selected as a scene. This is why the management information <Address LUT> becomes needed as stated above to reproduce the selected scenes.

The way the user program is created by only management information without implementing duplication of actual data is called non-destructive edit. Since an arbitrary number of arbitrary sections are selected from the base material, i.e., original data, to perform playback in a desired order, this method does not need to use extra disk area, hence is markedly efficient.

Next, referring to FIGS. 9 through 18, the first example of the recording media management system of the present invention will be described taking a case of calculating the start addresses of the PRU and VU in the aforementioned MPEG stream and then determining the start address of the EU.

Figure 11:
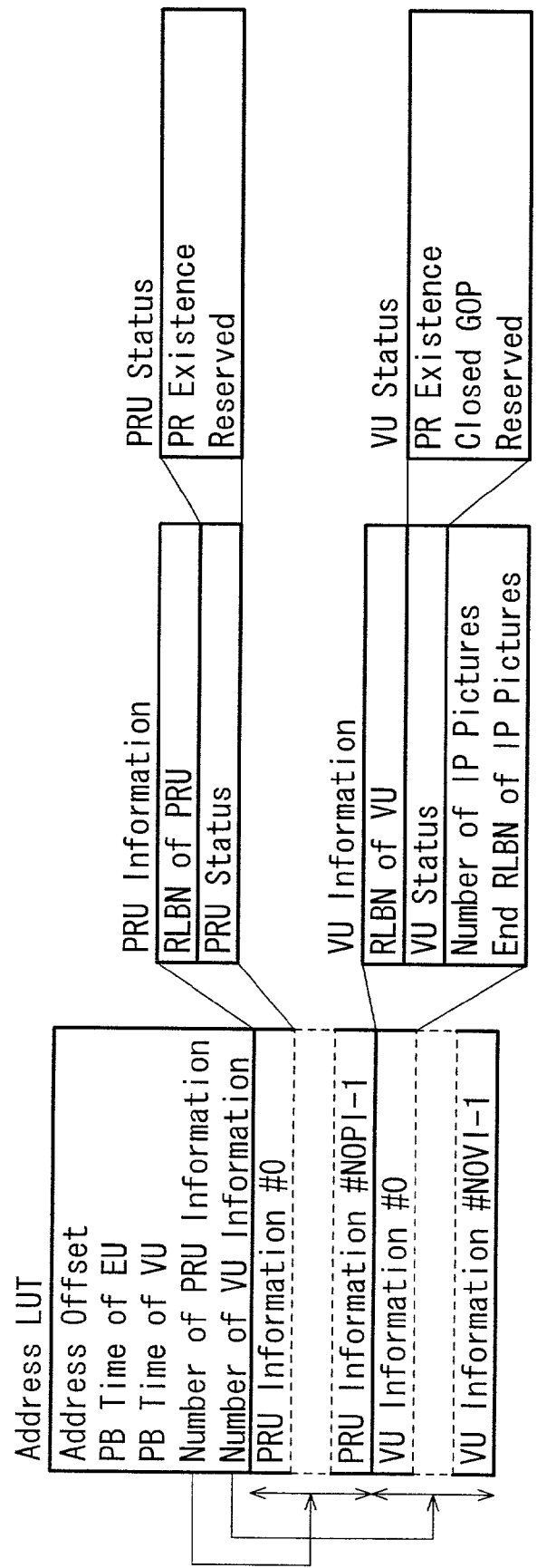
FIG. 11 is an illustrative view showing the scheme of an Address LUT in the first example of the recording media management system of the present invention.

To begin with, the layout of the PRU will be described. When the MPEG stream has PRUs therein, there is a possibility that the user may have implemented post recording. Therefore, when there exist PRUs, whether or not the PRUs have been used should be checked using aftermentioned <PRU Status> or <PR Existence> in <VU Status> (FIGS. 11, 13 and 14).

The information <PR Existence> in <PRU Status> of <PRU Information> is the management information showing whether post recording has been implemented in the associated EU. The information <PR Existence> in <VU Status> of <VU Information> is the management information showing whether there exists post recording data corresponding to the managed VU(FIG. 11). Depending on the aim it is possible to use either <PR Existence> of <PRU Status> or that of <VU Status> only.

When a piece of post recording data exists and needs to be reproduced, it is necessary to read the post recording data before hand prior to access to the target VU, then reproduce the read, post recording data in synchronization with the video when the video data is displayed.

In this way, use of the <PR Existence> information (FIG. 11) makes it possible to grasp beforehand whether or not post recording has been made, hence it is possible to eliminate unnecessary disk access because no access to PRU beforehand needs to be made when no post recording has been made.

Figure 9:
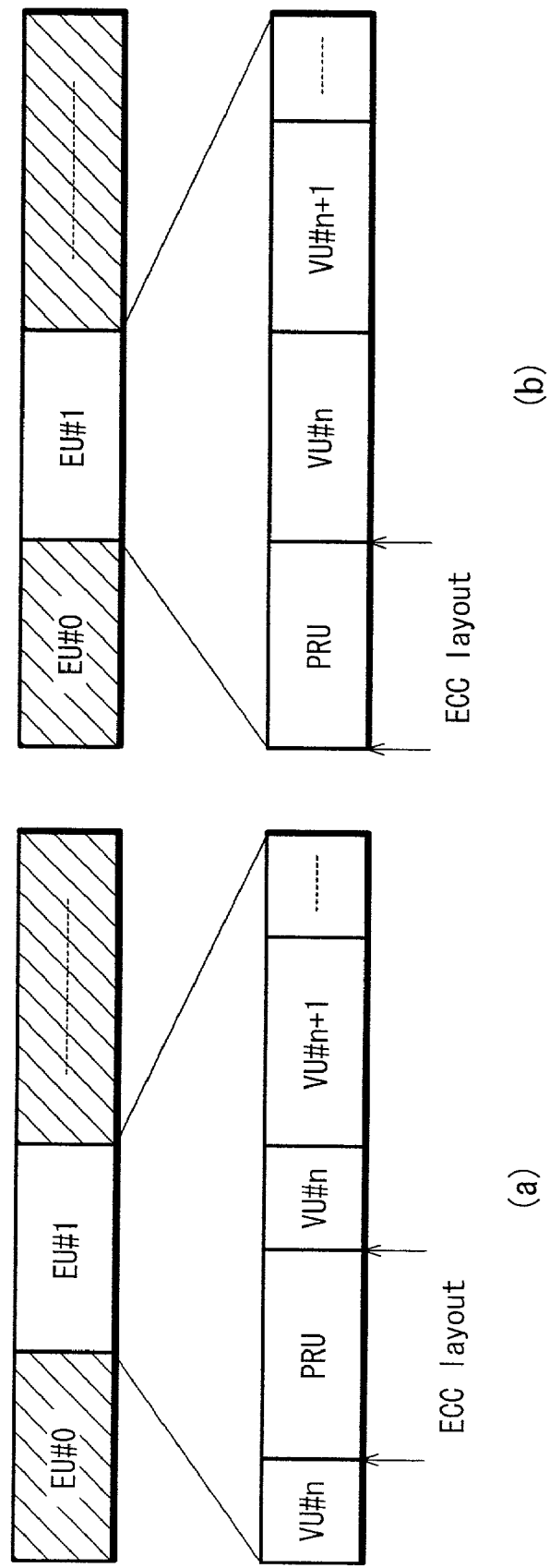
FIG. 9 is an illustrative view showing a PRU layout when no EU Header is present in the MPEG stream, in the first example of the recording media management system of the present invention.
Figure 10:
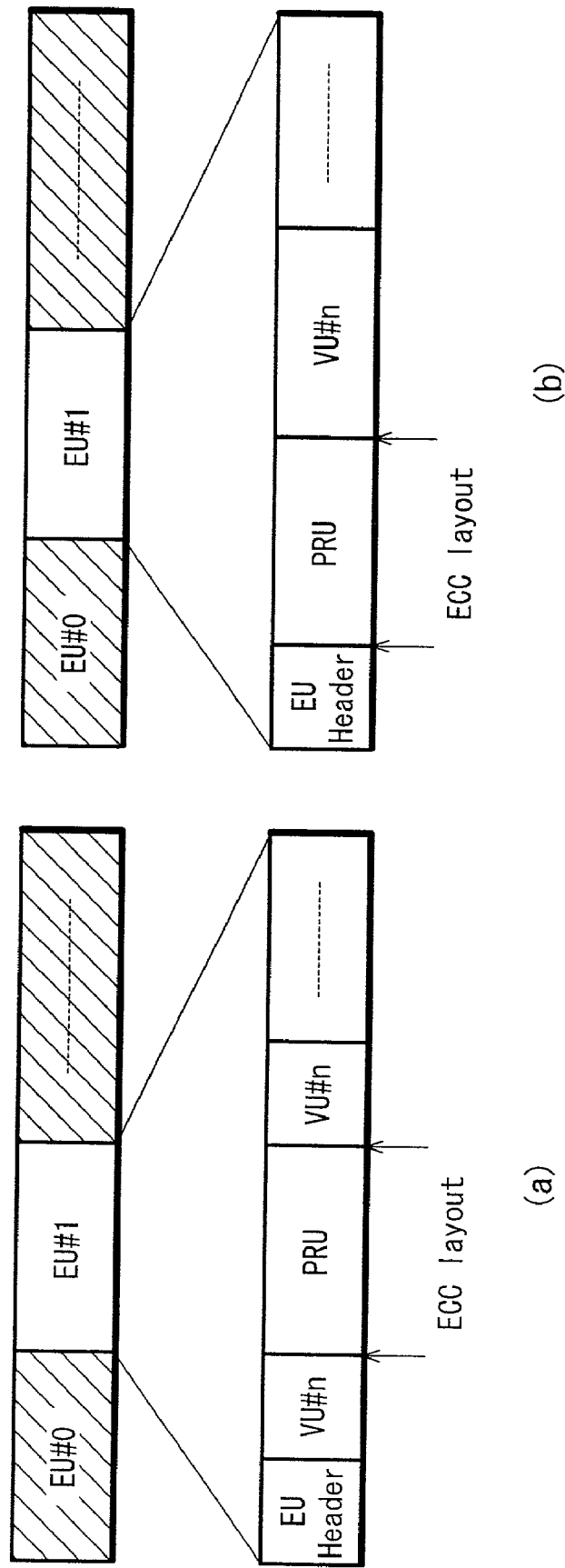
FIG. 10 is an illustrative view showing a PRU layout when an EU Header is present in the MPEG stream, in the first example of the recording media management system of the present invention.

As shown in FIGS. 9 and 10, there are two types of PRU layout on the disk, depending on the data geometry on the disk. This is attributed to the constraint that PRU should be aligned with an ECC boundary. That is, if the front of the EU happens to coincide with an ECC boundary, the PRU is disposed at the front of the EU, as shown in FIG. 9(b).

On the other hand, when the front of the EU does not fall at an ECC boundary, the PRU is positioned to start from the ECC boundary that appears first from the front of the EU, as shown in FIG. 9(a). From the front end of the EU to the ECC boundary or the starting point of the PRU, part of the first VU in the EU is arranged.

In the case where the EU has <EU Header> defined at the front thereof, if the end of <EU Header> happens to coincide with an ECC boundary, the PRU is disposed immediately after the <EU Header> as shown in FIG. 10(b), because of the constraint that PRU should be aligned with an ECC boundary.

When the end of <EU Header> does not coincide with an ECC boundary, the PRU is positioned to start from the ECC boundary that appears first after the <EU Header>, as shown in FIG. 10(a).

From the end of the <EU Header> to the starting point of the PRU, part of the first VU in the EU is arranged. The start address on the disk of the recorded PRU can be obtained from the information <RLBN of PRU> of <PRU Information>.

FIG. 11 shows the content in <Address LUT> (FIG. 5). The definitions of the management information in FIG. 11 will be described consecutively hereinbelow. FIGS. 12 through 16 show the details of the management information in FIG. 11.

In the figures, <Address Offset> stores an offset value for creating relative logical block numbers (RLBN) managed by the <address LUT>, in Unit 32 format. When an arbitrary number of EUs have been deleted from the front of the EUS, the number of the deleted logical blocks is set into this field.

Accordingly, when referring to a relative logical block number (RLBN) used in <Address LUT>, it is necessary to subtract this <Address Offset> from that value, to refer to the number. The initial value of <Address Offset> has to be set at 0.

<PB Time of EU> represents the set presentation time of each EU in the EUS managed by the <address LUT>. The set presentation time is the playback time of the video data in one EU and is constant in the same EUS, except the last EU in the EUS.

<PB Time of EU> should be recorded in PT Format. Here, the information 'PB Time of EU' should be an integer multiple of the difference in PTS, represented in PT Format, between adjacent video frames in the MPEG stream, i.e., the PTS corresponding to the presentation time per frame.

<PB Time of VU> represents the set presentation time of each VU in the EUS managed by the <address LUT>. The set presentation time is the playback time of the video data in one VU and is constant within the same EUS, except the last VU in the EUS.

<PB Time of VU> should be recorded in PT Format. Here, the information 'PB Time of VU' should be an integer multiple of the difference in PTS, represented in PT Format, between adjacent video frames in the MPEG stream, i.e., the PTS corresponding to the presentation time per frame.

<Number of PRU information> is the number of PRUs existing in the EUS managed by the <address LUT>, recorded in Unit 32 format. Since PRUs exist in one-to-one correspondence to EUs, the value of this field has the same value as the number of the EUs existing in the EUS. If there is no PRU existing in the stream configuration, this field should be always set at 0.

<Number of VU Information> is the number of VUs existing in the EUS managed by the <address LUT>, recorded in Unit 32 format.

<PRU Information> manages the information as to each PRU in the EUS, in the manner as shown in FIG. 13. When there exists no PRU, the above <Number of PRU Information> is recorded with 0 and no record is written into <PRU Information>.

<RLBN of PRU> (FIG. 13) represents the start address on the disk of the PRU managed by this <PRU Information>. Here, the address is represented by the relative logical block number from the front of the EUS. <RLBN of PRU> should be recorded in Unit 24 format. <PRU Status> manages the state of the PRU managed by this <PRU Information>, in the manner as shown in FIG. 14.

<PR Existence> (Bit0) (FIG. 14) is recorded with '1' when the PRU managed by this <PRU Information> (FIG. 13) has post recording data and is recorded with '0' when no post recording data is present. When the presence of post recording data is managed in VU units, this field may not be used.

<VU Information> (FIG. 12) manages the information as to each VU in the EUS, in the manner as shown in FIG. 15(a) or FIG. 15(b). It should be noted that in FIG. 15(a) the positional information of the video frames managed within the VU is given as either the start address or end address while in FIG. 15(b) the positional information is given as both the start address and the end address.

<RLBN of VU> (FIG. 15) represents the start address on the disk of the VU managed by this <VU Information> (FIG. 12). This address is represented by the relative logical block number from the front of the EUS. <RLBN of VU> should be recorded in Unit 24 format.

<VU Status> (FIG. 15) manages the state of the VU managed by this <VU Information> (FIGS. 12 and 15), in the manner as shown in FIG. 16(a) or FIG. 16(b). FIG. 16(a) shows a case where <Non Contiguous Point> is defined and FIG. 16(b) shows a case where <Non Contiguous Point> is not defined.

<PR Existence> (Bit0) (FIG. 16) is recorded with '1' when post recording data corresponding to the VU managed by this <VU Information> (FIGS. 12 and 15) is present and is recorded with '0' when no post recording data is present. If there exists no PRU in the EU, this field should be always recorded with '0'. When post recording (audio dubbing) is performed only in EU units, <PR Existence> in the aforementioned <PRU Status> can be used alone while this field may not be used.

<Closed GOP> (Bit1) (FIG. 16) manages whether the first GOP in the VU is a closed GOP. If the GOP is a closed one, this field is recorded with '1'. Otherwise, it is recorded with '0'. When the GOP is not a closed one, there is a possibility that some of the first frames of video cannot be decoded without information of the previous GOP.

<Non Contiguous Point> (Bit2) manages whether the EU to which the VU managed by this <VU Information> belongs is arranged on the disk logically and contiguously with the previous EU. When they are arranged contiguously, this field is recorded with '0'. When they are not arranged contiguously, the field is recorded with '1'.

<Number of IP Pictures> (FIG. 15) records the number of the positional information of I-pictures and P-pictures in the video data to be managed by this <VU Information> (FIG. 12), in Unit8 format.

<End RLBN of IP Pictures> (FIG. 15(a)) manages the end addresses on the disk of the I-pictures and P-pictures in the VU managed by this <VU Information>. The address herein is represented by the relative logical block number from the front of the VU.

As the first entry the address information as to the first I-picture in the VU should be stored. As the second entry and downward, the address information as to I-pictures and/or P-pictures should be stored in Unit16 format.

In connection with this, when a semiconductor memory having high-speed access performance is adopted as the recording medium or when a disk drive having markedly high-access performance is used, the start addresses should be also given as the positional information of the reference pictures, in addition to their end addresses. In this case, the field name of this item is renamed as <RLBN of IP Pictures> and both the start and end addresses should be recorded serially in Unit16 format.

It is also possible to put the positional information of all the video frames under control, instead of the addresses of the reference pictures only. The positional information in this case should be represented by the record start position of each video frame on the disk. The amount of data of each frame and the end address can be calculated simply using the difference from the start address of the next frame.

All the above is the management information of management information 'Address LUT'.

Next, specific usage of these pieces of management information will be described with reference to FIGS. 17 and 18.

Referring first to FIGS. 17(a) and 17(b), description will be made of how to calculate the start address of the VU including a target frame. When start of playback is wanted from a frame corresponding to an arbitrary PT in an EUS, the starting position on the disk of the VU including that frame should be calculated based on <Address LUT>.

The basic processing sequence for this will be as follows. FIG. 17(a) shows a case without <EU Header> and FIG. 17(b) shows a case with <EU Header>.

(1) Relative PT (Relative PT: RPT) is calculated by the following equation, that is, by subtracting <Start PT> (FIG. 5) corresponding to the first display frame in the EUS from the target PT (FIG. 17). <Start PT> is a PTS value, attached to the MPEG stream at the first display frame in the EUS, or the corresponding PTS value, converted in PT format.

RPT=PT−Start PT

As stated above, since the information as to the start point and end point, which is designated from each user program so as to select an arbitrary section, is represented by values, attached to the stream or corresponding values, represented in an absolute PT system, subtraction of <Start PT> from the values will provide relative time information from the front of the EUS.

Here, the fact that absolute time information is used in user programs means that if, for example, some part in the front part of the EUS was deleted, there is no need to renew the start point and end point information of all the user programs which refer to this EUS as the reference information as long as the information <Start PT> in <EUS Information> (FIG. 5) is altered, thus making it possible to reduce the process load.

(2) <VU Information Number> (FIG. 11) of the VU including the frame from which the start of playback is wanted is obtained by dividing the relative PT (RPT) by the set presentation time (<PB Time of VU> (FIGS. 12 and 17) of each VU in the EUS. In FIG. 17(a) this value is VU#7, and in FIG. 17(b) this value is VU#5.

VU Info Num=$ip$(RPT/PB Time of VU), where ip(n) is a function that produces the maximum integer not greater than n.

Figure 17:
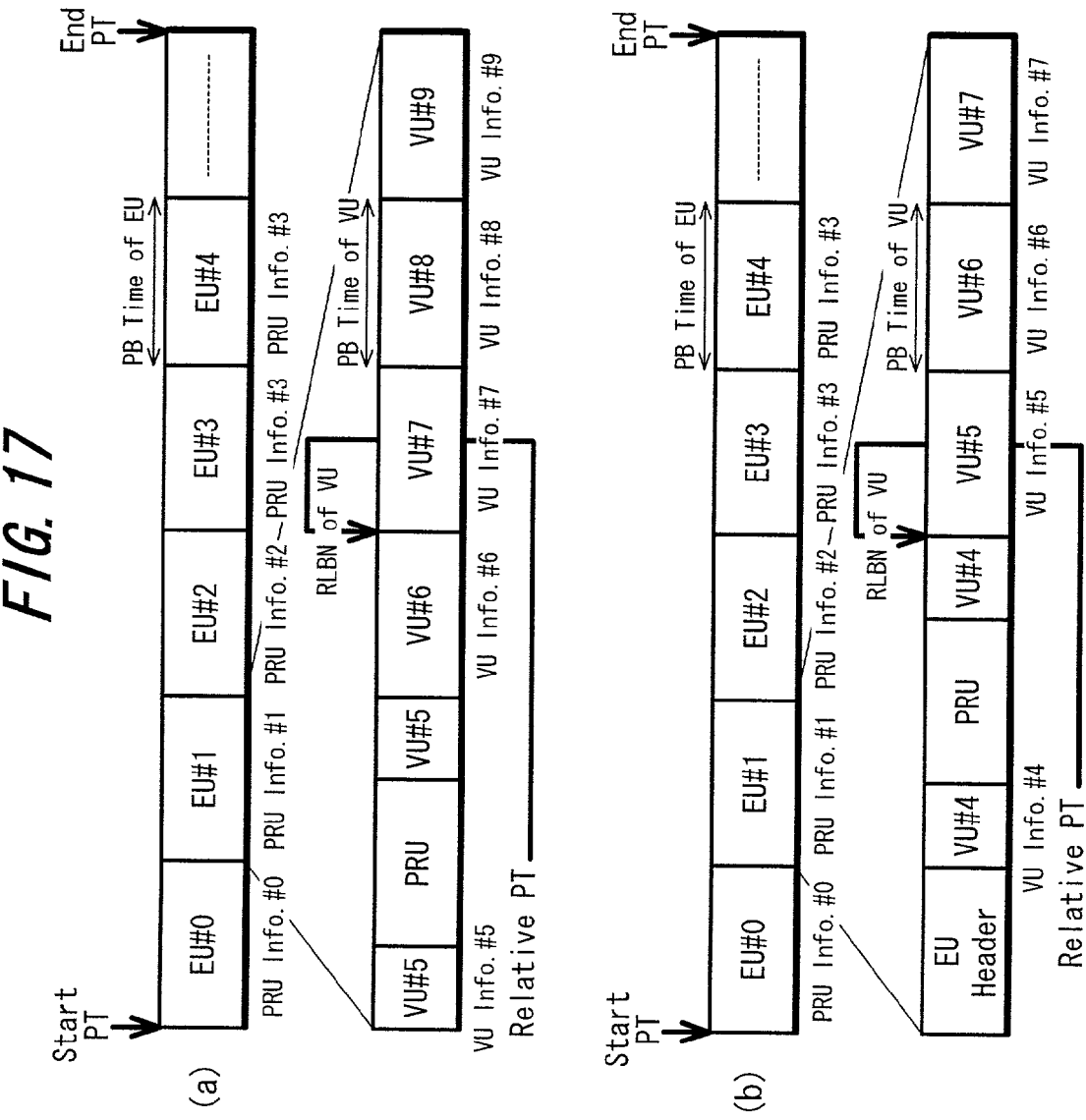
FIG. 17 is an illustrative view showing a method of calculating the start address of a VU in the first example of the recording media management system of the present invention.
Figure 18:
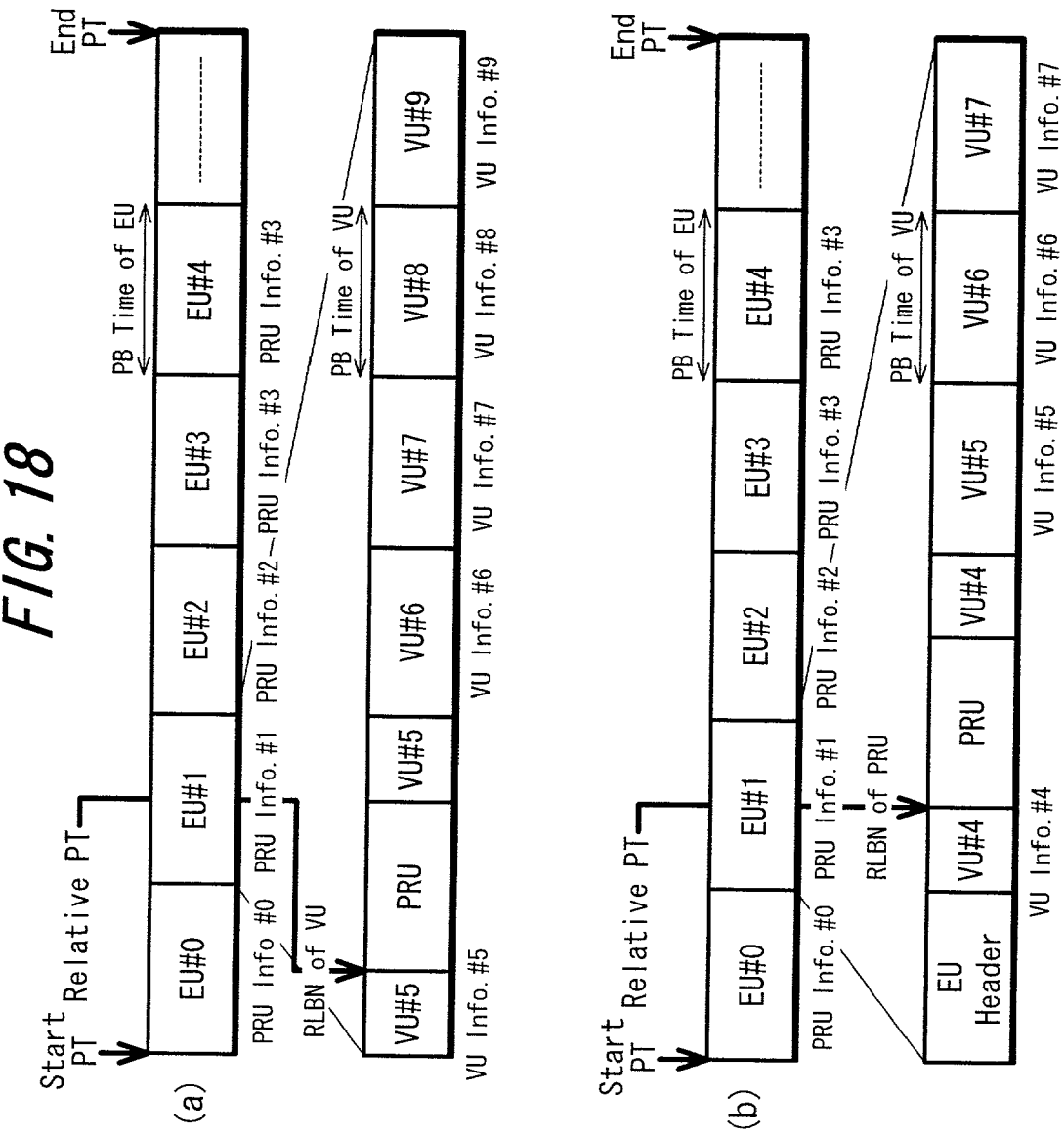
FIG. 18 is an illustrative view showing a method of calculating the start address of a PRU in the first example of the recording media management system of the present invention.

(3) From the obtained <VU Information Number> (FIG. 11), the start address of the VU including the target frame is obtained as the relative logical block number 'RLBN of VU' (FIG. 11) from the front of EUS (FIG. 17).

RLBN of VU'=RLBN of VU(VU Info Num), where expression RLBN of VU(n) represents the value of <RLBN of VU> (FIG. 11) of the nth <VU Information>.

In the above way, the start address of the VU including a target frame can be determined by simple calculation using <Address LUT>, instead of searching or other operations.

Next, referring to FIG. 18, description will be made of how to calculate the start address of the PRU in the EU including a target frame. The basic sequence of calculating the start address of the PRU in the EU including the target frame will be as follows. FIG. 18(a) shows a case with no <EU Header> and FIG. 18(b) shows a case with <EU Header>.

The frontmost end of the PRU is a point which needs to be accessed when post recording data corresponding to the target frame is present.

(1) Relative PT (Relative PT: RPT) is calculated by subtracting <Start PT> (FIGS. 5 and 18) corresponding to the first display frame in the EUS from the target PT.

RPT=PT−Start PT (2) The number of the EU including the frame from which the start of playback is wanted is obtained by dividing the relative PT (RPT) by the set presentation time (<PB Time of EU> in FIGS. 12 and 18) of each EU in the EUS. In FIG. 18 this value is EU#1. Since each EU corresponds to one PRU, this EU number #1 directly represents <PRU Information Number> (FIG. 11).

PRU Info Num=$ip$(RPT/PB Time of EU), where ip(n) is a function that produces the maximum integer not greater than n.

(3) From the obtained <PRU Information Number> (FIG. 11), the start address of the PRU in the EU including the target frame is obtained as the relative logical block number 'RLBN of PRU'' (FIGS. 11 and 18) from the front of EUS.

RLBN of PRU'=RLBN of PRU(PRU Info Num).

In the above way, similarly to the way of determining the VU start address, the start address of the PRU to be reproduced in synchronization with the VU including a target frame can be determined by simple calculation using <Address LUT>, instead of searching or other operations.

Next, description will be made of how to calculate the start of the EU including a target frame. The frontmost end of the EU including the target frame is equivalent to the frontmost end of the first VU in the EU when the stream has no PRU therein. When PRUs are present in the stream, there are two cases as stated already, depending on the PRU layout (FIG. 9).

(1) When the front of the EU starts from an ECC boundary (FIG. 9(b)), the frontmost end of EU is equivalent to the frontmost end of the PRU.

(2) When the front of the EU does not start from an ECC boundary (FIG. 9(a)), the frontmost end of EU is equivalent to the frontmost end of the first VU included in the EU.

Accordingly, when frontmost end of the EU needs to be determined, by comparing the start address of the PRU in the observed EU with the start address of the first VU included in the EU, the one recorded earlier can be interpreted as the frontmost end of the EU.

Here, <VU Information Number> (FIG. 11) representing the first VU included in the EU is determined by the following equation:

VU Info Num=$ip$(RPT/PB Time of EU)*(PB Time of EU/PB Time of VU), where ip(n) is a function that produces the maximum integer not greater than n.

When the EU has a header defined at its front for managing the EU (FIG. 10), it is possible to determine the frontmost end of the EU by comparing the start address of the PRU in the observed EU with the start address of the first VU included in the EU and subtracting the size of the header from the address of that recorded earlier.

Next, referring to FIGS. 19 through 29, the second example of the recording media management system of the present invention will be described taking a case where the start addresses of the EU and VU in the aforementioned MPEG stream are calculated and then the start address of the PRU is determined.

To begin with, the layout of the PRU will be described. When the MPEG stream has PRUs therein, there is a possibility that the user may have implemented post recording. Therefore, when there exist PRUs, whether or not the PRUs have been used should be checked using aftermentioned <EU Status> or <PR Existence> in <VU Status>.

<PR Existence> in <EU Status> of <EU Information> is the management information showing whether post recording has been implemented in the associated EU. <PR Existence> in <VU Status> of <VU Information> is the management information showing whether there exists post recording data corresponding to the managed VU. Depending on the aim it is possible to use either <PR Existence> of <EU Status> or that of <VU Status> only.

When a piece of post recording data exists and needs to be played back, it is necessary to read the post recording data beforehand prior to access to the target VU.

In this way, use of the <PR Existence> information makes it possible to grasp beforehand whether or not post recording has been made, it is possible to eliminate unnecessary disk access because no access to PRU beforehand needs to be made when no post recording has been made.

Figure 19:
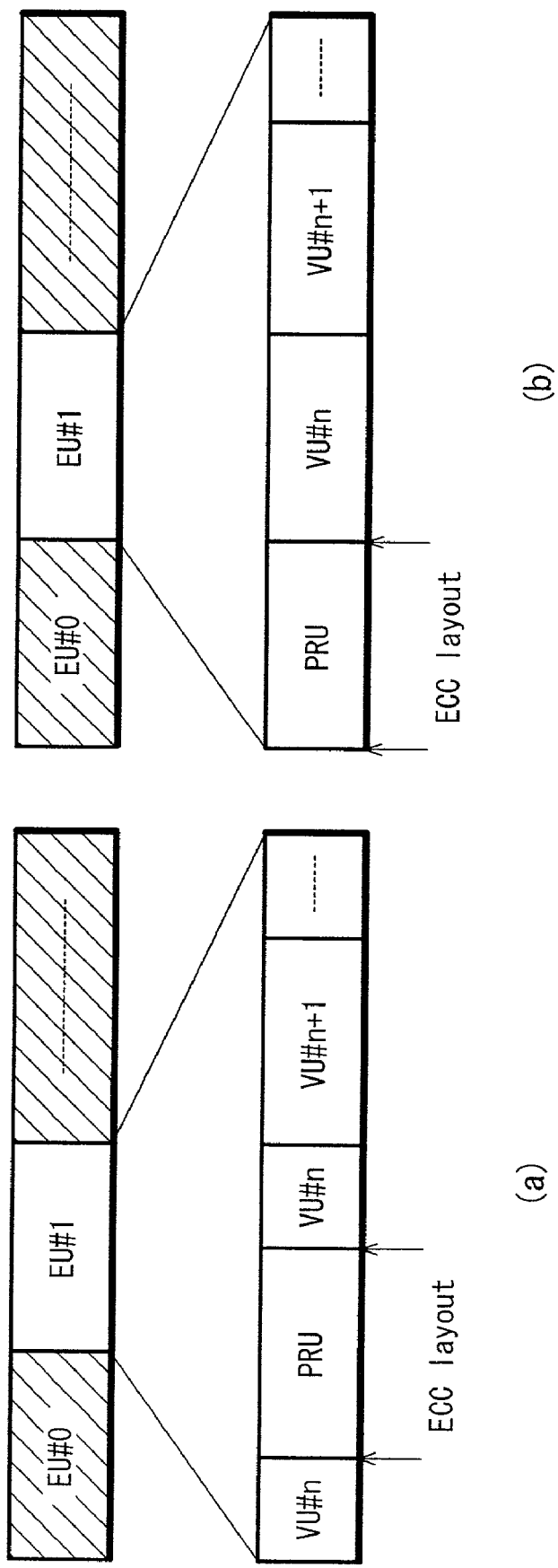
FIG. 19 is an illustrative view showing a PRU layout when no EU Header is present in the MPEG stream, in the second example of the recording media management system of the present invention.
Figure 20:
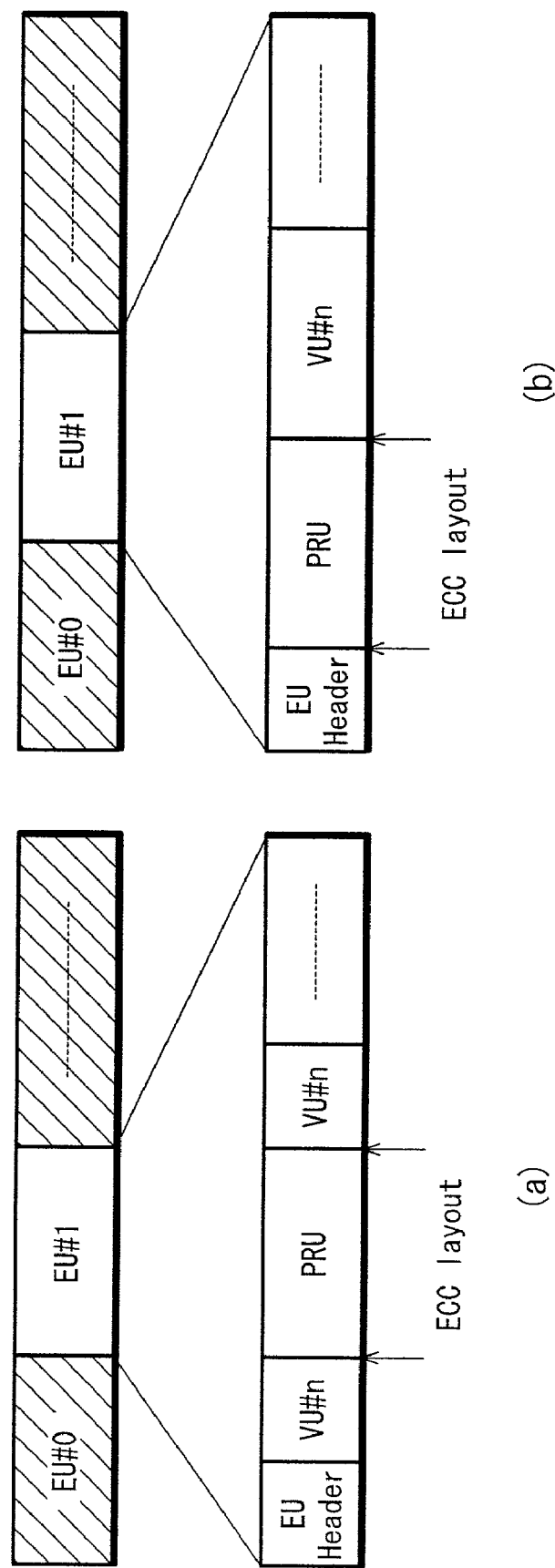
FIG. 20 is an illustrative view showing a PRU arrangement when an EU Header is present in the MPEG stream, in the second example of the recording media management system of the present invention.

As shown in FIGS. 19 and 20, there are two types of PRU layout on the disk, depending on the data geometry on the disk. This is attributed to the constraint that PRU should be aligned with an ECC boundary. That is, if the front of the EU happens to coincide with an ECC boundary, the PRU is disposed at the front of the EU, as shown in FIG. 19(b).

On the other hand, when the front of the EU does not fall at an ECC boundary, the PRU is positioned to start from the ECC boundary that appears first from the front of the EU, in the manner as shown in FIG. 19(a). From the front of the EU to the ECC boundary or the starting point of the PRU, part of the first VU in the EU is arranged.

In the case where the EU has <EU Header> defined in the front thereof, if the end of <EU Header> happens to coincide with an ECC boundary, the PRU is disposed immediately after the <EU Header> as shown in FIG. 20(b), because of the constraint that PRU should be aligned with an ECC boundary.

When the end of <EU Header> does not coincide with an ECC boundary, the PRU is positioned to start from the ECC boundary that appears first after the <EU Header>, as shown in FIG. 20(a). From the end of the <EU Header> to the starting point of the PRU, part of the first VU in the EU is arranged.

Figure 21:
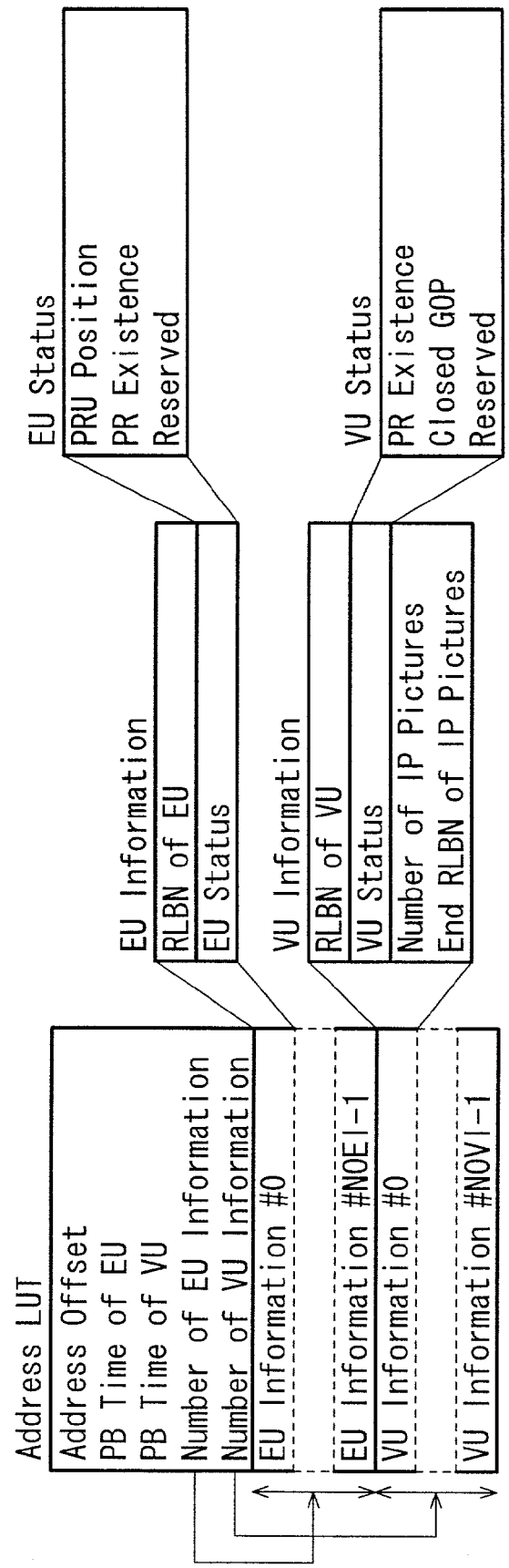
FIG. 21 is an illustrative view showing the scheme of an Address LUT in the second example of the recording media management system of the present invention.

Recorded in <PRU Position> in the <EU Status> shown in FIG. 21 is the distance from the front of the EU to the starting point of the PRU. This distance is represented by the number of logical blocks and is 15 logical blocks at maximum.

FIG. 21 shows the content in <Address LUT> (FIG. 5). The definitions of the management information in FIG. 21 will be described serially hereinbelow. FIGS. 22 through 26 show the details of the management information in FIG. 21.

In the figures, <Address Offset> stores an offset value for creating relative logical block numbers (RLBN) managed by the <address LUT>, in Unit 32 format. When an arbitrary number of EUs have been deleted from the front part of the EUS, the number of the deleted logical blocks is set into this field.

Accordingly, when referring to a relative logical block number (RLBN) used in <Address LUT>, it is necessary to subtract this <Address Offset> from that value, to refer to the number. The initial value of <Address Offset> has to be set at 0.

<PB Time of EU> represents the set presentation time of each EU in the EUS managed by the <address LUT>. The set presentation time is the playback time of video data in one EU and is constant within the same EUS, except the last EU in the EUS.

Further, <PB Time of EU> should be recorded in PT Format. Here, the information 'PB Time of EU' should be an integer multiple of the difference in PTS, represented in PT Format, between adjacent video frames in the MPEG stream, i.e., the PTS corresponding to the presentation time per frame.

<PB Time of VU> represents the set presentation time of each VU in the EUS managed by the <address LUT>. The set presentation time is the playback time of video data in one VU and is constant within the same EUS, except the last VU in the EUS.

<PB Time of VU> should be recorded in PT Format. Here, the information <PB Time of VU> should be an integer multiple of the difference in PTS, represented in PT Format, between adjacent video frames in the MPEG stream, i.e., the PTS corresponding to the presentation time per frame.

<Number of EU Information> is the number of EUs existing in the EUS managed by the <address LUT>, recorded in Unit 32 format. <Number of VU Information> is the number of VUs existing in the EUS managed by the <address LUT>, and recorded in Unit 32 format.

<EU Information> (FIG. 12) manages the information as to each EU in the EUS, in a manner as shown in FIG. 23.

<RLBN of EU> represents the start address on the disk of the EU managed by this <EU Information>. This address is represented by the relative logical block number from the front of the EUS. <RLBN of EU> should be recorded in Unit 24 format.

<EU Status> manages the status of the EU managed by this <EU Information>, in the manner as shown in FIG. 24(a) or FIG. 24(b).

<PRU Position> (Bit0–4) (FIG. 24) records the information as to the position of the PRU in this EU. <PRU Position> represents the starting position of the PRU in the EU by the distance (LBN number) from the front of the EU.

If the PRU is located at the front of the EU, this field is recorded with 0, if not, the distance from the front of EU is recorded by a value ranging from 1 to 16 logical blocks. When no PRU exists within the EU, this field is constantly set at 0.

<PR Existence> (Bit5) (FIG. 24) is recorded with '1' when post recording data corresponding to the EU managed by this <EU Information> is present, and this field is recorded with '0' when no post recording data is present. When no PRU is present in the EU, this field should be always recorded with '0'. When the presence of post recording data is managed for each VU, the above field may not be used.

<Non Contiguous Point> (Bit6) (FIG. 24(b)) manages whether the EU managed by this <EU Information> is arranged on the disk logically and contiguously with the previous EU. When they are arranged contiguously, this field is recorded with '0'. When they are not arranged contiguously, the field is recorded with '1'. This information can be optionally introduced.

<VU Information> (FIG. 22, 22) manages the information as to each VU in the EUS, in the manner as shown in FIG. 25(a) or FIG. 25(b). It should be noted that in FIG. 25(a) the positional information of the video frames managed within this VU is given as either the start address or end address while in FIG. 25(b) the positional information is given as both the start address and the end address.

<RLBN of VU> represents the start address on the disk of the VU managed by this <VU Information>. This address is represented by the relative logical block number from the front of the EUS. <RLBN of VU> should be recorded in Unit 24 format.

<VU Status> manages the state of the VU managed by this <VU Information> in the manner as shown in FIG. 26.

<PR Existence> (Bit0) (FIG. 26) is recorded with '1' when post recording data corresponding to the VU managed by this <VU Information> is present. This field is recorded with '0' when no post recording data is present. If there exists no PRU in the EU, this field should be always recorded with '0'. When post recording is performed only in EU units, <PR Existence> in the aforementioned <PRU Status> (FIG. 24) can be used alone while this field may not be used.

<Closed GOP> (Bit1) (FIG. 26) manages whether the first GOP in the VU is a closed GOP. If the GOP is a closed one, this field is recorded with '1'. Otherwise, it is recorded with '0'. When the GOP is not a closed one, there is a possibility that some of the first frames of video cannot be decoded without information of the previous GOP.

<Number of IP Pictures> (FIG. 25) records the number of the positional information of I-pictures and P-pictures in the video data to be managed by this <VU Information>, in Unit 8 format.

<End RLBN of IP Pictures> (FIG. 25($a$)) manages the end addresses on the disk of the I-pictures and P-pictures in the VU managed by this <VU Information>. The address herein is represented by the relative logical block number from the front of the VU.

As the first entry the address information as to the first I-picture in the VU should be stored. As the second entry and downward, the address information as to I-pictures or P-pictures should be stored in Unit 16 format.

In connection with this, when a semiconductor memory having high-speed access performance is adopted as the recording medium or when a disk drive having markedly high-access performance is used, the start addresses should be also given as the positional information of the reference pictures, in addition to their end addresses. In this case, the field name of this item is renamed as <RLBN of IP Pictures> and both the start address and end address should be recorded serially in Unit 16 format.

It is also possible to manage the positional information of all the video frames, instead of the addresses of the reference pictures only. The positional information in this case should be represented by the record start position of each video frame on the disk. The amount of data of each frame and the end address can be calculated simply using the difference from the start address of the next frame.

All the above is the management information in <Address LUT> (FIGS. 5 and 21). Next, specific usage of these pieces of management information will be described with reference to FIGS. 27 to 29.

First, description will be made of how to calculate the start address of the VU including a target frame.

When playback is desired to be started from a frame corresponding to an arbitrary PT in an EUS, the starting position on the disk of the VU including this frame should be determined based on <Address LUT>.

Figure 27:
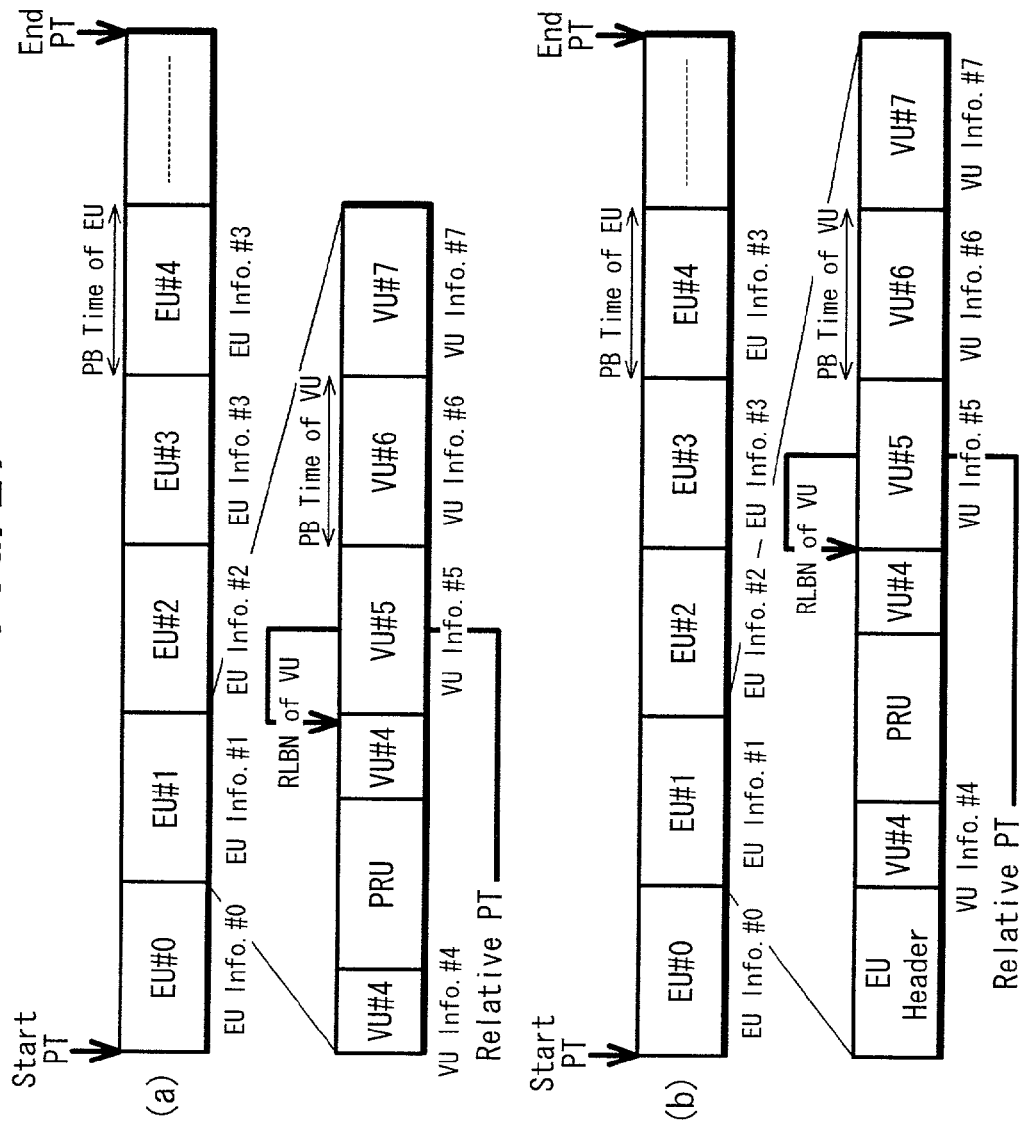
FIG. 27 is an illustrative view showing a method of calculating the start address of a VU in the second example of the recording media management system of the present invention.

The basic processing sequence for this will be as follows. FIG. 27($a$) shows a case with no <EU Header> and FIG. 27($b$) shows a case with <EU Header>.

(1) Relative PT (RPT) is calculated by the following equation, that is, by subtracting <Start PT> (FIGS. 5 and 27) corresponding to the first display frame in the EUS from the target PT.

$$RPT=PT-Start\ PT$$

As stated above, since the information as to the start point and end point, which is designated from each user program so as to select an arbitrary section, is represented by values, attached to the stream or corresponding values, represented in an absolute PT system, subtraction of <Start PT> from that values will provide relative time information from the front of the EUS.

Here, the fact that absolute time information is used in user programs means that if, for example, some part in the front part of the EUS was deleted, there is no need to renew the start point and end point information of all the user programs which refer to this EUS as the reference information as long as the information <Start PT> in <EUS Information> (FIG. 5) is modified, thus making it possible to reduce the process load.

(2) Next, <VU Information Number> (FIG. 21) of the VU including the frame from which the start of playback is desired is obtained by dividing the relative PT (RPT) determined by the following equation by the set presentation time (<PB Time of VU> (FIGS. 20 and 27)) of each VU in the EUS. In FIG. 27($a$) this value is 'VU info #5'.

$$VU\ Info\ Num=ip(RPT/PB\ Time\ of\ VU),$$

where ip(n) is a function that produces the maximum integer not greater than n.

(3) From the obtained <VU Information Number>, i.e., the fifth VU in FIG. 27, the start address of the VU including the target frame is obtained as the relative logical block number 'RLBN of VU'' (FIGS. 21, 25 and 27) from the front of EUS.

$$RLBN\ of\ VU'=RLBN\ of\ VU(VU\ Info\ Num),$$

where RLBN of VU(n) represents the value of 'RLBN of VU' of the nth 'VU Information'.

In the above way, the start address of the VU including a target frame can be determined by simple calculation using <Address LUT>, instead of searching or other operations.

Figure 28:
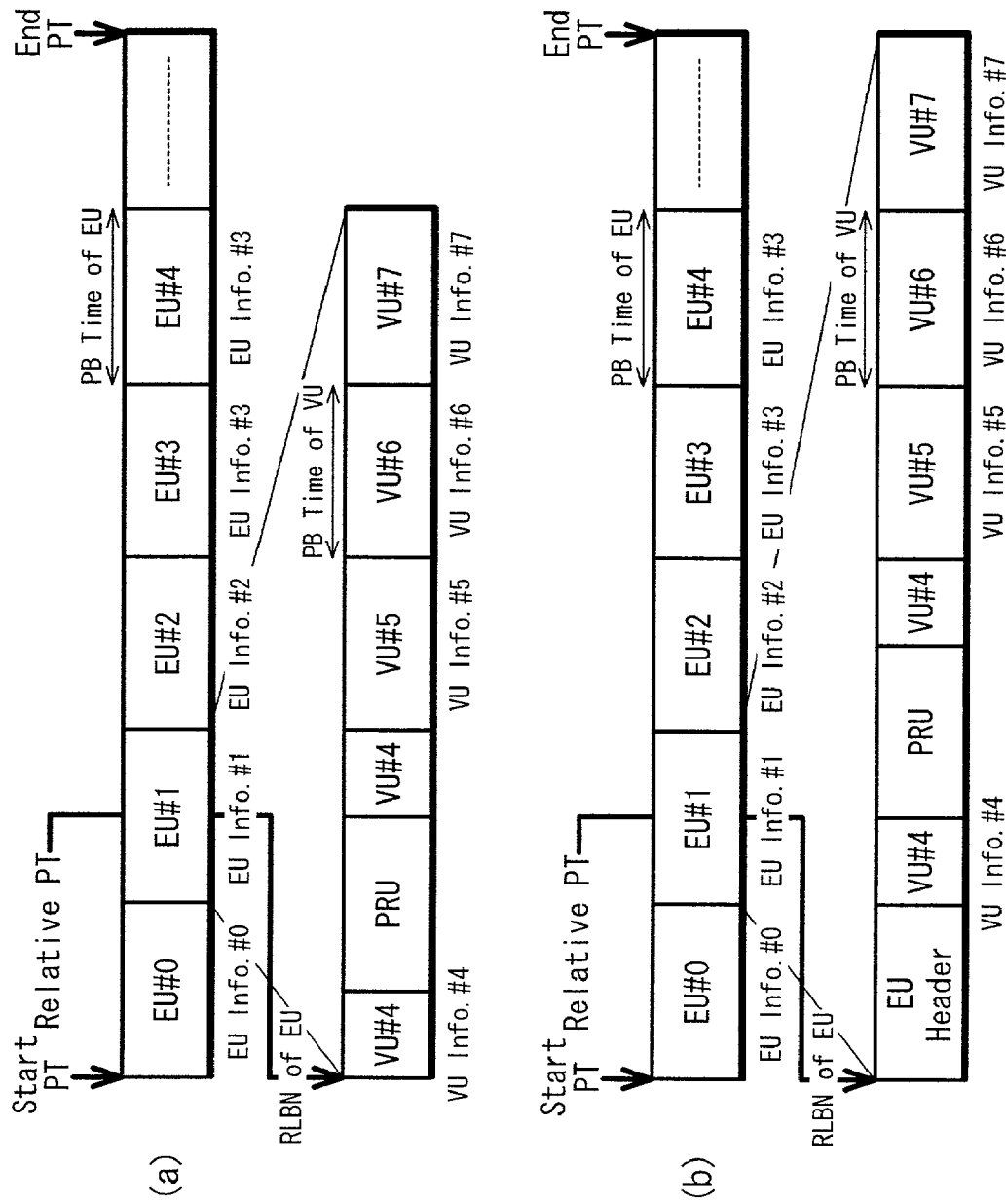
FIG. 28 is an illustrative view showing a method of calculating the start address of an EU in the second example of the recording media management system of the present invention.

Next, referring to FIG. 28, description will be made of how to calculate the start address of the EU including a target frame. The basic sequence of calculating the start address of the EU including the target frame will be as follows.

When header information for managing the EU is defined at the front of the EU, the frontmost end of the EU means the starting position of <EU Header> on the disk. FIG. 28($a$) shows a case with no <EU Header> and FIG. 28($b$) shows a case having <EU Header>.

(1) Relative PT (RPT) is calculated by subtracting <Start PT> (FIG. 5) corresponding to the first display frame in the EUS from the target PT.

$$RPT=PT-Start\ PT$$

(2)<EU Information Number> of the EU including the frame from which the start of playback is desired is obtained by dividing the relative PT (RPT) obtained in (1) by the set presentation time (<PB Time of EU> (FIGS. 22 and 28) of each EU in the EUS. In FIG. 28 this value is EU#1.

$$EU\ Info\ Num=ip(RPT/PB\ Time\ of\ EU),$$

where ip(n) is a function that produces the maximum integer not greater than n.

(3) From the <EU Information Number> obtained in (2), the start address of the EU including the target frame is obtained as the relative logical block number 'RLBN of EU'' from the front of EUS (FIG. 21).

RLBN of EU'=RLBN of EU(EU Info Num)

Similarly to the way of determining the start address of VU, the start address of the EU including a target frame can be determined by simple calculation using <Address LUT>, instead of searching or other operations.

Next, description will be made of how to calculate the start address of the PRU in the EU including a target frame. The basic sequence of calculating the start address of the PRU in the EU including the target frame will be as follows. FIG. 29(a) shows a case with no <EU Header> and FIG. 29(b) shows a case with <EU Header>.

The frontmost end of the PRU is a point which needs to be accessed to when post recording data corresponding to the target frame is present.

(1) Relative PT (RPT) is calculated by subtracting <Start PT> (FIGS. 5 and 29) corresponding to the first display frame in the EUS from the target PT.

Figure 29:
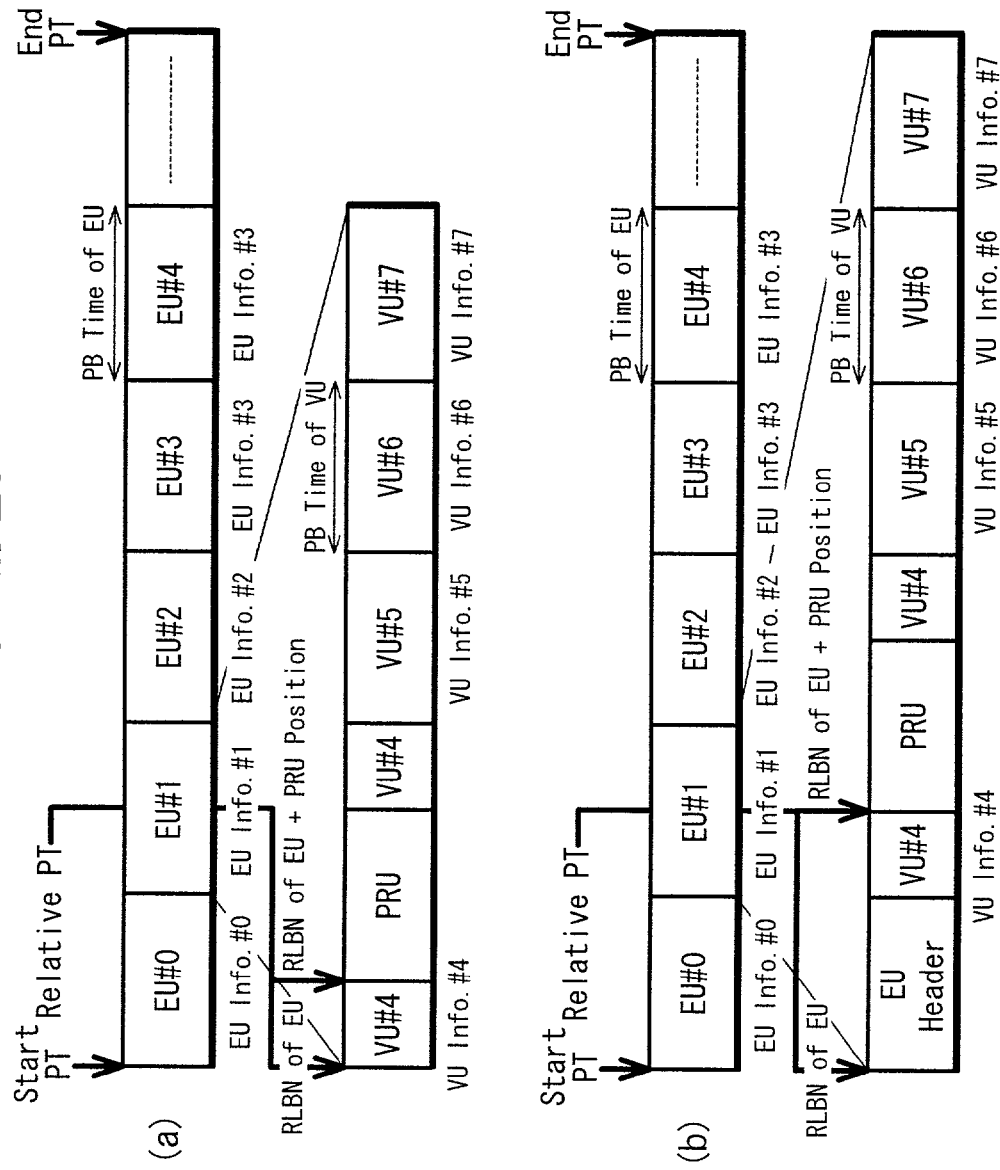
FIG. 29 is an illustrative view showing a method of calculating the start address of a PRU in the second example of the recording media management system of the present invention.

RPT=PT-Start PT (2)<EU Information Number> of the EU including the frame from which the start of playback is desired is obtained by dividing the relative PT (RPT) by the set presentation time (<PB Time of EU> (FIGS. 21 and 29) of each EU in the EUS. In FIG. 29 this value is EU#1.

EU Info Num=$ip$(RPT/PB Time of EU), where ip(n) is a function that produces the maximum integer not greater than n.

(3) From the obtained <EU Information Number>, the start address of the EU including the target frame is obtained as the relative logical block number 'RLBN of EU'' (FIG. 21) from the front of EUS.

RLBN of EU'=RLBN of EU(EU Info Num).

(4) The relative logical block number 'RLBN of PRU' from the front of the EUS including the target PRU is obtained by adding the value of <PRU Position> in <EU Status> (FIG. 24) to the start address 'RLBN of EU'' of the target EU:

RLBN of PRU=RLBN of EU'+PRU Position.

Thus, similarly to the way of determining the start address of VU, the start address of the PRU to be reproduced in synchronization with the VU including a target frame can be determined by simple calculation using <Address LUT>, instead of searching or other operations.

Next, referring to FIGS. 30 through 39, the third example of the recording media management system of the present invention will be described by taking a case where the start address of the VU in the aforementioned MPEG stream is calculated and then the start addresses of the EU and PRU are determined.

Figure 32:
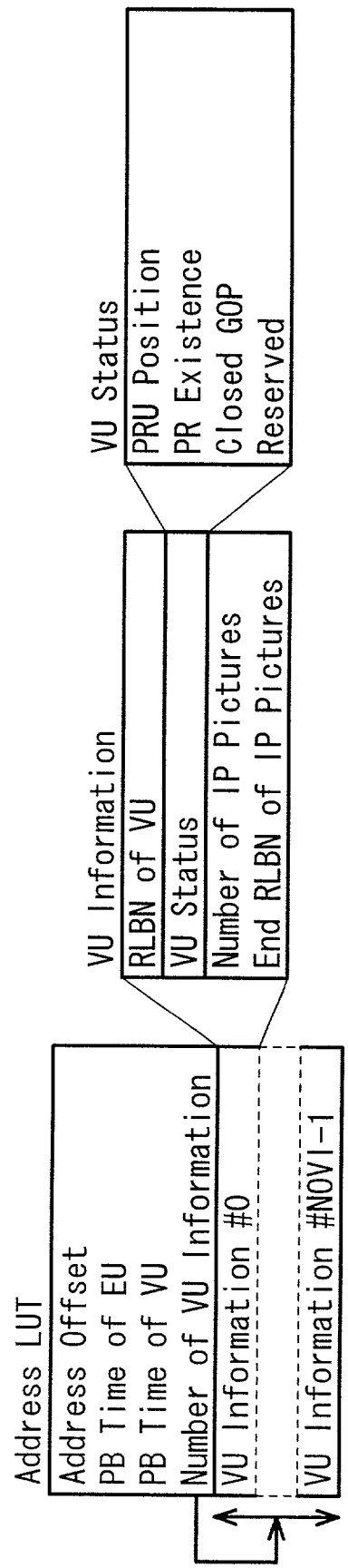
FIG. 32 is an illustrative view showing the scheme of an Address LUT in the third example of the recording media management system of the present invention.

To begin with, the layout of PRU will be described. When the MPEG stream has PRUs therein, there is a possibility that the user may have implemented post recording. If there exist PRUs, whether or not the PRUs have been used should be checked using <PR Existence> in <VU Status> (FIG. 32).

When a piece of post recording data exists and needs to be played back, it is necessary to read the post recording data beforehand prior to the access to the target VU.

In this way, use of the <PR Existence> information makes it possible to grasp beforehand whether or not post recording has been made and it is possible to eliminate unnecessary disk access because no access to PRU data needs to be made beforehand when no post recording has been made.

Figure 30:
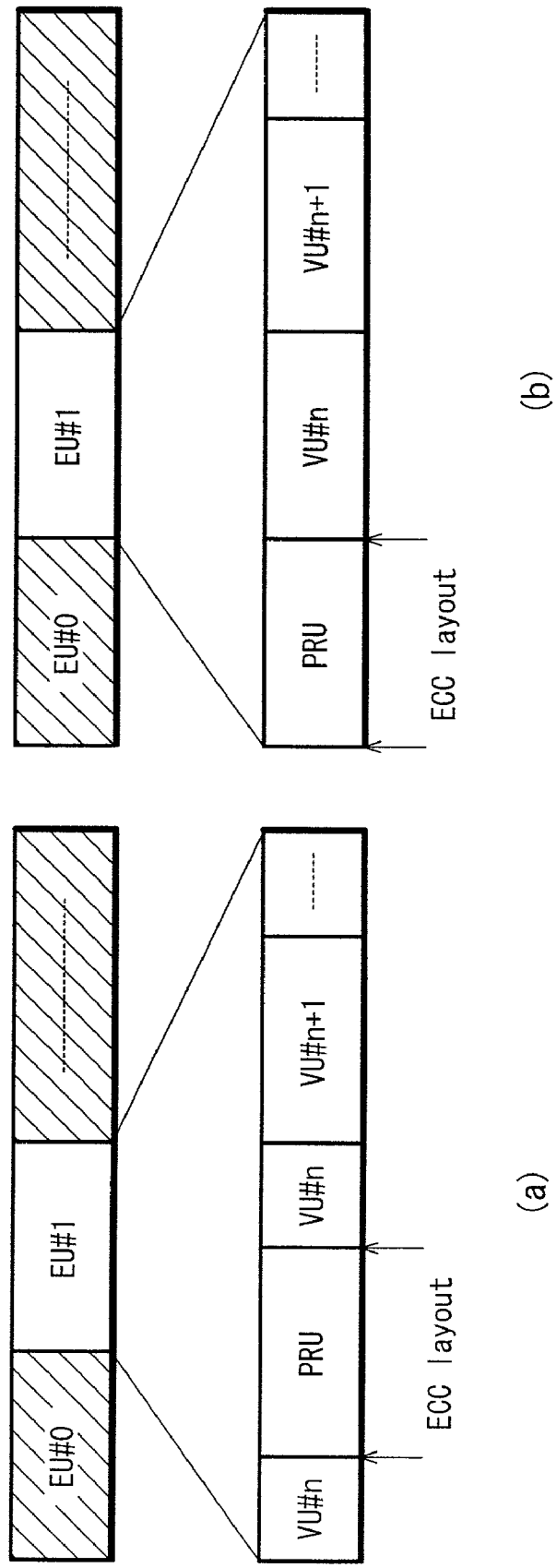
FIG. 30 is an illustrative view showing a PRU layout when no EU Header is present in the MPEG stream, in the third example of the recording media management system of the present invention.
Figure 31:
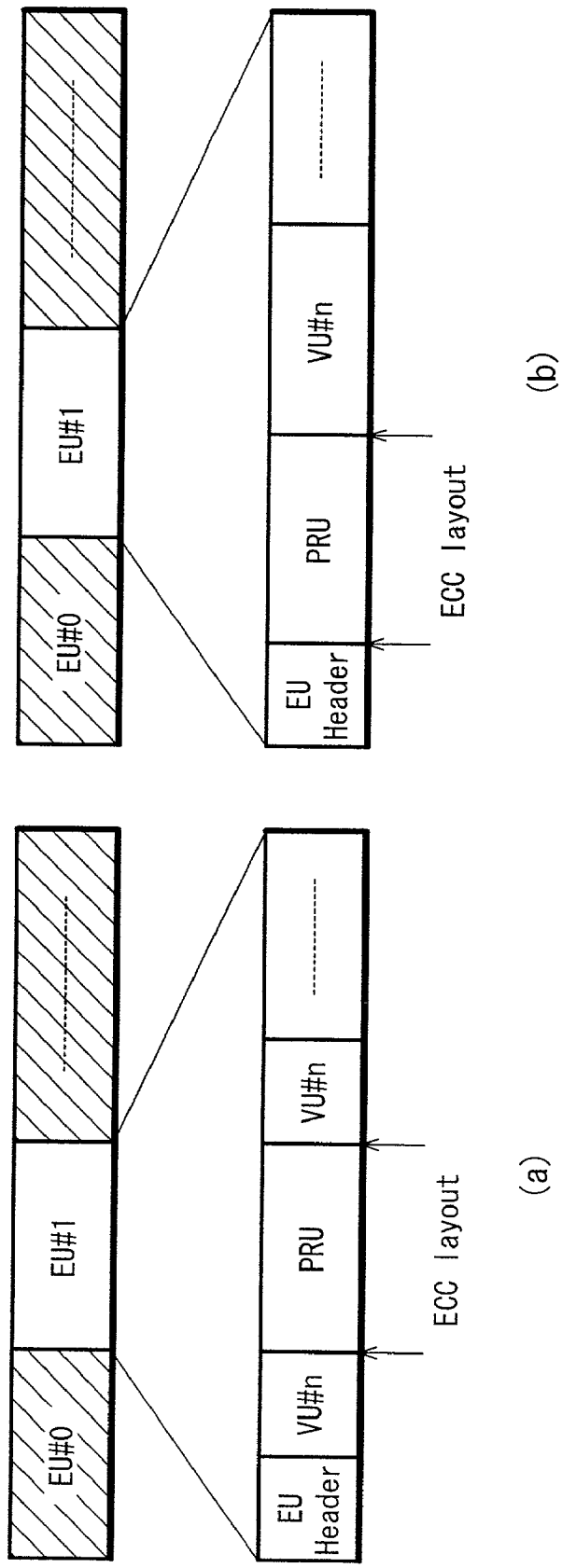
FIG. 31 is an illustrative view showing a PRU layout when an EU Header is present in the MPEG stream, in the third example of the recording media management system of the present invention.

As shown in FIGS. 30 and 31, there are two types of PRU layout on the disk, depending on the data geometry on the disk. This is attributed to the constraint that PRU should be aligned with an ECC boundary. That is, if the front of the EU happens to coincide with an ECC boundary, the PRU is disposed at the front of the EU, as shown in FIG. 30(b).

On the other hand, when the front of the EU does not fall at an ECC boundary, the PRU is positioned to start from the ECC boundary that appears first from the top of the EU, in the manner as shown in FIG. 30(a). From the front end of the EU to the ECC boundary or the starting point of the PRU, part of the first VU in the EU is arranged.

In the case where the EU has <EU Header> defined in the front thereof, if the end of <EU Header> happens to coincide with an ECC boundary, the PRU is disposed immediately after the <EU Header> as shown in FIG. 31(b), because of the constraint that PRU should be aligned with an ECC boundary.

When the end of <EU Header> does not coincide with an ECC boundary, the PRU is positioned to start from the ECC boundary that appears first after the <EU Header>, as shown in FIG. 31(a). From the end of the <EU Header> to the starting point of the PRU, part of the first VU in the EU is arranged.

Recorded in <PRU Position> in the <VU Status> shown in FIG. 32 is the distance from the front of the EU to the starting point of the PRU. This distance is represented by the number of logical blocks and is 16 logical blocks at maximum.

FIG. 32 shows the content in <Address LUT> (FIG. 5). The definitions of the management information in FIG. 32 will be described serially hereinbelow. FIGS. 33 through 37 show the details in FIG. 32.

In the figures, <Address Offset> stores an offset value for creating relative logical block numbers (RLBN) managed by the <address LUT>, in Unit 32 format. When an arbitrary number of EUs have been deleted from the front part of the EUS, the number of the deleted logical blocks is set into this field.

Accordingly, when referring to a relative logical block number (RLBN) used in <Address LUT>, it is necessary to subtract this <Address Offset> from that value, to refer to the number. The initial value of <Address Offset> has to be set at 0.

<PB Time of EU> represents the set presentation time of each EU in the EUS managed by the <address LUT>. The set presentation time is the playback time of video data in one EU and is constant within the same EUS, except the last EU in the EUS.

<PB Time of EU> should be recorded in PT Format. Here, the information <PB Time of EU> should be an integer multiple of the difference in PTS, represented in PT Format, between adjacent video frames in the MPEG stream, i.e., the PTS corresponding to the presentation time per frame.

<PB Time of VU> represents the set presentation time of each VU in the EUS managed by the <address LUT>. The set presentation time is the playback time of video data in one VU and is constant within the same EUS, except the last VU in the EUS.

<PB Time of VU> should be recorded in PT Format. Here, the information <PB Time of VU> should be an integer multiple of the difference in PTS, represented in PT Format, between adjacent video frames in the MPEG stream, i.e., the PTS corresponding to the presentation time per frame.

<Number of VU Information> is the number of VUs existing in the EUS managed by the <address LUT>, recorded in Unit 32 format.

<VU Information> manages the information as to each VU in the EUS, in the manner as shown in FIG. 34(a) or FIG. 34(b). It should be noted that in FIG. 34(a) the positional information of the video frames managed within the VU is given as either the start address or end address while in FIG. 34(b) the positional information is given as both the start address and the end address.

<RLBN of VU> (FIG. 34) represents the start address on the disk of the VU managed by this <VU Information>. This address is represented by the relative logical block number from the front of the EUS. 'RLBN of VU' should be recorded in Unit 24 format.

<VU Status> in FIG. 34 manages the state of the VU managed by this <VU Information>, in the manner as shown in FIG. 35(a) or FIG. 35(b). FIG. 35(a) shows a case where <Non Contiguous Point> information is defined and FIG. 35(b) shows a case where <Non Contiguous Point> information is not defined.

<PRU Position> (Bit0–4) (FIG. 35) records the information as to the position of the PRU in the EU including this VU. <PRU Position> represents the starting position of the PRU in the EU by the distance (LBN number) from the front of the EU.

If the PRU is located from the front of the EU, this field is recorded with 0, if not, the distance from the front of EU is recorded by a value ranging from 1 to 15 of logical blocks. When no PRU exists within the EU, this field should be constantly set at 0.

<PR Existence> (Bit5) (FIG. 35) is recorded with '1' when post recording data corresponding to the VU managed by this <VU Information> is present, and this field is recorded with '0' when no post recording data is present. When no PRU is present in the EU, this field should be always recorded with '0'.

<Closed GOP> (Bit6) (FIG. 35) manages whether the first GOP in the VU is a closed GOP. If the GOP is a closed one, this field is recorded with '1'. Otherwise, it is recorded with '0'. When the GOP is not a closed one, there is a possibility that some of the first frames of video in GOP cannot be decoded without information of the previous GOP.

<Non Contiguous Point> (Bit7) (FIG. 35(b)) manages whether the EU including the VU managed by this <VU Information> (FIGS. 32 to 34) is arranged on the disk logically and contiguously with the previous EU. When they are arranged contiguously, this field is recorded with '0'. When they are not arranged contiguously, the field is recorded with '1'.

<Number of IP Pictures> in FIGS. 32 and 34 records the number of the positional information of I-pictures and P-pictures in the video data to be managed by this <VU Information>, in Unit8 format.

<End RLBN of IP Pictures> (FIG. 34(a)) manages the end addresses on the disk of the I-pictures and P-pictures in the VU managed by this <VU Information>. The address herein is represented by the relative logical block number from the front of the VU.

As the first entry the address information as to the first I-picture in the VU should be stored. As the second entry and downward, the address information as to I-picture or P-picture should be stored in Unit 16 format.

In connection with this, when a semiconductor memory having high-speed access performance is adopted as the recording medium or when a disk drive having markedly high-access performance is used, the start addresses also should be given as the positional information of the reference pictures, in addition to their end addresses. In this case, the field name of this item is renamed as <RLBN of IP Pictures> and both the start address and end address should be recorded serially in Unit 16 format.

It is also possible to manage the positional information of all the video frames, instead of the addresses of the reference pictures only. The positional information in this case should be represented by the record start position of each video frame on the disk. The amount of data of each frame or the end address can be calculated simply using the difference from the start address of the next frame.

All the above is the management information in <Address LUT>.

Next, specific usage of these pieces of management information will be described with reference to FIGS. 36 to 39.

Figure 36:
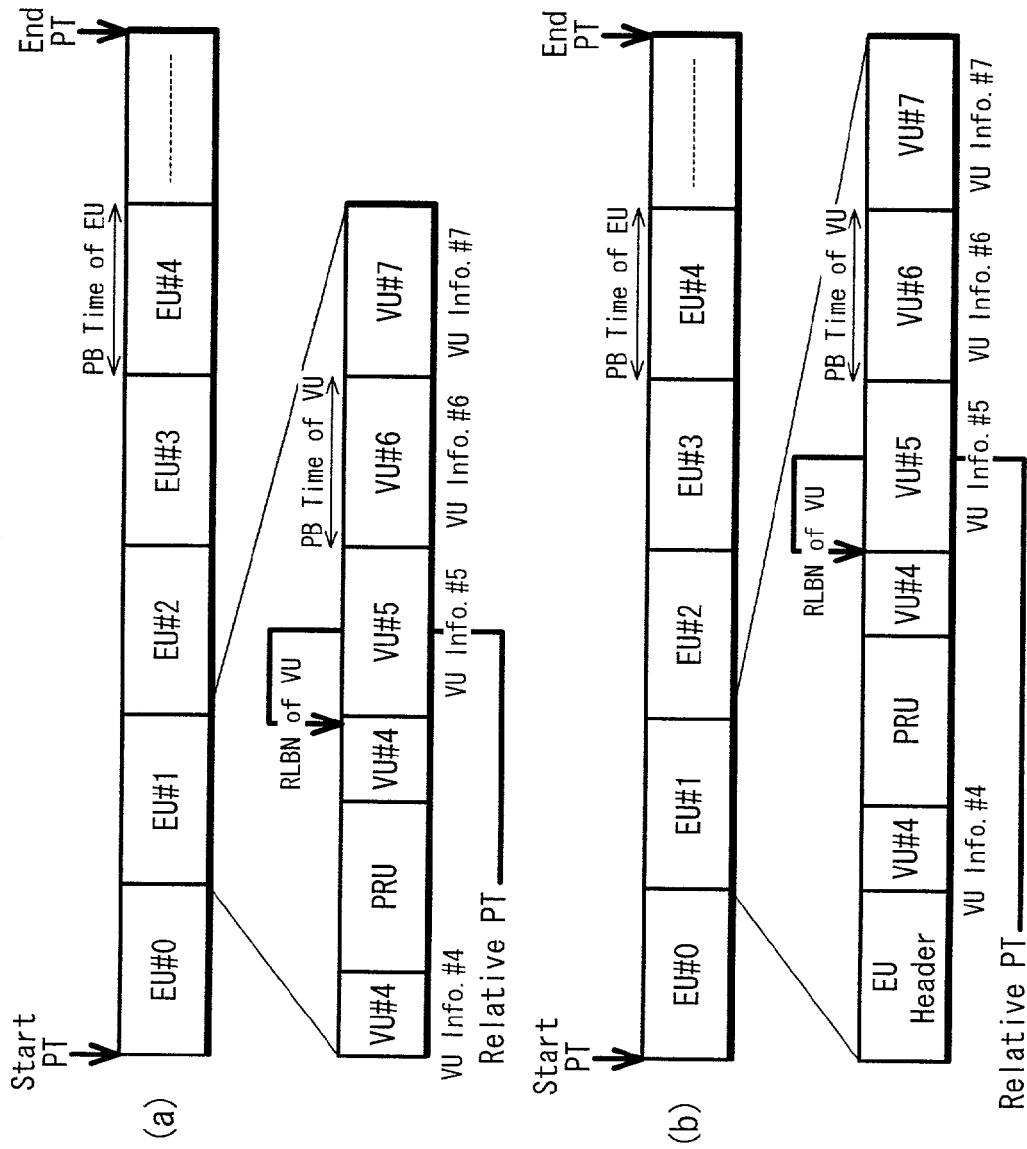
FIG. 36 is an illustrative view showing a method of calculating the start address of a VU in the third example of the recording media management system of the present invention.
Figure 37:
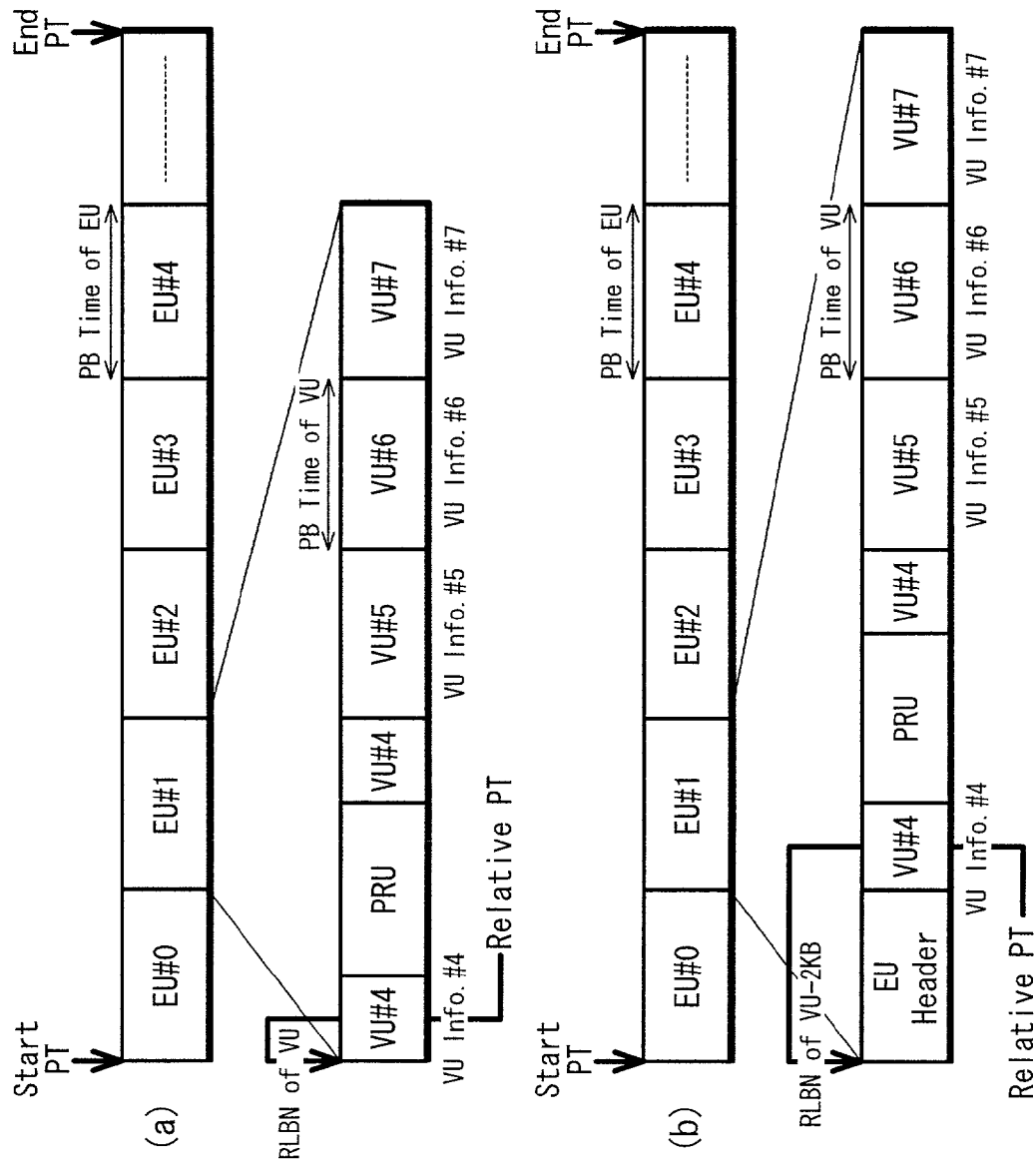
FIG. 37 is an illustrative view showing a method(method 1) of calculating the start address of an EU in the third example of the recording media management system of the present invention.
Figure 38:
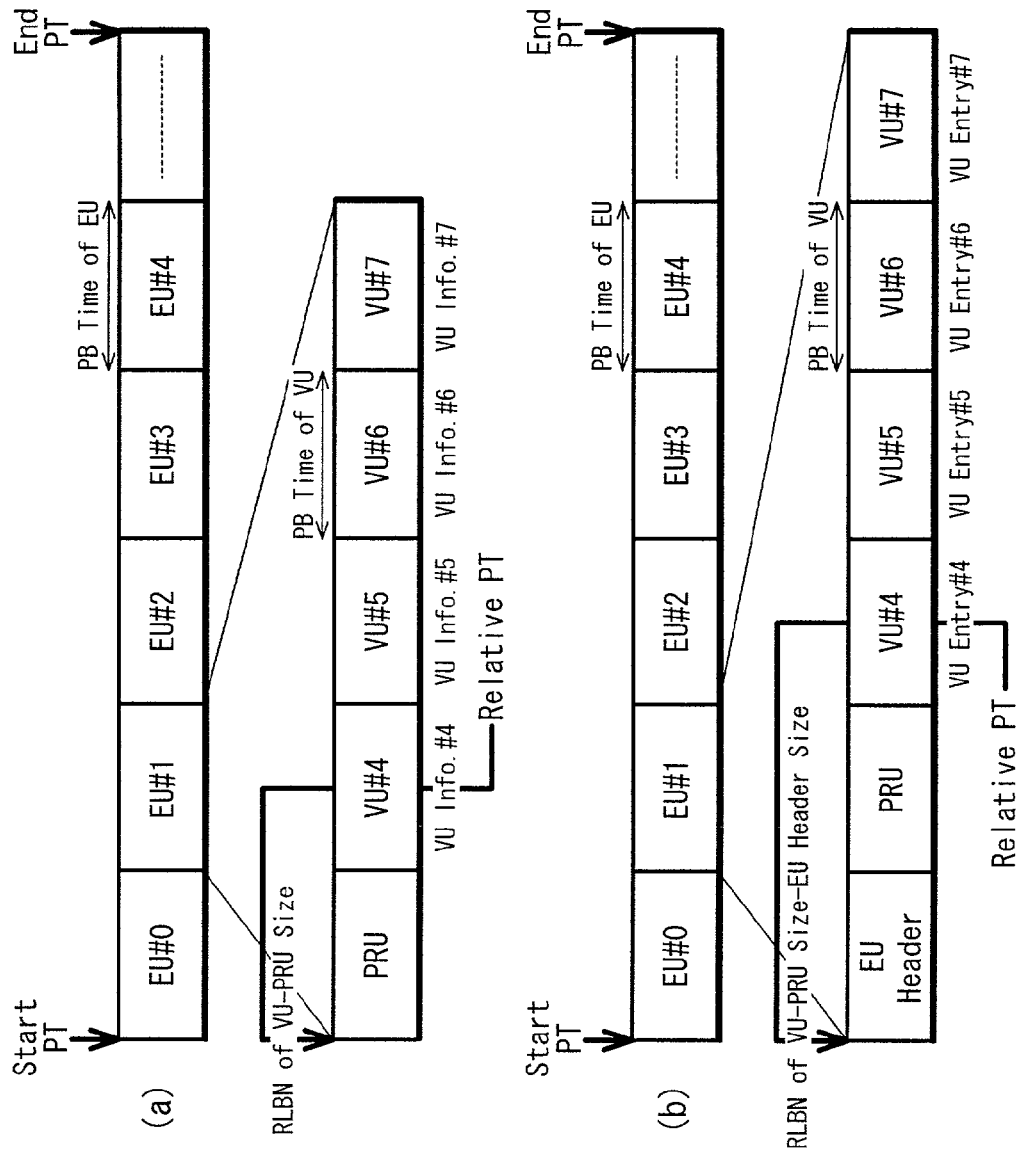
FIG. 38 is an illustrative view showing a method(method 2) of calculating the start address of an EU in the third example of the recording media management system of the present invention.
Figure 39:
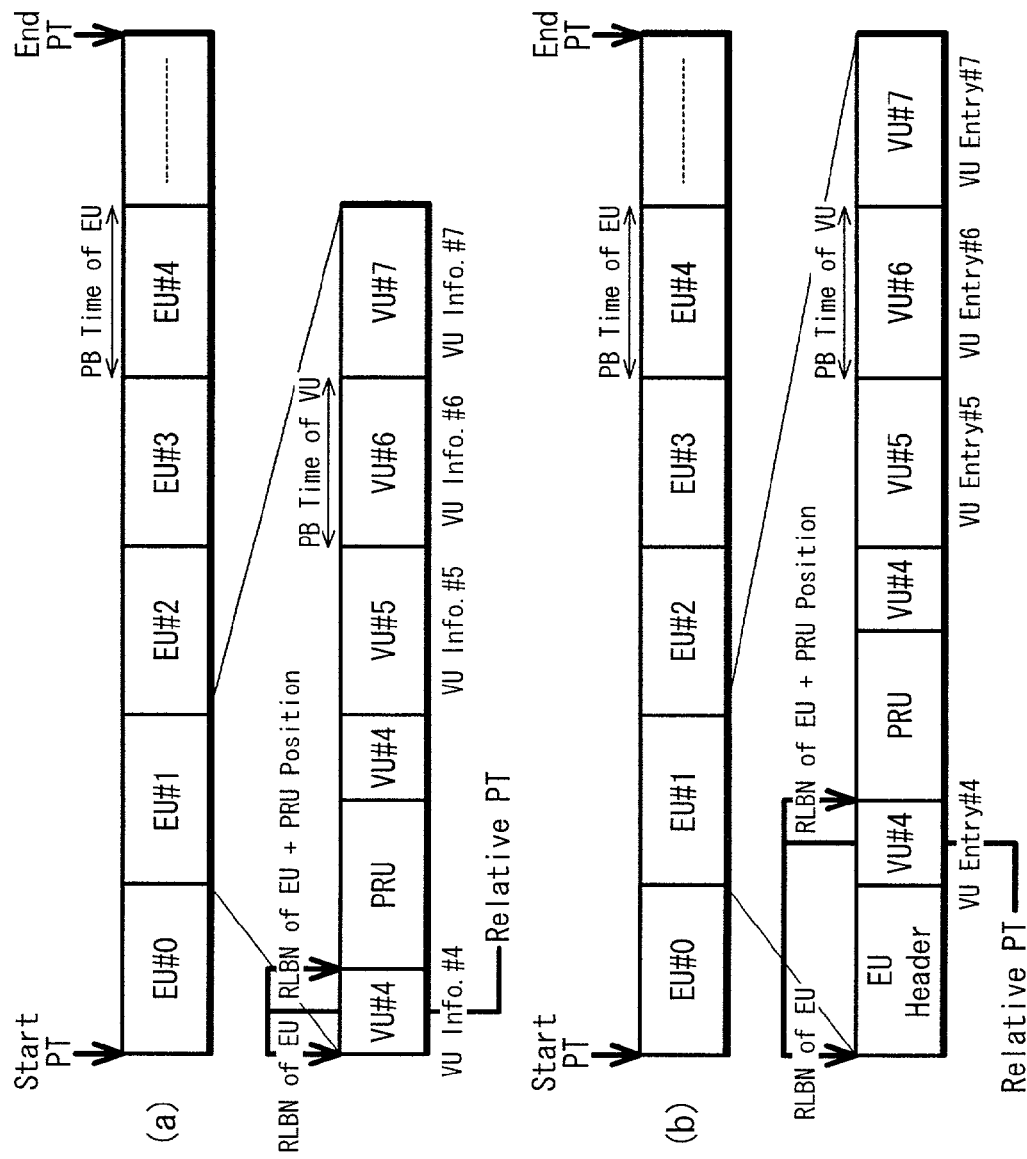
FIG. 39 is an illustrative view showing a method of calculating the start address of a PRU in the third example of the recording media management system of the present invention.

Referring to first to FIG. 36, description will be made of how to calculate the start address of the VU including a target frame. When playback is desired to be started from a frame corresponding to an arbitrary PT in an EUS, the starting position on the disk of the VU including this frame should be determined based on <Address LUT>.

The basic processing sequence for this will be as follows. FIG. 36(a) shows a case with no <EU Header> and FIG. 36(b) shows a case with <EU Header>.

(1) Relative PT (PRT) is calculated by subtracting <Start PT> (FIGS. 5 and 36) corresponding to the first display frame in the EUS from the target PT.

RPT=PT−Start PT

As stated above, since the information as to the start point and end point, which is designated from each user program so as to select an arbitrary section, is represented by values, attached to the stream or corresponding values, represented in the absolute PT system, subtraction of <Start PT> from that values will provide relative time information from the front of the EUS.

Here, the fact that absolute time information is used in user programs means that if, for example, some part in the front part of the EUS was deleted, there is no need to renew the start point and end point information of all the user programs which refer to this EUS as the reference information as long as the information <Start PT> in <EUS Information> (FIG. 5) is modified, thus making it possible to reduce the process load.

(2) The <VU Information> number (FIG. 32) of the VU including the frame from which the start of playback is desired is obtained by dividing the relative PT (RPT) by the set presentation time (<PB Time of VU> (FIGS. 32 and 33) of each VU in the EUS. In FIG. 36 this value is VU#5.

VU Info Num=ip(RPT/PB Time of VU), where ip(n) is a function that produces the maximum integer not greater than n.

(3) From the obtained <VU Information Number>, the start address of the VU including the target frame is obtained as the relative logical block number 'RLBN of VU' (FIGS. 32 and 36) from the front of EUS.

RLBN of VU'=RLBN of VU(VU Info Num), where expression 'RLBN of VU(n)' represents the value of <RLBN of VU> of the nth <VU Information>.

In the above way, the start address of the VU including a target frame can be determined by simple calculation using <Address LUT>, instead of searching or other operations.

Next, description will be made of how to calculate the start address of the EU including a target frame. The basic sequence of calculating the start address of the EU including the target frame will be as follows. When <EU Header> is defined at the front of the EU, the front of the EU means the starting position of <EU Header> on the disk.

(1) Relative PT (RPT) is calculated by subtracting <Start PT> corresponding to the first display frame in the EUS from the target PT.

RPT=PT−Start PT (2) The EU Number of the EU including the frame from which the start of playback is desired is obtained by dividing the relative PT (RPT) by the set presentation time (<PB Time of EU>) of each EU in the EUS.

EU Number=ip(RPT/PB Time of EU), where ip(n) is a function that produces the maximum integer not greater than n.

(3) The number of VUs included in one EU is determined by dividing the set presentation time of each EU (<PB Time of EU>) by the set presentation time of each VU (<PB Time of VU>)

VU per EU=PB Time of EU/PB Time of VU (4) <VU Information Number> of the VU at the front in the EU is obtained by multiplying the EU number of the EU including the frame from which the start of playback is desired, by the number of VUs included in one EU.

VU Info Num=EU Number*VU per EU (5a) When <PRU Position> (FIG. 35) in <VU Status> managed by the <VU Information> (FIGS. 32 and 34) at the front of the target EU is other than '0', the start address of the VU in the <VU Information> represents the relative logical block number 'RLBN of EU' from the front of the EUS to which the target EU belongs, as shown in FIG. 37(a).

RLBN of EU=RLBN of VU(VU Info Num)

(5b) When <EU Header> is defined at the front of the EU and when <PRU Position> (FIG. 35) in <VU Status> managed by the <VU Information> (FIGS. 32 and 34) at the front of the target EU is other than '0', the relative logical block number 'RLBN of EU' from the front of the EUS to which the target EU belongs can be obtained by subtracting the size of <EU Header> (2 KB) from the start address of the VU (RLBN of VU) in the <VU Information>, as shown in FIG. 37(b).

RLBN of EU=RLBN of VU(VU Info Num)−EU Header Size.

(5c) When <PRU Position> in <VU Status> managed by the <VU Information> at the front of the target EU is 0, the relative logical block number 'RLBN of EU' from the front of the EUS to which the target EU belongs can be obtained by subtracting the size of PRU from the start address of the VU (RLBN of VU) in the <VU Information>, as shown in FIG. 38(a).

RLBN of EU=RLBN of VU(VU Info Num)−PRU Size.

(5d) When <PRU Position> in <VU Status> managed by the <VU Information> at the front of the target EU is '0', the relative logical block number 'RLBN of EU' from the front of the EUS to which the target EU belongs can be obtained by subtracting the size of PRU and the size of <EU Header> (2 KB) from the start address of the VU (RLBN of VU) in the <VU Information>, as shown in FIG. 38(b).

RLBN of EU=RLBN of VU(VU Info Num)−PRU Size−EU Header Size.

In the above way, the start address of the EU including a target frame can be determined, in a similar manner to the way the start address of the VU is determined, by simple calculation using <Address LUT>, instead of searching or other operations.

Next, description will be made of how to calculate the start address of the PRU in the EU including a target frame. The basic sequence of calculating the start address of the PRU in the EU including the target frame will be as follows. FIG. 39(a) shows a case with no <EU Header> and FIG. 39(b) shows a case with <EU Header>.

The frontmost end of the PRU is a point which needs to be accessed to when post recording data corresponding to the target frame is present.

(1) Similar to the above-described case where the start address of the EU including a target frame is calculated, the start address 'RLBN of EU' of the target EU is determined.

(2) The relative logical block number 'RLBN of PRU' from the front of the EUS to which the target PRU belongs can be obtained by adding the value of the <PRU Position> managed by the first <VU Information> in the EU and the size of <EU Header> (2 KB) to the start address 'RLBN of EU' of the target EU.

RLBN of PRU=RLBN of EU+EU Header Size+PRU Position.

In the above way, the start address of the PRU to be reproduced in synchronization with the VU including a target frame can be determined, in a similar manner to the way the start address of the VU is determined, by simple calculation using <Address LUT>, instead of searching or other operations.

In the above first to third examples of the present invention, the address information obtained from <Address LUT> is represented in a relative address system, so that for disk access it is necessary to convert the information into the logical address system of the disk. Next, description will made of how to calculate a logical address on the disk from a relative address.

Figure 40:
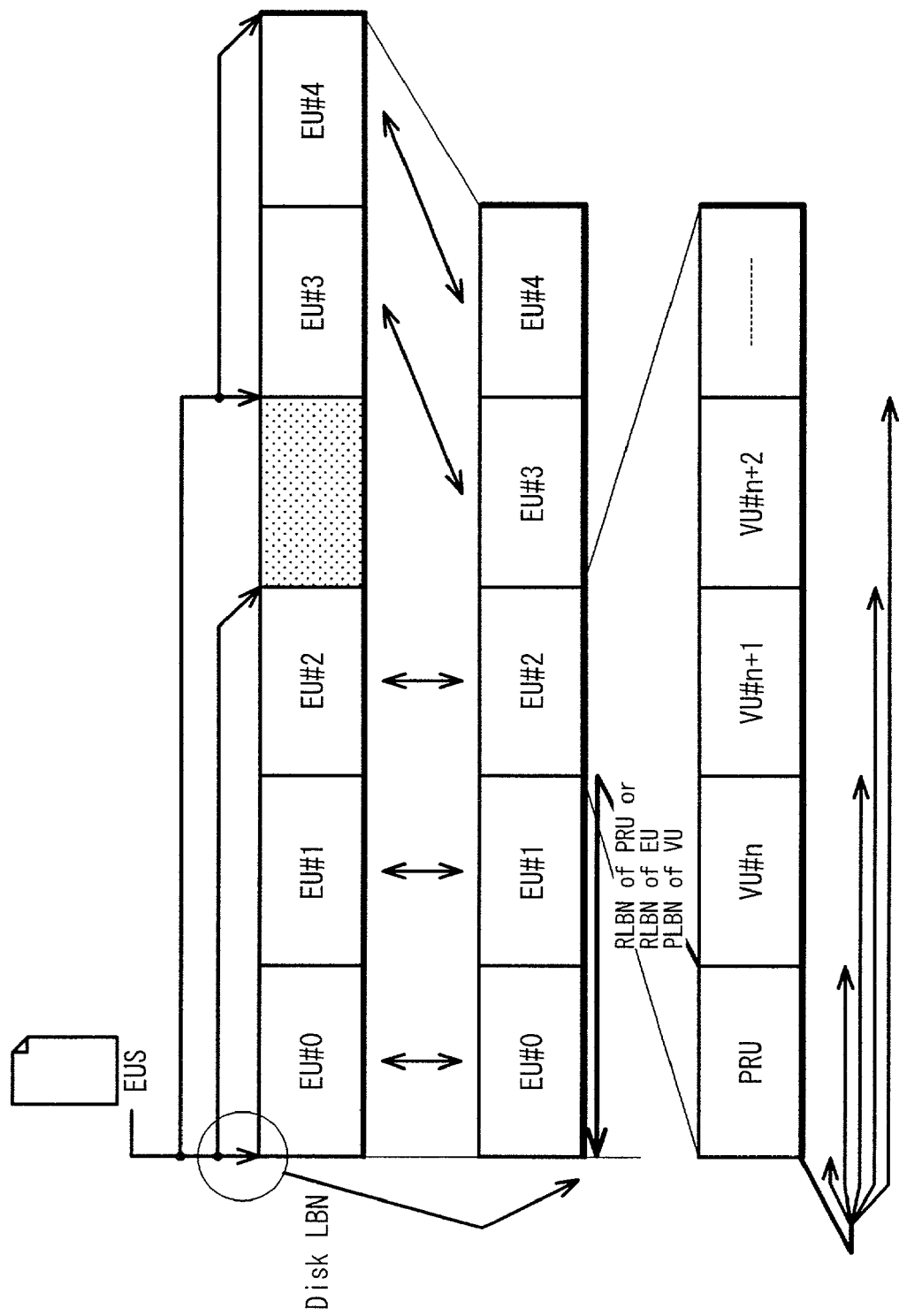
FIG. 40 is an illustrative view showing relative address information in the Address LUT in the first embodiment of a recording media management system of the present invention.

As already described, an EUS is managed as a file using the logical filesystem. Even when a certain EUS is recorded, divided partwise, on the disk, all the information as to the fact of division is assimilated at the logical filesystem level. Therefore, as shown in FIG. 40, there is no need to give concern as to the fact of division in the representation of <Address LUT>.

Most of the addresses in <Address LUT> are given by relative address representations based on the front of the EUS, and even when an EUS has been recorded, divided partwise, on the disk, the management by <Address LUT> is made on the assumption that the EUS is arranged continuously.

The access length (the number of logical blocks) designated for disk access can be determined by calculation. For example, the size of one EU or VU can be determined simply by its difference from the start address of the next EU or VU.

The relative address system based on the start of EUS in <Address LUT> needs to be modified when some front part of the EUS is deleted. Specifically, <Address LUT> should be renewed by subtracting the number of deleted logical blocks from each piece of information represented in the relative address system based on the start of EUS in <Address LUT>.

In order to save the job of renewing all the addresses in the management information, the <Address Offset> value (FIGS. 11, 21 and 38) for storing the number of deleted blocks is prepared to deal with the case when an arbitrary number of EUs have been deleted from the front of the EUS.

Figure 41:
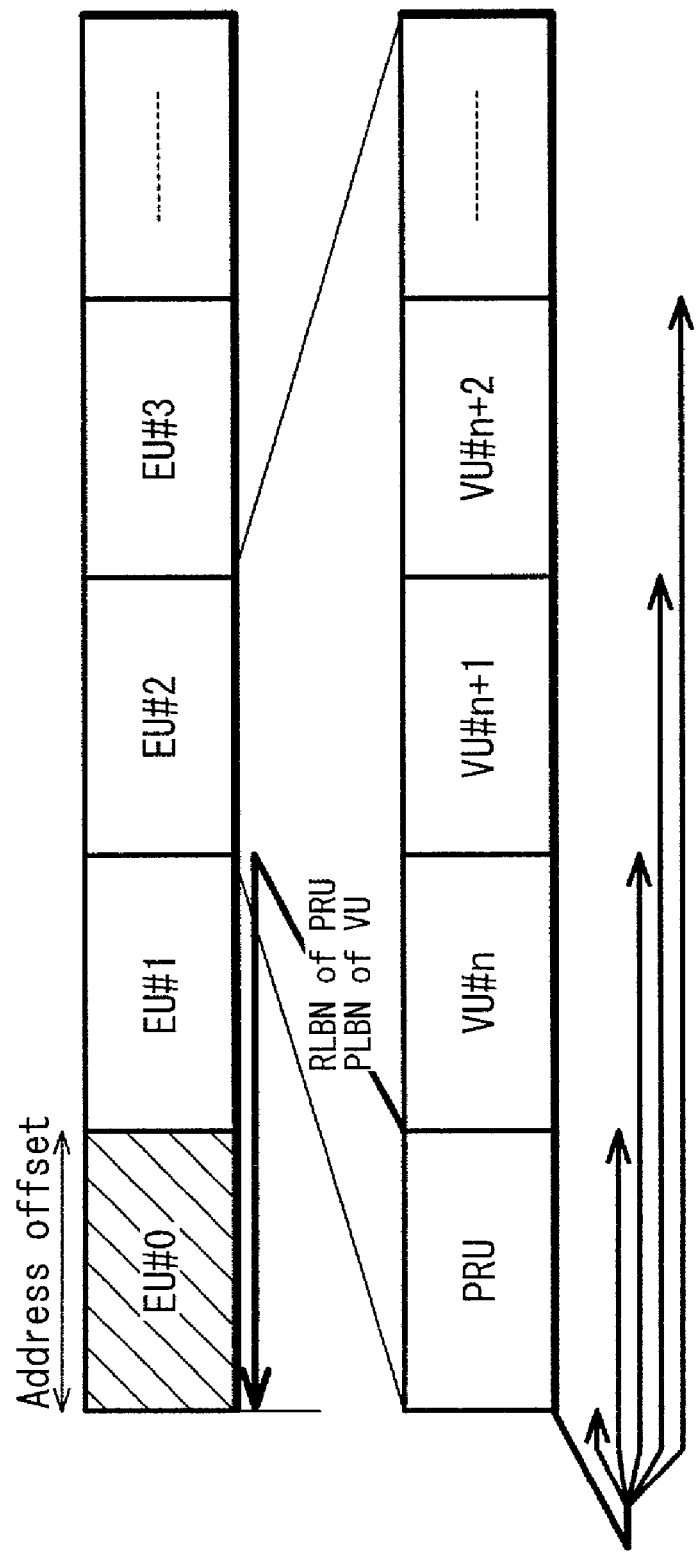
FIG. 41 is an illustrative view showing Address Offset information in the first embodiment of a recording media management system of the present invention.

For example, as shown in FIG. 41, if EU#0 is deleted, it is no longer necessary to renew the values of 'RLBN of VU', <RLBN of PRU> and 'RLBN of EU' in <Address LUT> (FIGS. 11, 21 and 38) when using this <Address Offset>.

That is, by subtracting the <Address Offset> value from the addresses in <Address LUT>, the correct values can be obtained. Accordingly, the relative address of a VU from the start of EUS can be determined finally by the following formula:

RLBN of VU'=RLBN of VU–Address Offset.

In order to obtain a logical block address on the disk, it is also necessary to refer to the information from the logical format. That is, it is necessary to combine the start address of the EUS and division information obtained from the management information of the logical format, with the address information finally obtained from <Address LUT>.

Next, the method of implementing playback from a target frame will be described. Here, description will be made of a playback method where a target frame is designated first so as to start playback from the designated video frame. As stated above, an arbitrary section from the EUS is selected by each scene of the user programs.

For this selection, the ID of the <EUS Information> desired to be referred to and the start point and end point in the EUS managed by the <EUS Information> should be designated by the time information in PT format. From the PT of the video frame designated as the start point, the start address of the VU including the designated frame is determined. This address is the start point on the disk to which access should be made.

Actual disk access is controlled by totalizing the address information of all the VUs to be accessed and the information obtained from the logical filesystem. The control is repeated until the VU including the video frame designated by the end PT is reached, thus making it possible to read out the data desired to be reproduced from the disk.

In practice, the video frame from which the start of playback is wanted is not always the front frame of the VU, but as stated already, the first reference picture in the VU should be transferred to the decoder, under the requirement of the MPEG characteristics.

Therefore, the data from the front of the VU is transferred to the decoder, and of the decoded data, display should be started at the point of time when the designated start PT coincides the PTS of the decoded frame. Similarly, for the end point, the video frames after the end PT in the last VU should be controlled so as not to be displayed.

Figure 42:
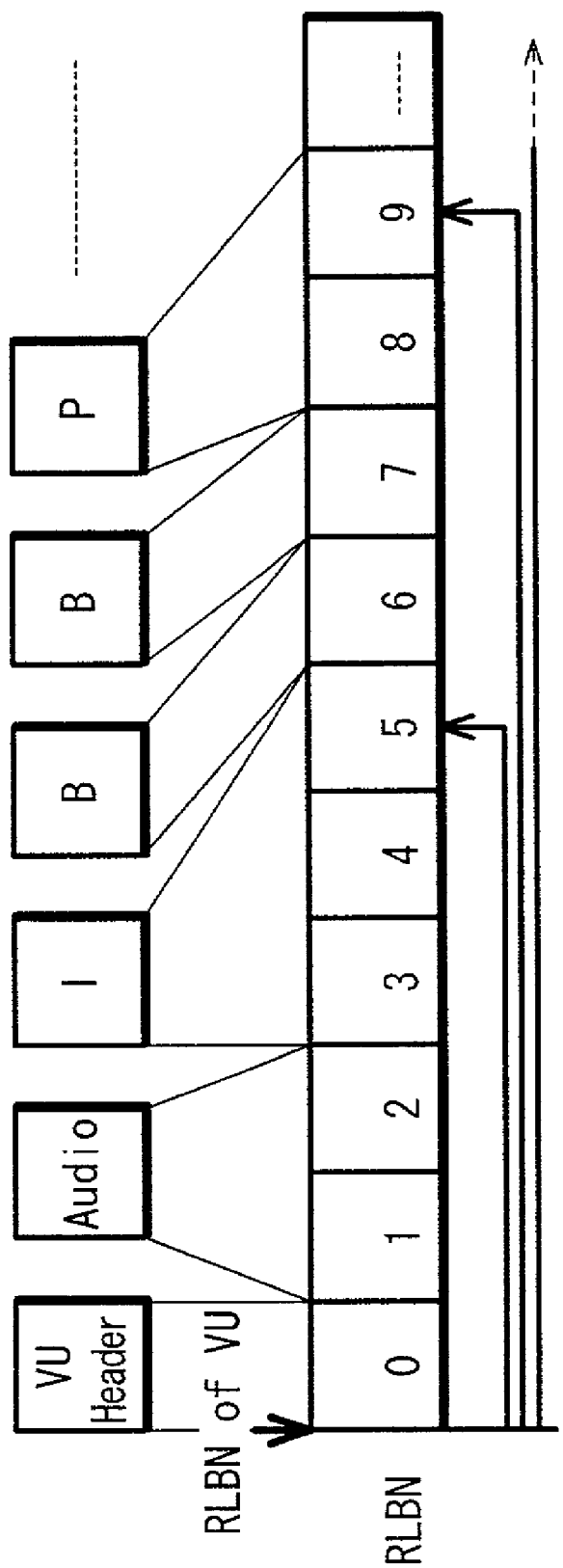
FIG. 42 is an illustrative view showing End RLBN of IP Pictures in the first embodiment of a recording media management system of the present invention.

Next, a special playback method using arbitrary reference pictures will be described. <Address LUT> presents, in addition to the start address of a VU, the end addresses of I-pictures and P-pictures in the VU. As shown in FIG. 42, the address mentioned here is represented by the number of logical blocks from the front of the VU.

The end addresses of I-pictures and P-pictures are the information needed to implement a special playback using I-pictures and P-pictures only. The reason the information as to start address of each picture is not given is as follows. That is, in order to decode a P-picture, it is necessary to obtain the previous I-picture or P-picture. Therefore, when playback is desired to start from an arbitrary P-picture, it is impossible to decode that P-picture without reading a multiple number of reference pictures from the disk.

In this case, it is faster than selective reading of the reference picture parts only such as I-pictures or P-pictures (a seek is needed for every time a selection is made) if data is read continuously from the front of the VU to the end of the target P-picture while discarding unnecessary B-pictures which constitute a lesser amount of data compared to the other I-pictures and P-pictures.

The each end address functions as the information for obtaining the amount of data in which data should be continuously read from the disk beforehand when special playback using I-pictures and P-pictures only is performed in such a manner that some of the first I-pictures and P-frames are displayed and then the playback jumps to the next VU.

In connection with this, when a semiconductor memory having high-speed access performance is adopted as the recording medium or when a disk drive having markedly high-access performance is used, high enough a performance can be achieved to selectively read the reference pictures. In this case the start addresses will be also given as the positional information of the reference pictures, in addition to their end addresses.

Imparting the start and end addresses of the reference pictures as the positional information makes it possible to selectively read data of the reference pictures only, from the recording medium. Alternatively, it is also possible to put the positional information of all the video frames under control.

The positional information in this case should be represented by the record start position of each video frame on the disk. The amount of data of each frame or the end address can be calculated simply using the difference from the start address of the next frame.

As the information to be referred to when an access is actually made by a user program, <Closed GOP> and <Non Contiguous Point> information are provided in <VU Status> (FIGS. 11, 21 and 32).

<Closed GOP> is the information which manages whether the first GOP in the VU is a closed GOP. Usually, the video frames in a GOP are created using only the data of the video frames in the GOP, but in the MEPG standard, use of the information from the video frames belonging to the previous GOP is allowed for encoding.

A GOP being a closed GOP means that all the frames in that GOP have been encoded based on only the data therein. In contrast, a GOP being not a closed GOP means that some frames of the observed GOP have been encoded using the information from the previous GOP.

The first GOP in the VU to which an access is about to be made being not a closed GOP means that the video of some of the first frames in that GOP cannot be decoded and reproduced correctly. An advance notice of this fact is able to prevent incorrect reproduction; for example, when the GOP is not a closed GOP, an access to the previous VU makes it possible to make correct reproduction of video.

<Non Contiguous Point> information is the information that represents whether the EU being currently observed is connected to the previous EU logically and contiguously on the disk. Because of excellency of a disk in random accessibility, a series of information may not necessarily arranged as contiguous data on the disk.

Since an EUS on the disk is recorded continuously in EU units, <Non Contiguous Point> information that represents whether the EU being currently observed is contiguously arranged to the previous EU should be given.

Since the addresses handled in <Address LUT> are mainly relative addresses from the start of the EUS as already stated, only the start addresses of EUs will not be able to give knowledge of whether the EUS is divided or not on the disk. For example, examination of whether the EUS is arranged continuously can be computed in advance by a combination of the management information of <Address LUT> and the management information of the logical format.

In the actual process, based on the EUS division information which can be obtained from the logical filesystem, divided points relatively viewed from the start of the EUS are known. The divided points relatively viewed from the start of the EUS and the relative addresses from the start of the EUS, obtained from <Address LUT> are compared. The coincident EU start addresses are understood as the divided points.

In this way, examining whether the data which is about to be reproduced is distributed discontinuously on the disk requires a troublesome task. Use of <Non Contiguous Point> information makes it possible to know divided points easily without referring to the information from the logical filesystem.

Advance knowledge of the layout information of the data on the disk being about to be reproduced not only provides the information for access but also can be used to perform control of data reading from the disk for realizing seamless playback, for example.

The situation where the data being about to be read is arranged, divided partwise on the disk means occurrence of seek at that divided point. Occurrence of a seek means that data cannot be read during the seek time.

In order to prevent a playback break from occurring even if such a seek occurred, a shock proof memory is provided for temporal storage of the data read from the disk.

Provision of the shock proof memory is able to prevent playback movie breaks against occurrence of seeks to some extent. However, if flow of data into the shock proof memory stops over a long period due to frequent occurrences of seeks, the playback movie will break. Therefore, advance knowledge of occurrence of a seek, which is the cause of stoppage of data inflow into the shock proof memory, facilitates seamless playback control.

For example, when a risk that the playback movie may break at the divided point is expected beforehand, the data at that point may and should have been stored beforehand into a memory having high-speed access performance.

In the above way, use of <Non Contiguous Point> information makes it possible to easily grasp the location of each EU on the disk without using the data from the logical filesystem, and is effective in making control of reading data to which an access is to be made.

Next, description will made of how to calculate the playback rate. Use of <Address LUT> of the present invention makes it possible to compute the playback rate of video data in advance without reading the video data from the disk.

The playback rate can be calculated with respect to the presentation period of time of EU or VU. First, a method of calculating the playback rate for each EU will be described.

As stated above, the start address of an EU can be obtained by referring to <Address LUT>. Also as stated already, the addresses managed by <Address LUT> are represented by the relative logical block number from the front of the EUS assuming that it is continuous even though the EUS is recorded, divided in parts on the disk.

Therefore, the size of an EU currently observed can be known by subtracting the start address of the EU currently observed from the start address of the next EU.

As already stated, one EU is comprised of VUs and a PRU, or VUs only. One VU is a management unit having a VU Header, original audio data and video data multiplexed therein. The PRU is an area for audio data area for post recording, which is reproduced in synchronization with the video data in the EU.

Since the original audio data and the audio data for post recording employ a fixed rate, the sizes of these areas can be uniquely determined from the presentation period of one EU, for example.

Therefore, it is possible to obtain the amount of video data contained in one EU by subtracting the amount of data of the PRU, if the PRU presents (this can be obtained also form the management information <EUS Information>), the amount of the original audio data and the size of management information of fixed lengths of data such as <EU Header> or <VU Header> from the size of data of the EU being observed.

Once the amount of the video data contained in one EU is known, the playback rate of the video data of the EU being observed can be calculated by dividing the amount of the video data by the presentation period of one EU.

Next, a method of calculating the playback rate for each VU will be described. As stated above, the start address of a VU can be obtained by referring to <Address LUT>.

Also as stated already, the addresses managed by <Address LUT> are represented by the relative logical block number from the front of the EUS assuming that it is continuous even though the same EUS is recorded in parts on the disk.

Therefore, the size of a VU currently observed can be known by subtracting the start address of the VU currently observed from the start address of the next VU. Here, it should be noted that because the first VU in the EU has a PRU at the front or halfway, the amount of data of the VU cannot be calculated simply with the start addresses of this and the next VUs.

As already stated, one VU is a management unit having <VU Header>, original audio data and video data multiplexed therein. Since the original audio data employs a fixed rate, the size of this area can be uniquely determined from the presentation period of one VU, for example.

Therefore, it is possible to obtain the amount of video data contained in one VU by subtracting the amount of the original audio data and the size of management information of fixed lengths of data such as <VU Header> from the size of data of the VU being observed. Here, when the start address of the first VU in the EU is referred to, the amount of data of the PRU needs to be taken into account.

Once the amount of the video data contained in one VU is known, the playback rate of the video data of the VU being observed can be calculated by dividing the amount of the video data by the presentation period of one VU.

The thus calculated playback rate of video data for each EU or for each VU can be displayed in real-time on the playback screen such as a monitor, for example, as the user information, without providing special hardware.

Further, since the playback rate of the video data being about to be reproduced can be known beforehand without reading any MPEG data recorded on the disk, this configuration is useful in, for example, achieving seamless playback control as mentioned before.

The playback rate for each VU or for each EU gives the information representing the amount of data read out from the disk for reproducing the data of the presentation period of one VU or EU. Therefore, it becomes possible to obtain advance knowledge of how the data will be read into the aforementioned shockproof memory in progress of calculating the playback time.

For example, when the playback rate is low, the amount of data on the disk corresponding to a unit of playback time is low. Therefore, there is a wide margin for data reading from the disk. In contrast, when the playback rate is high, the amount of data on the disk corresponding to the same unit of playback time is high. Therefore, there is a lesser margin for data reading from the disk.

In this way, if the playback rate of the data being about to be reproduced can be known beforehand, it is possible to grasp the status of the shock proof memory in advance.

Thus, it is possible to grasp the state of the shock proof memory and sections that can allow greater time for disk access and sections that allow minimal time for disk access, in advance. Therefore, this feature lends itself to scheduling of disk access control, in such a manner that, for example, the period for a section which can afford much time for disk access, is adapted to be allotted to read into a semiconductor memory the data for the point at which seamless playback might break, interpreted from the aforementioned <Non Contiguous Point>.

Figure 43:
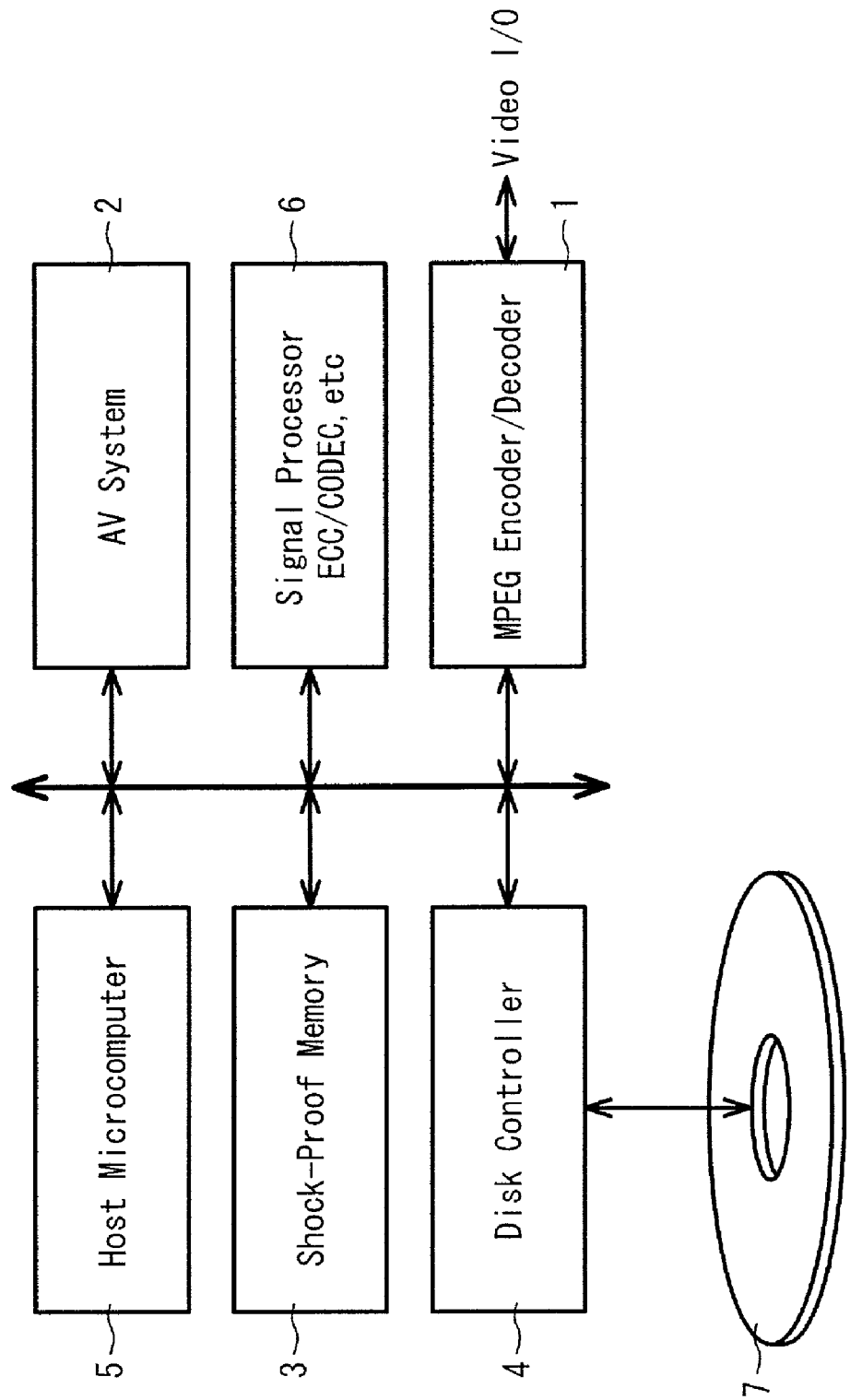
FIG. 43 is an illustrative view showing the system configuration in the first embodiment of a recording media management system of the present invention.

Next, the method of creating management information will be described. Here, an example of a method of creating the management information of <Address LUT> will be described. FIG. 43 shows an overall system configuration of this embodiment.

In the drawing, an MPEG encoder/decoder 1 encodes and decodes MPEG data. An AV system unit 2, in its recording mode, multiplexes the MPEG data from the MPEG encoder and audio data obtained so as to shape the data into a stream to be recorded onto the disk and adds header and other information. This unit, in its playback mode, extracts the video and audio data from the read out stream from the disk, designated at 7 and transfers it to the MPEG decoder.

A shock proof memory 3 temporarily stores the stream therein and also performs processes such as ECC processing, sector codec and the like. This shock proof memory 3, by its temporal storage of data, also has the function of preventing against stoppage of data even when data cannot be actually read out or written in due to the disk drive performing seek or other reasons.

A disk controller 4 governs servo control and disk access. A host microcomputer 5 controls the whole system by issuing control signals to various processors and receiving signals therefrom.

When MPEG data is recorded as an EUS, a new <Address LUT> should be created. First, the video data to be recorded is encoded by the MPEG encoder. Similarly, the audio data is encoded by an audio encoder at the same time.

The data thus encoded is sent to AV system unit 2, where the data is multiplexed in the MPEG stream format as stated above and added with header information and the like. Since in this AV system unit 2 multiplexing and addition of headers are implemented, AV system unit 2 should get and hold the positional information of the VU front points and reference pictures in VUs.

The management information of these pieces of positional information is transferred from AV system unit 2 to host microcomputer 5 for making the whole processing control and is sequentially held therein. The stream multiplexed through AV system unit 2 is temporarily stored into shock proof memory 3, where the data is exchanged with a signal processing unit 6, so that the data is subjected to ECC processing, sector codec and other processes, to thereby complete preparation for recording onto disk 7.

The thus prepared data for recording is recorded onto disk 7 at an address designated by host PC 5, through disk controller 4 at a certain timing. As stated above, host microcomputer 5 grasps the positional information of the front end of each VU, the reference pictures in the VU and PRU and creates information for constructing <Address LUT> based on these pieces of information.

<Non Contiguous Point> information should be created taking into account the held information of the stream and the addresses at which the stream of data is actually recorded onto the disk. Since the information as to post recording and the information as to closed GOP are determined beforehand on the host side, the determined values by the host should be recorded as they are as the management information of <Address LUT>.

Next, the disk device will be described. As stated already, <Address LUT> created for every recording of an EUS has to be recorded onto the recording medium at a certain timing. The management information can be recorded at various sites on the recording medium.

Figure 44:
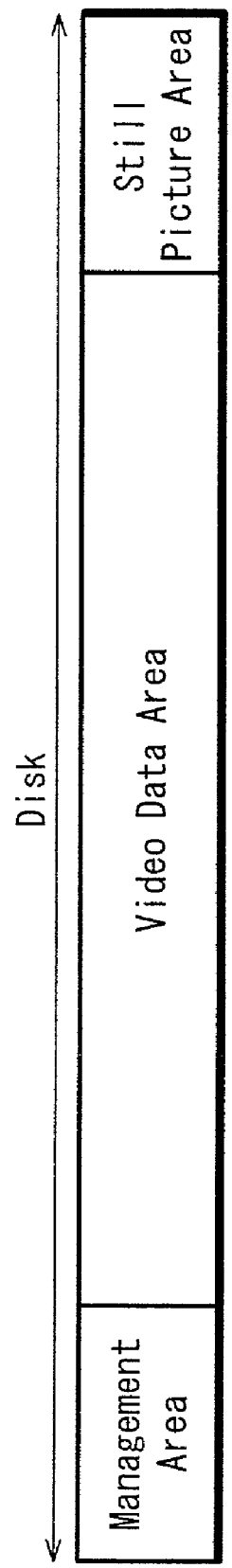
FIG. 44 is an illustrative view showing a disk area having a management information area therein in the first embodiment of a recording media management system of the present invention.

As shown in FIG. 44, the data area and the management information area can be separated by writing management information into a predetermined management information area on the recording medium. For example, if management information is recorded together, it is possible to efficiently read data from the disk in a short period of time when a multiple number of EUSs need to be accessed successively.

Further, there is a high possibility that the management information of this kind is updated frequently and complicatedly. Therefore, if such pieces of management information are scattered on the disk, it takes much time for disk access, resulting in lowered system response. Moreover, since no file of management information is formed in the data area, there is the advantage that the data is very likely to be arranged contiguously in the data area.

Figure 45:
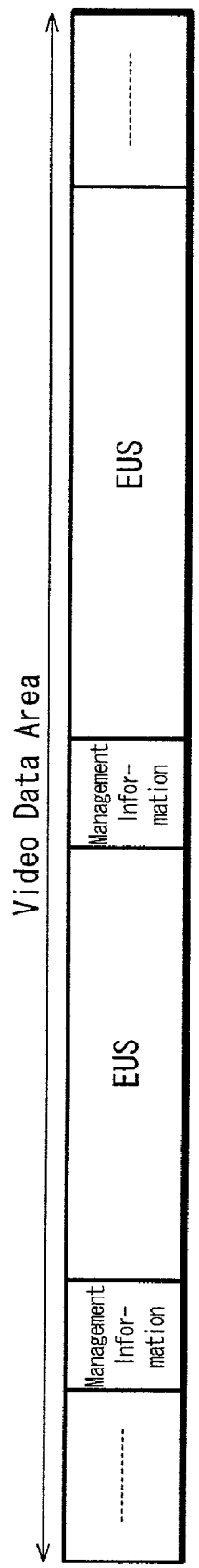
FIG. 45 is an illustrative view showing a case where management information is disposed at the front of each EUS in the first embodiment of a recording media management system of the present invention.

When each piece of management information is written in immediately before the stream of an associated EUS recorded in the data area in the recording medium as shown in FIG. 45, the management file of the EUS to be accessed is located in proximity to the real data. When an EUS is copied to another recording medium, which is connected via network, for example, the copy can be achieved by simple file copy because the real body of the EUS is managed as a file by the logical filesystem.

When the management information such as <Address LUT> for allowing for an access to an arbitrary frame in the EUS is arranged adjacent to the EUS, the management information can also be copied easily. Further, since the management information for each EUS is scattered on the disk, it is possible to reduce the risk of the management information being lost, compared to the case where the management information is recorded en masse at a site.

Figure 46:
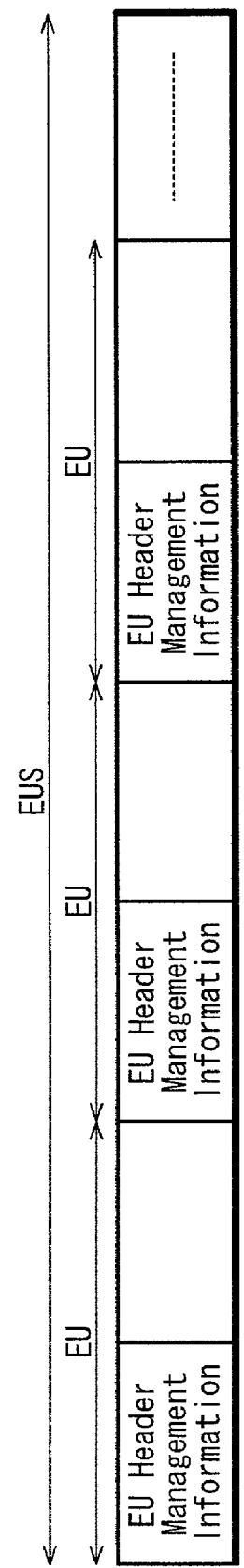
FIG. 46 is an illustrative view showing a case where management information is multiplexed into the stream by embedding it in EU Headers, in the first embodiment of a recording media management system of the present invention.

Management information may be recorded in a multiplexing manner in the stream of EUSs recorded in the data area of the recording medium as shown in FIG. 46. In this case, when, for example, the disk also has a management area holding the same information therein, if the management information has been lost due to some accident, the management information multiplexed in the stream makes it possible to back up the management information. Thus, this configuration has the advantage of increased safety.

Here, FIG. 46 shows an example where management information is stuffed into EU headers multiplexed in the stream.

Figure 47:
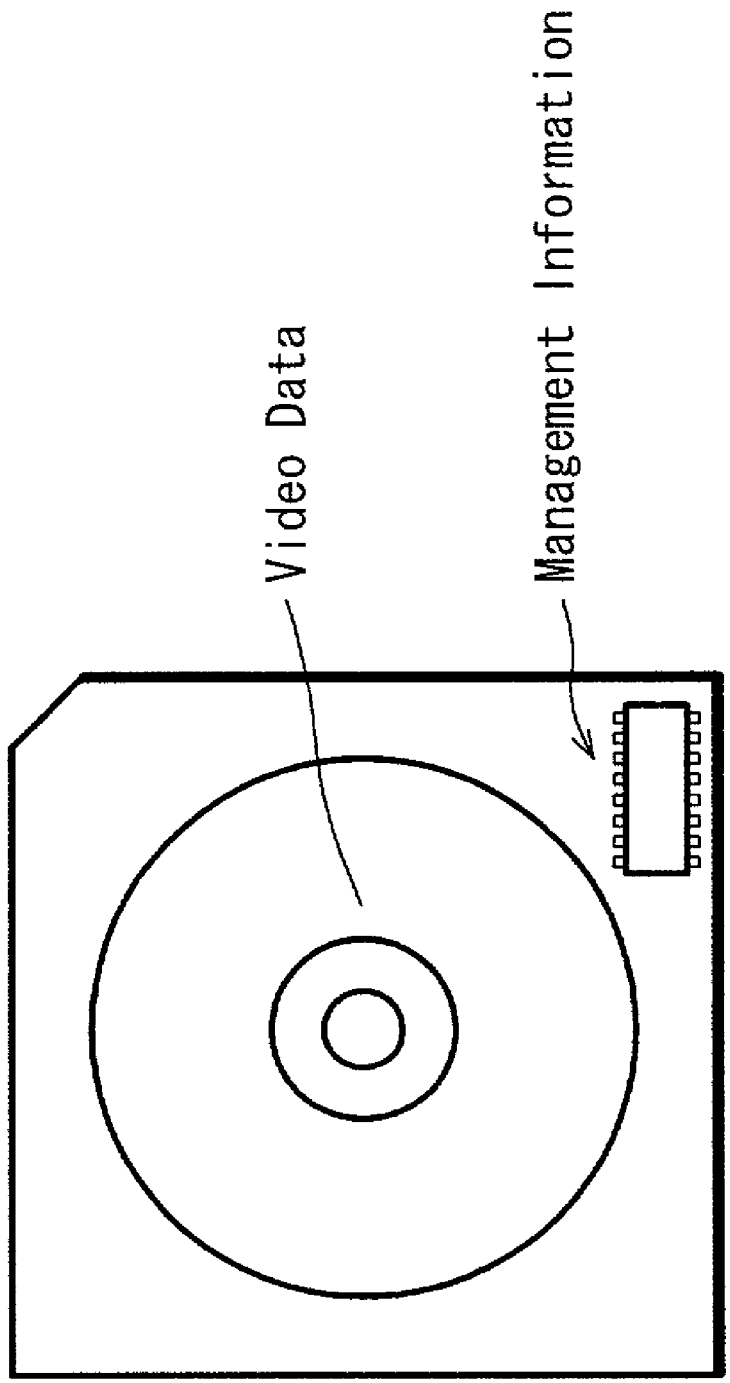
FIG. 47 is an illustrative view showing a case where management information is stored in a non-volatile semiconductor memory provided for the disk cartridge, in the first embodiment of a recording media management system of the present invention.

Further, as shown in FIG. 47, management information may be recorded into the non-volatile semiconductor memory, for example, provided in a disk device for reproducing the recording medium or another recording medium other than the recording medium with real data recorded therein, instead of being recorded into the recording medium itself that is recorded with real data.

For example, it is possible to consider a configuration where real data is recorded onto a removable disk while management information is recorded into a semiconductor memory or a hard disk in the disk device. Alternatively, in a removable disk, a separate non-volatile semiconductor memory may be provided in the disk cartridge so that the management information is recorded into the semiconductor memory. In this case, since the management information which is read out and written in frequently is stored in the semiconductor memory which allows for high-speed access, this configuration has the advantage that the system response will be improved.

As has been described, the management information can be recorded at different sites in various ways, each having different advantages. Of course, the management information may be written at multiple sites instead of being recorded at one site.

For example, when using the combination of the technique of recording management information at the predetermined management area and the technique of embedding the management information in the stream itself, the management information recorded in the predetermined management area is used under usual conditions, and in case the management information has been lost, the lost management information can be reconstructed based on the management information embedded in the stream.

The Second Embodiment

The description heretofore has been made as to the embodiment in which the MPEG stream includes PRUs, i.e., data areas for audio dubbing. Now, description will be made of an embodiment of <Address LUT> for a case where PRUs, i.e., data areas for audio dubbing, are provided in an extra file other than that for the MPEG stream over which audio dubbing is made or data of audio dubbing are recorded in an extra area. The aforementioned short titles are also used herein.

Figure 48:
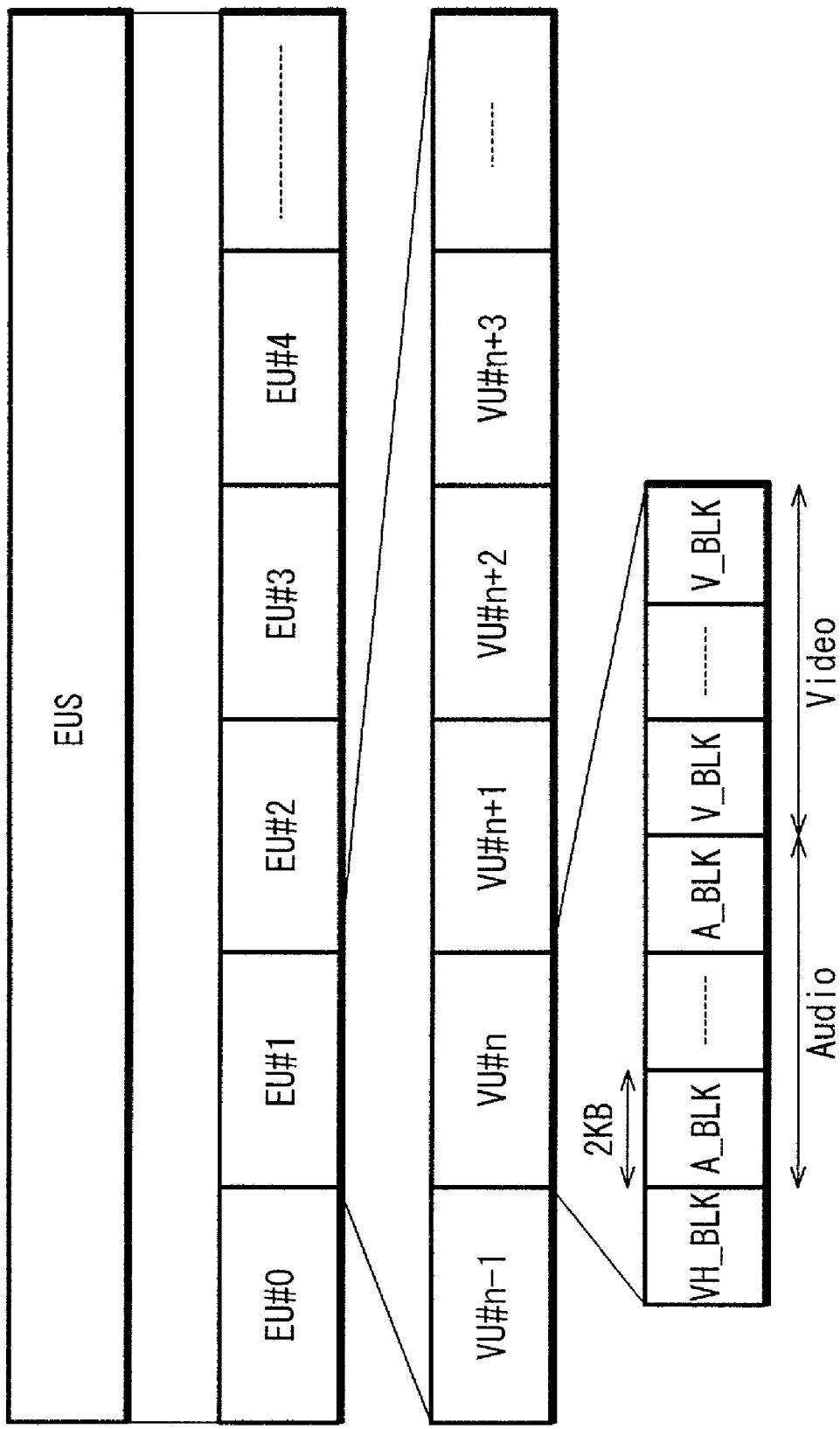
FIG. 48 is an illustrative view showing the relationship of blocks in an MPEG stream used in the second embodiment of a recording media management system of the present invention.

Referring first to FIG. 48, the MPEG stream composition in this embodiment will be described. As shown in FIG. 48, one EUS is composed of one or more EUs and corresponds to the unit from start of recording to the stop of recording or to a pause of recording. The MPEG data managed by one EUS has to be added with a sequence of time stamp.

Here, EU is the minimum unit for destructive edit. Destructive edit means an act of editing accompanied by a move or deletion on the disk. The minimum unit of destructive edit means that move and deletion on the disk can be done only EU by EU.

If some EUs are deleted from the middle of one EUS by destructive edit, the time stamp of the MPEG stream presents discontinuity, so that the EUS needs to be divided.

EU is composed of one or more VUs and has to be recorded continuously on the disk. The number of VUs in one EU is determined depending on the unit based on which post recording (audio dubbing) is performed. That is, the number is determined depending on the playback rate of data and mechanical performance for achieving real-time audio dubbing, i.e., audio dubbing while the video data over which audio dubbing is made is being played back.

VU is a unit comprised of <VU Header>, one or greater number of GOPs of video data, associated audio data. The presentation time of all the EUs and that of all the VUs in one EUS are set constant. The presentation time of VU corresponds to the playback time of video data managed by a single VU. Similarly, the presentation time of EU indicates the playback time of video data managed by a single EU.

The EUS is divided into blocks having a fixed length of 2048 bytes. One block is stored into one logical block on the disk. Principally, one block is constructed of one packet. The packet used here conforms to PES Packet defined by ISO/IEC 13818-1, and packets of this type should be recorded onto the disk.

In the drawing, VU is composed of a VH BLK, A BLKs and V BLKs. VH BLK stores a packet of the header information as to the VU. A BLK stores an audio packet defined by ISO/IEC 13818-3. VBLK stores a packet of video data defined by ISO/IEC 13818-2. The thus configured EUS is managed as one file on the disk.

Figure 49:
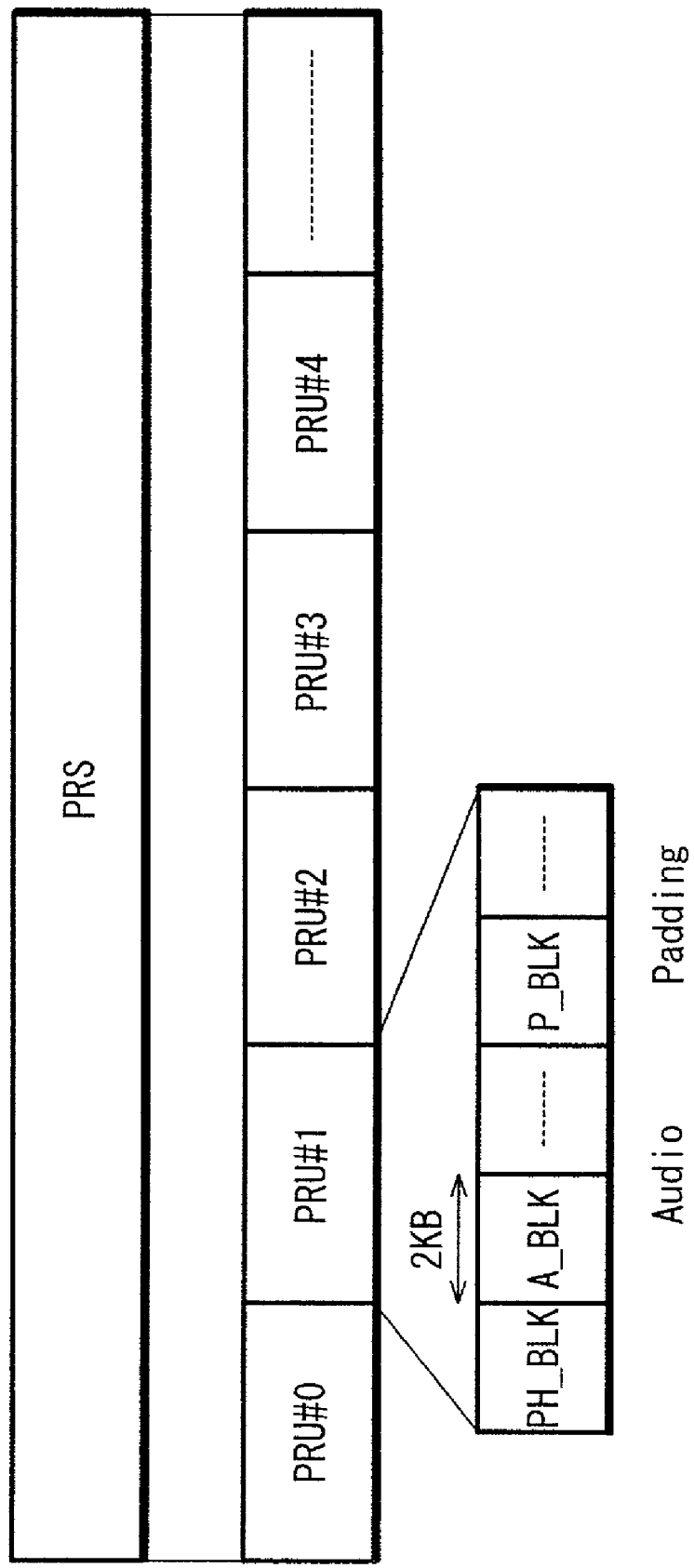
FIG. 49 is an illustrative view showing the relationship of blocks in an MPEG stream used in the second embodiment of a recording media management system of the present invention.

On the other hand, in the stream configuration shown in FIG. 49, a post recording sequence PRS (to be abbreviated as 'PRS' hereinbelow) is composed of a multiple number of PRUs. One PRU serves as a receptacle for recording audio dubbing data corresponding to one EU in an EUS. PRU is composed of a PH BLK, A BLKs, P BLKs. PH BLK stores a packet of the header information as to the PRU. A BLK stores an audio packet defined by ISO/IEC 13818-3. P BLK stores a padding packet defined by ISO/IEC 13818-1. Since a PRU is an area for post recording data to be reproduced in synchronization with the video data in the associated EU, it should have at least an area size capable of recording data equivalent to the presentation time of video data in the EU. The thus configured PRS is managed as one file on the disk.

The PRS file in its initial state has no PRU recorded therein. That is, PRUs are added one by one to the PRS file in the course of audio dubbing in EU units. Therefore, the recorded order of the PRUs in the PRS file is the order in which audio dubbing has been performed, hence does not always coincide with the sequential order of EUs in the EUS.

When using a disk with an MPEG stream recorded thereon playback from an arbitrary frame is started or a special playback such as reproducing arbitrarily selected frames is implemented, it is impossible as stated above to locate the recorded position of an arbitrary frame on the disk by calculation or other method because the amounts of data of individual frames of MPEG data recorded on the disk are different from one another. This is why management information, i.e., <Address LUT> for making an access to an arbitrary frame is needed, so the content will be described next.

In this embodiment, post recording indicates audio dubbing, which is performed by post recording sound only over the original data already recorded. PRUs indicate areas in which post recording data will be recorded when audio dubbing is implemented, and are recorded into a separate file from the EUS file, namely a PRS file.

Next, description will be made of under what situation <Address LUT> should be used. A section of MPEG data recorded by the user from its recording start to recording stop or to pause is defined as one EUS.

Figure 50:
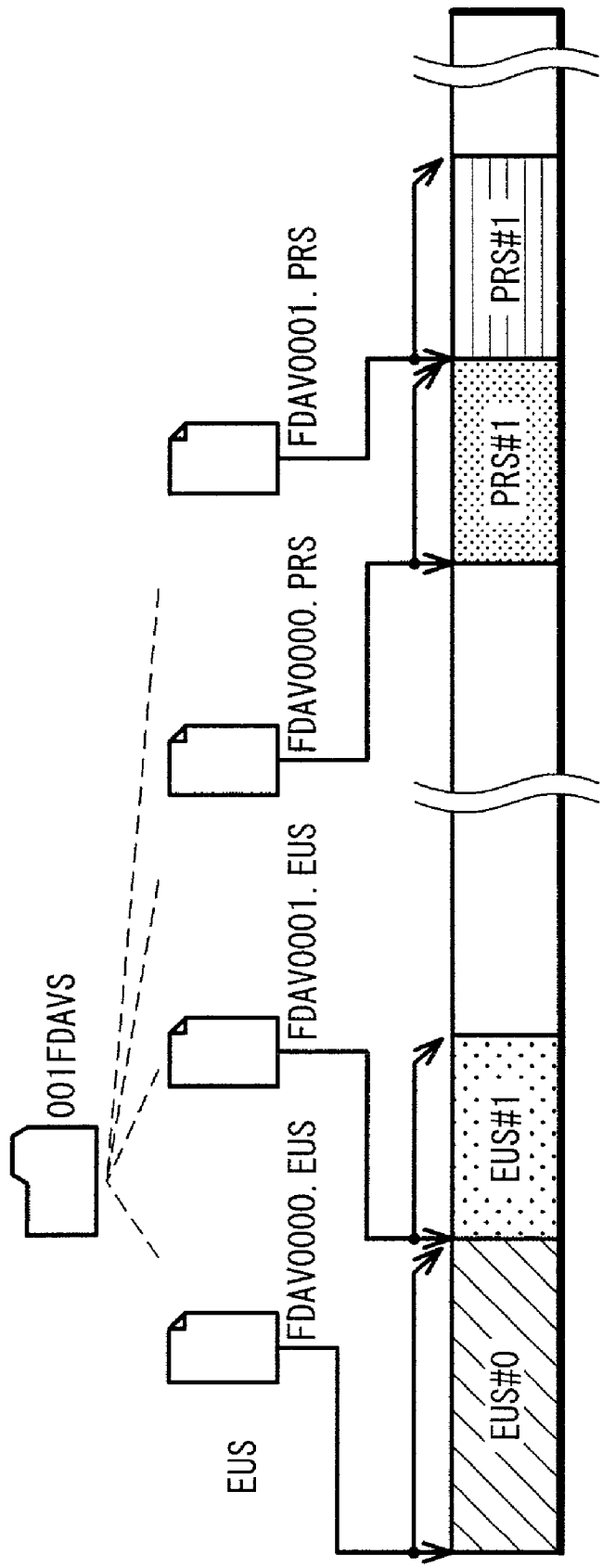
FIG. 50 is an illustrative view showing EUSs and PRSs managed as files by a logical filesystem in the second embodiment of a recording media management system of the present invention.

It is assumed that actual MPEG data is recorded as files by EUS units of video and original audio data, using a logical filesystem which manages the positional information of data on the disk by file names while audio dubbing data is managed as files, i.e., PRS files, separately from EUSs. This configuration is shown in FIG. 50. In this example, EUS#0 and EUS#1 are managed as file names of FDAV0000.EUS and FDAV0001.EUS, respectively, and PRS files (audio dubbing files) corresponding to EUS#0 and EUS#1 are managed as file names of FDAV0000.PRS and FDAV0001.PRS, by the logical filesystem.

To manage EUS data in EUS units, management information called <EUS Information> is created. That is, if the user recorded multiple scenes, each corresponding to data from recording start to recording stop, an equal number of <EUS Information> is created.

One example of <EUS Information> is shown in FIG. 51. <EUS Information> is the information to manage an EUS recorded on the disk. As shown in FIG. 51, <EUS Information> has its ID for its distinction, size, title information, creation date and updated date of the EUS, text information, thumbnail information for managing a representative thumbnail of the EUS, <Data File ID> and <PRS File ID> for identifying the EUS of the MPEG stream data and the RPS file as an audio dubbing data file, managed by the logical filesystem, <Data File Size> and <PRS Data Size> representing the data sizes of the EUS and PRS, property information such as EUS, video, audio, camera, post recording, source, copyright, still picture, etc.

The EUS information also has reference information which reveals the programs which refer to the EUS managed thereby. Further, as the management information of importance, <Start PT>, <End PT>, <Post Recording Unit Size> and <Address LUT> can be mentioned.

Recorded into <Start PT> and <End PT> are PTS values, attached to the data stream itself at the first and last display frames in the EUS managed by this <EUS Information>, or the corresponding PTS values, converted in PT format. Since one EUS always handles a piece of video data having sequential time stamp, the total presentation time of the EUS can be calculated by subtracting <Start PT> from <End PT>, for example.

<Post Recording Unit Size> is the information representing the size of the PRU. It should be noted that the size of each PRU within the same PRS is constant. <Address LUT> is the management information which provides where on the disk access should be made to for an arbitrary frame of the MPEG data and corresponding audio dubbing data recorded on the disk. In the above way, based on <EUS Information>, it is possible to obtain the information as to an EUS and PRS files recorded as files on the disk.

When the MPEG data recorded by the user is played back serially from the front in the order recorded, it is possible to perform playback without the aforementioned <Address LUT>. However, if, taking advantage of random accessibility of the disk, for example, the user tries to select an arbitrary number of arbitrary sections from EUSs which are the original data in its recorded state and reproduce in an arbitrary order, the management <Address LUT> will be needed.

Next, a method of determining the start addresses of PRUs and VUs in the aforementioned MPEG stream by calculation will be described herein below.

In reproducing an MPEG stream, there is a possibility that the user may have implemented post recording (audio dubbing). Therefore, if there exist PRUs corresponding EUs, this should be checked using aftermentioned <PRU Status> or <PR Existence> in <VU Status>.

<PR Existence> in <PRU Status> of <PRU Information> is the management information showing whether there exists a PRU corresponding to each EU in the PRS file. <PR Existence> in <VU Status> of <VU Information> is the management information showing whether there exists post recording data corresponding to the managed VU.

When a piece of post recording data exists and needs to be reproduced, it is necessary to read the corresponding PRU (audio dubbing data) beforehand prior to access to the target EU, then reproduce the read, PRU in synchronization with the video when the video data in the EU is played back.

In this way, use of the <PR Existence> information makes it possible to grasp beforehand whether or not there are corresponding PRUs in the PRS file and whether or not post recording has been made.

FIG. 52 shows an example of management information of <Address LUT>. The definitions will be described consecutively hereinbelow. FIGS. 53 through 57 show the details of the management information in FIG. 52.

In FIG. 53, <Address Offset> stores an offset value for creating relative logical block numbers (RLBN) managed by the <address LUT>, in Unit 32 format. When an arbitrary number of EUs have been deleted from the front part of the EUS, the number of the deleted logical blocks is set into this field.

Accordingly, when referring to a relative logical block number (RLBN of VU) for managing the start address of a VU handled in <Address LUT>, it is necessary to subtract this <Address Offset> from that value. The initial value has to be set at 0.

<PB Time of EU> represents the set presentation time of each EU in the EUS managed by the <address LUT>. The set presentation time is the playback time of the video data in one EU and is constant within the same EUS, except the last EU in the EUS.

<PB Time of EU> should be recorded in PT Format. Here, <PB Time of EU> should be an integer multiple of the difference in PTS, represented in PT Format, between adjacent video frames in the MPEG stream, i.e., the PTS corresponding to the presentation time per frame.

<PB Time of VU> represents the set presentation time of each VU in the EUS managed by the <address LUT>. The set presentation time is the playback time of the video data in one VU and is constant within the same EUS, except the last VU in the EUS.

<PB Time of VU> should be recorded in PT Format. Here, <PB Time of VU> should be an integer multiple of the difference in PTS, represented in PT Format, between adjacent video frames in the MPEG stream, i.e., the PTS corresponding to the presentation time per frame.

<Number of PRU Information> is the number of EUs existing in the EUS managed by the <address LUT>, recorded in Unit 32 format. Since each <PRU Information> corresponds to one EU. If there exists no PRU in the stream configuration, this field should be always set at 0.

<Number of VU Information> is the number of VUs existing in the EUS managed by the <Address LUT>, recorded in Unit 32 format.

<PRU Information> manages the information as to the PRU corresponding to each EU in the EUS, in the manner as shown in FIG. 54. When there is no PRU existing for the EUS, <Number of PRU Information> is recorded with 0 and no record is written into <PRU Information>. If even one PRU corresponding to an EU in the EUS exists, each of the EUs should have one <PRU Information> of their own.

<RLBN of PRU> represents the start address on the disk of the PRU managed by this <PRU Information>. Here, the address is represented by the relative logical block number from the front of the PRU file. <RLBN of PRU> should be recorded in Unit 24 format. <PRU Status> manages the state of the PRU managed by this <PRU Information>, in the manner as shown in FIG. 55.

<PR Existence> (Bit0) is recorded with '1' when the PRU corresponding to this PRU Information exists in the PRS file, and is recorded with '0' when no PRU exists.

<VU Information> (FIG. 53) manages the information as to each VU in the EUS, in the manner as shown in FIG. 56(*a*) or FIG. 56(*b*). It should be noted that in FIG. 56(*a*) the positional information of the video frames managed within the VU is given as either the start address or end address while in FIG. 56(*b*) the positional information is given as both the start address and the end address.

<RLBN of VU> represents the start address on the disk of the VU managed by this <VU Information>. This address is represented by the relative logical block number from the front of the EUS file. <RLBN of VU> should be recorded in Unit 24 format.

<VU Status> manages the state of the VU managed by this <VU Information> in the manner as shown in FIG. 57(*a*) or FIG. 57(*b*). FIG. 57(*a*) shows a case where <Non Contiguous Point> information is defined and FIG. 57(*b*) shows a case where <Non Contiguous Point> information is not defined.

<PR Existence> (Bit0) is recorded with '1' when post recording data corresponding to the VU managed by this <VU Information> is present and is recorded with '0' when no post recording data is present. If there is no PRU corresponding to the EU to which this VU belongs, this field should be always recorded with '0'.

<Closed GOP> (Bit1) manages whether the first GOP in the VU is a closed GOP. If the GOP is a closed one, this field is recorded with '1'. Otherwise, it is recorded with '0'. When the GOP is not a closed one, there is a possibility that some of the first frames of video cannot be decoded without information of the previous GOP.

<Non Contiguous Point> (Bit2) (FIG. 57(*b*)) manages whether the EU to which the VU managed by this <VU Information> belongs is arranged on the disk logically and contiguously with the previous EU. When they are arranged contiguously, this field is recorded with '0'. When they are not arranged contiguously, the field is recorded with '1'.

<Number of IP Pictures> (FIG. 56) records the number of the positional information of I-pictures and P-pictures in the video data to be managed by this <VU Information>, in Unit8 format.

<End RLBN of IP Pictures> (FIG. 56(*a*)) manages the end addresses on the disk of the I-pictures and P-pictures in the VU managed by this <VU Information>. The address herein is represented by the relative logical block number from the front of the VU.

As the first entry the address information as to the first I-picture in the VU should be stored. As the second entry and downward, the address information as to I-pictures and/or P-pictures should be stored in Unit16 format.

In connection with this, when a semiconductor memory having high-speed access performance is adopted as the recording medium or when a disk drive having markedly high-access performance is used, the start addresses should be also given as the positional information of the reference pictures, in addition to their end addresses. In this case, the field name of this item is renamed as <RLBN of IP Pictures> and both the start address and end address should be recorded serially in Unit16 format.

It is also possible to put the positional information of all the video frames under control, instead of the addresses of the reference pictures only. The positional information in this case should be represented by the record start position of each video frame on the disk. The amount of data of each frame and the end address can be calculated simply using the difference from the start address of the next frame.

All the above is the management information for <Address LUT>.

Figure 58:
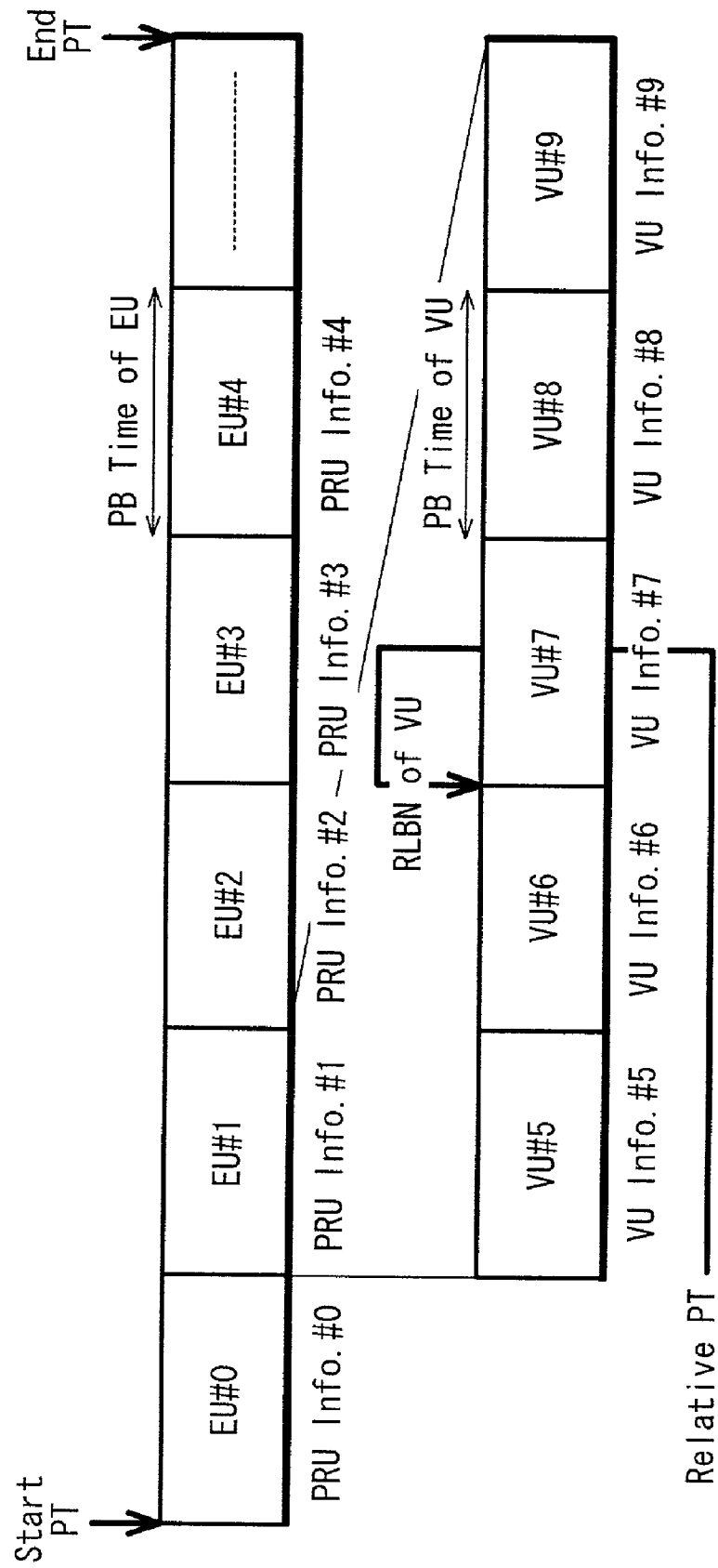
FIG. 58 is an illustrative view showing a method of calculating the start address of a VU in the second embodiment of a recording media management system of the present invention.
Figure 59:
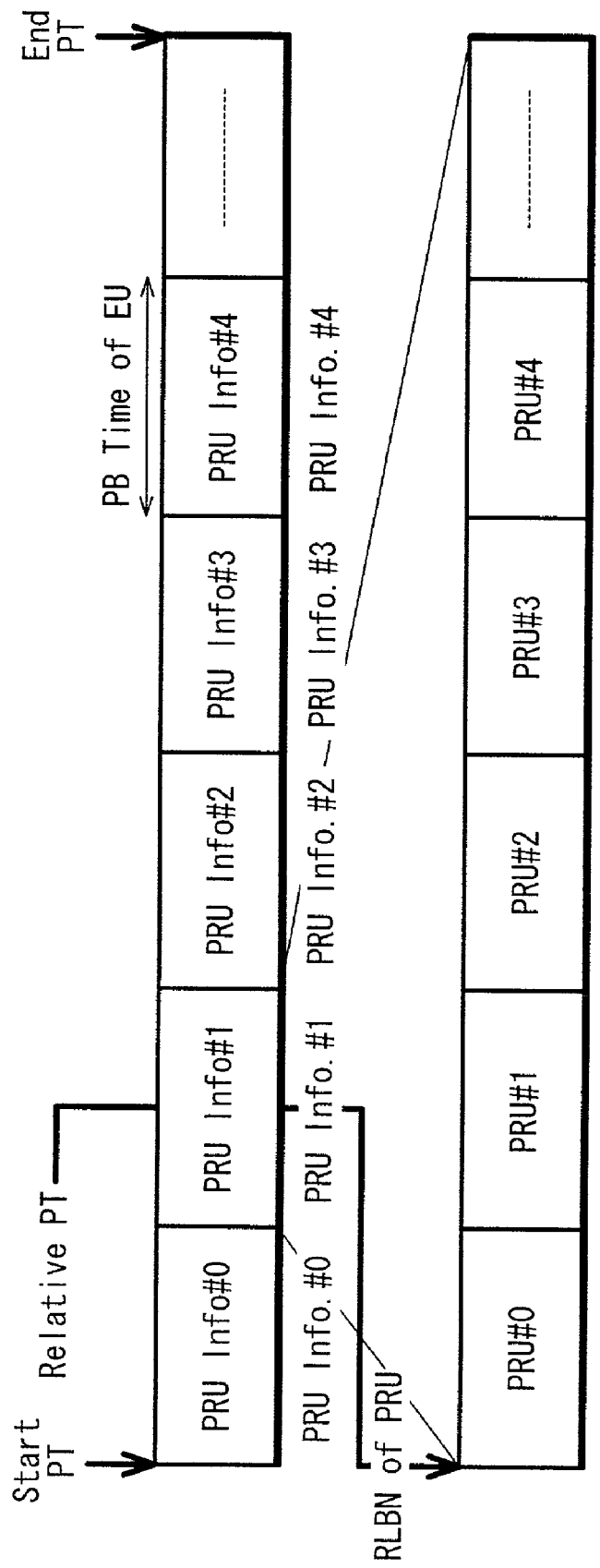
FIG. 59 is an illustrative view showing a method of calculating the start address of a PRU in the second embodiment of a recording media management system of the present invention.

Next, specific usage of these pieces of management information will be described with reference to FIGS. 58 and 59.

First, description will be made of how to calculate the start address of the VU including a target frame. When playback is desired to be started from a frame corresponding to an arbitrary PT in an EUS, the starting position on the disk of the VU including that frame should be determined based on <Address LUT>.

The basic processing sequence for this will be as follows. FIG. 58 shows this case.

(1) Relative PT (RPT) is calculated by subtracting <Start PT> (FIGS. 51–58) corresponding to the first display frame in the EUS from the target PT. <Start PT> is the PTS value, attached to the MPEG stream at the first display frame in the EUS, or the corresponding PTS value, converted in PT format.

RPT=PT−Start PT

As stated above, since the information as to the start point and end point, which is designated from each user program so as select an arbitrary section, is represented by absolute PT values, attached to the stream or corresponding values, subtraction of <Start PT> from the values will provide relative time information from the front of the EUS.

Here, the fact that absolute time information is used in user programs means that if, for example, some part in the front part of the EUS was deleted, there is no need to renew the start point and end point information of all the user programs which refer to this EUS as the reference information as long as <Start PT> in <EUS Information> (FIG. 51) is modified, thus making it possible to reduce the process load.

(2)<VU Information Number> (FIG. 52) of the VU including the frame from which the start of playback is desired is obtained by dividing the relative PT (RPT) by the set presentation time (<PB Time of VU> (FIGS. 52 and 58) of each VU in the EUS. In FIG. 58 this value is VU#7.

VU Info Num=*ip*(RPT/PB Time of VU), where ip(n) is a function that produces the maximum integer not greater than n.

(3) From the obtained <VU Information Number>, the start address of the VU including the target frame is obtained as the relative logical block number 'RLBN of VU'' from the front of EUS.

RLBN of VU'=RLBN of VU(VU Info Num), where expression 'RLBN of VU(n)' represents the value of <RLBN of VU> of the nth <VU Information>.

In the above way, the start address of the VU including a target frame can be determined by simple calculation using <Address LUT>, instead of searching or other operations.

Next, description will be made of how to calculate the start address of the PRU corresponding to the EU including a target frame. The basic sequence of calculating the start address of the PRU corresponding to the EU including a target frame will be as follows. FIG. 59 shows this situation.

The frontmost end of the PRU is a point which needs to be accessed to when post recording data corresponding to the target frame is present.

(1) Relative PT is calculated by subtracting <Start PT> corresponding to the first display frame in the EUS from the target PT.

RPT=PT-Start PT (2) The number of the EU including the frame from which the start of playback is desired is obtained by dividing the relative PT (RPT) by the set presentation time (<PB Time of EU> of each EU in the EUS. Since each EU corresponds to one <PRU Information>, this EU number directly represents <PRU Information Number>. In FIG. 59, this value is PRU info#1.

PRU Info Num=$ip$(RPT/PB Time of EU), where ip(n) is a function that produces the maximum integer not greater than n.

(3) From the obtained <PRU Information Number>, the start address of the PRU corresponding to the EU including the target frame is obtained as the relative logical block number 'RLBN of PRU" from the front of the PRS file.

RLBN of PRU'=RLBN of PRU(PRU Info Num).

Here, <PR Status> in <PRU Information> being '0' means that no corresponding PRU exists in the PRS file.

In the above way, similarly to the way of determining the VU start address, the start address of the PRU to be reproduced in synchronization with the VU including a target frame can be determined by simple calculation using <Address LUT>, instead of searching or other operations. Therefore, if for example, a particular PRU is read out from the disk, the amount of data equivalent to the size of the PRU managed by <EUS Information> should be read out from the determined start address of the PRU.

Figure 60:
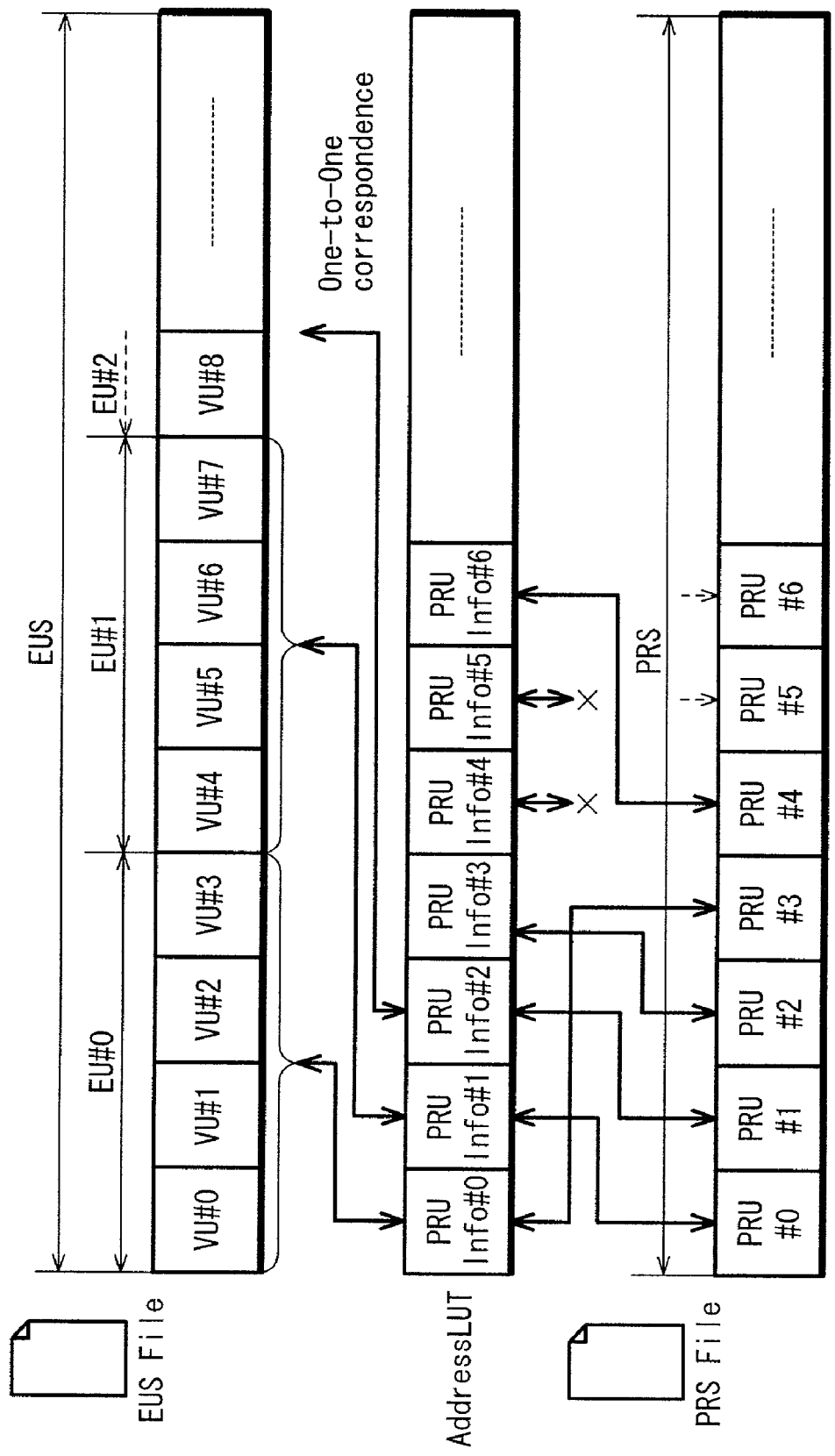
FIG. 60 is an illustrative view showing the relationship between an arbitrary EU and PRUs in an EUS file, together with its Address LUT, in the second embodiment of a recording media management system of the present invention.

Now, the relationship between arbitrary EUs in an EUS file and PRUs in a PRU file will be described involving <Address LUT>, with reference to FIG. 60. In the example of this drawing, in an EUS file of an MPEG data stream from the start of recording to the end of recording or pause, one EU is composed of four VUs. <PRU Information> in <Address LUT> is created for each EU. Therefore, a corresponding number of pieces of <PRU Information> exist as the number of EUs in the EUS file, arranged in the order from the first EU in the EUS. <PRU Information> corresponding to each EU has apiece of information <PRU Status> that represents whether there is a corresponding PRU in the PRS file. In the example illustrated, PRU Information#4 and #5 does not exist, or no PRUs corresponding to EU#4 and EU#5 exist in the PRS file. PRUs corresponding to EU#1 to #3, i.e., PRU information #1 to #3, are recorded as PRUs#0 to #2 in the PRS file. PRU Information #0, or PRU corresponding to EU#0 is recorded as PRU#3 in the PRS file. In this way, PRUs are added to the PRS file in the order recorded, so that PRUs are not necessarily arranged in the same order as EUs.

When audio dubbing data is reproduced in synchronization with the video data of the EUS of the above structure, prior to reading each EU from the front of EUS, data of the corresponding PRU is read out from the disk. Subsequently, the EU data is read out so that the video data is reproduced whilst taking synchronism with the audio dubbing data already read. In this way, these units of data are read alternately in such a manner that PRUs and EUs are read one after another.

Figure 61:
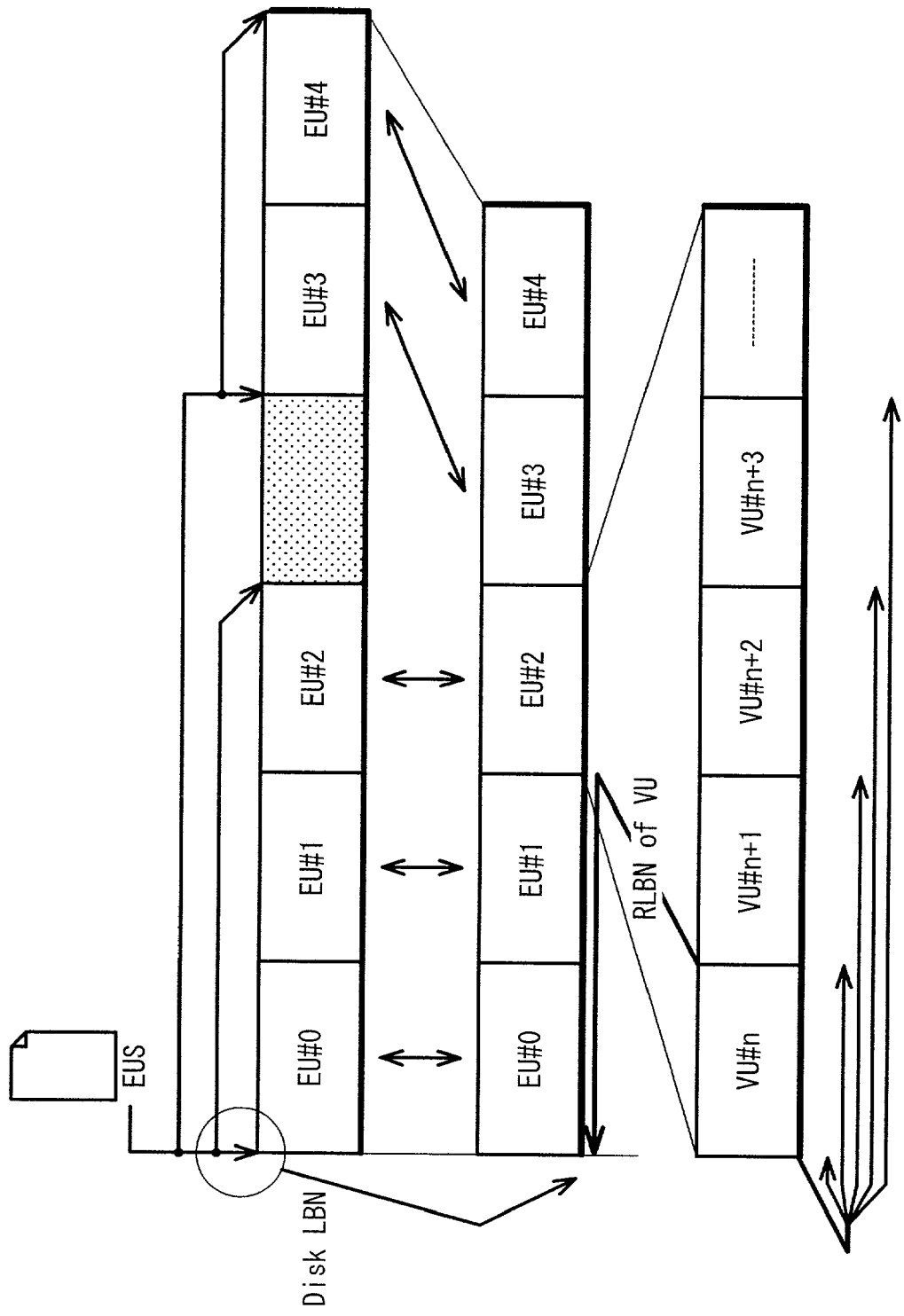
FIG. 61 is an illustrative view showing relative address information in the Address LUT in the second embodiment of a recording media management system of the present invention.
Figure 62:
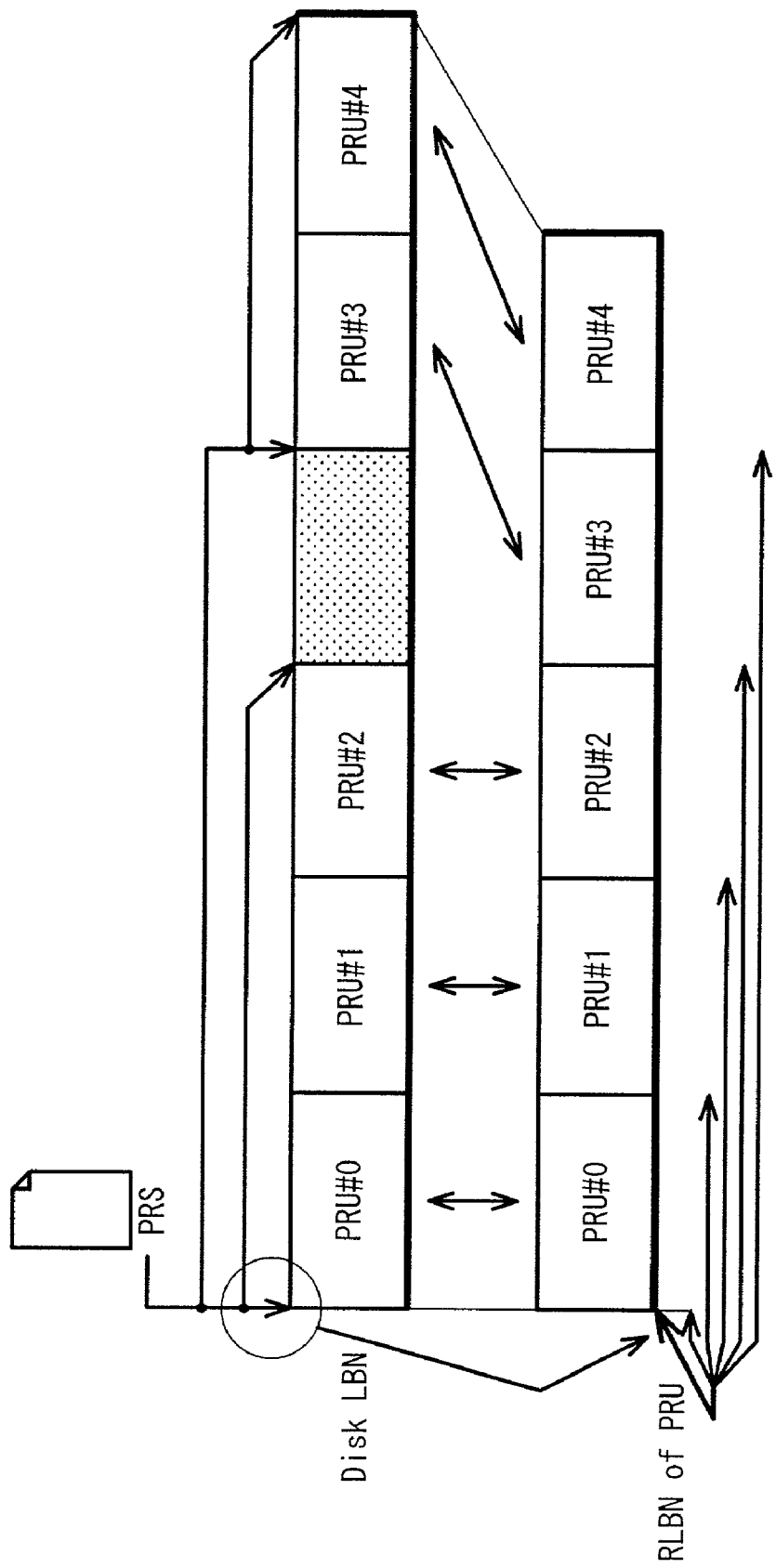
FIG. 62 is an illustrative view showing relative address information in the Address LUT in the second embodiment of a recording media management system of the present invention.

As already described, EUSs and PRSs are managed as files using the logical filesystem. Even when a certain EUS or PRS is recorded, divided partwise, on the disk, all the information as to the fact of division is assimilated at the logical filesystem level. Therefore, as shown in FIGS. 61 and 62, there is no need to give concern as to the fact of division in the representation of <Address LUT>.

<RLBN of VU> and <RLBN of PRU> in <Address LUT> (FIG. 52) are given by relative address representations based on the front of the EUS or PRS, and even when an EUS or PRS has been recorded, divided partwise, on the disk, the management by <Address LUT> is made on the assumption that the EUS or PRS is arranged continuously.

The access length (the number of logical blocks) designated for disk access can be determined by calculation. For example, the size of one EU or VU can be determined simply by the difference from the start address of the next EU or VU. The size of PRU is constant within the same EUS.

The relative address system based on the start of EUS in <Address LUT> needs to be modified when some front part of the EUS was deleted. Specifically, <Address LUT> should be renewed by subtracting the number of deleted logical blocks from each piece of information represented in the relative address system based on the start of the EUS in <Address LUT>. In order to save the job of renewing all the addresses in the management information, the <Address Offset> value (FIG. 53) for storing the number of deleted blocks is prepared to deal with the case when an arbitrary number of EUs have been deleted from the front of the EUS.

Figure 63:
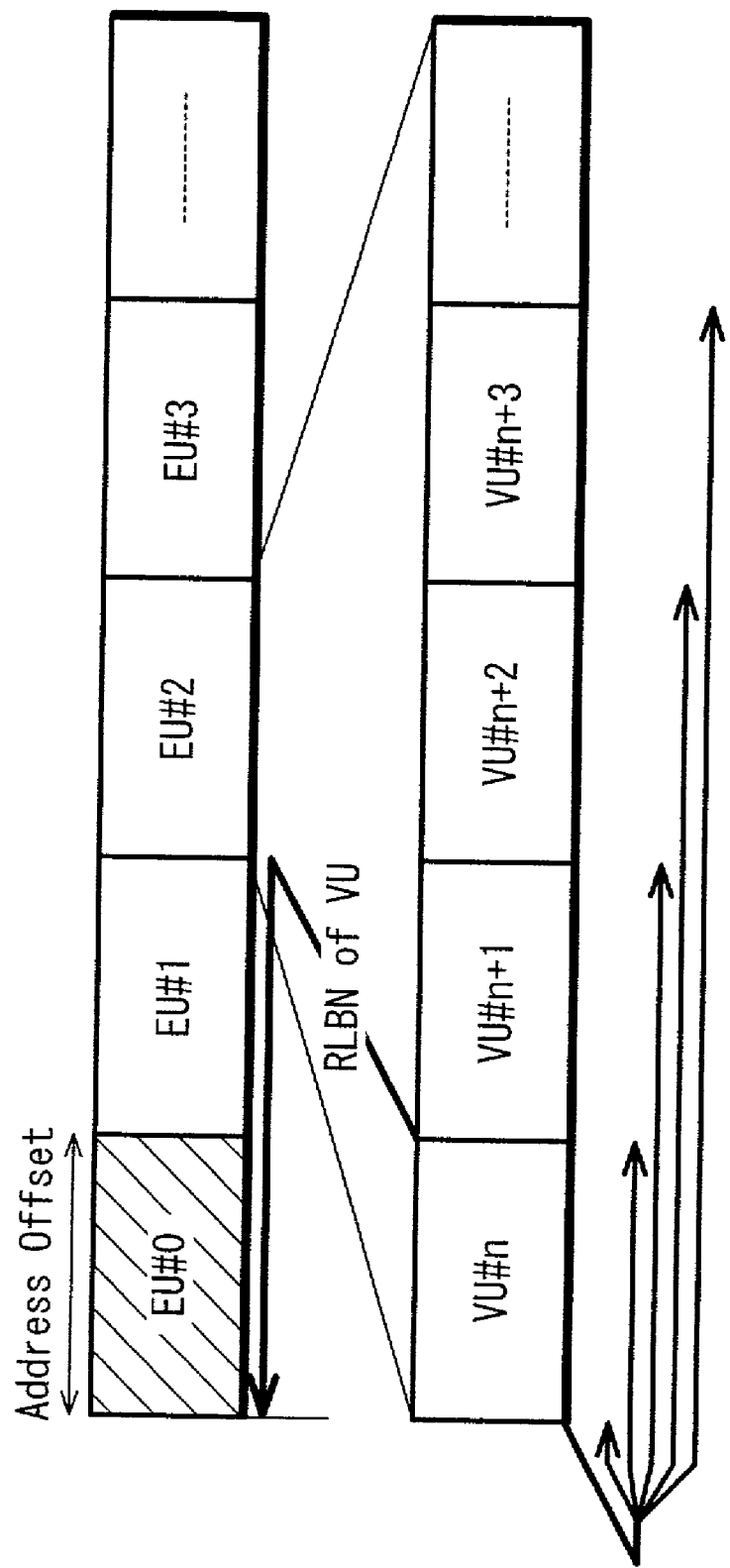
FIG. 63 is an illustrative view showing Address Offset information in the second embodiment of a recording media management system of the present invention.
Figure 64:
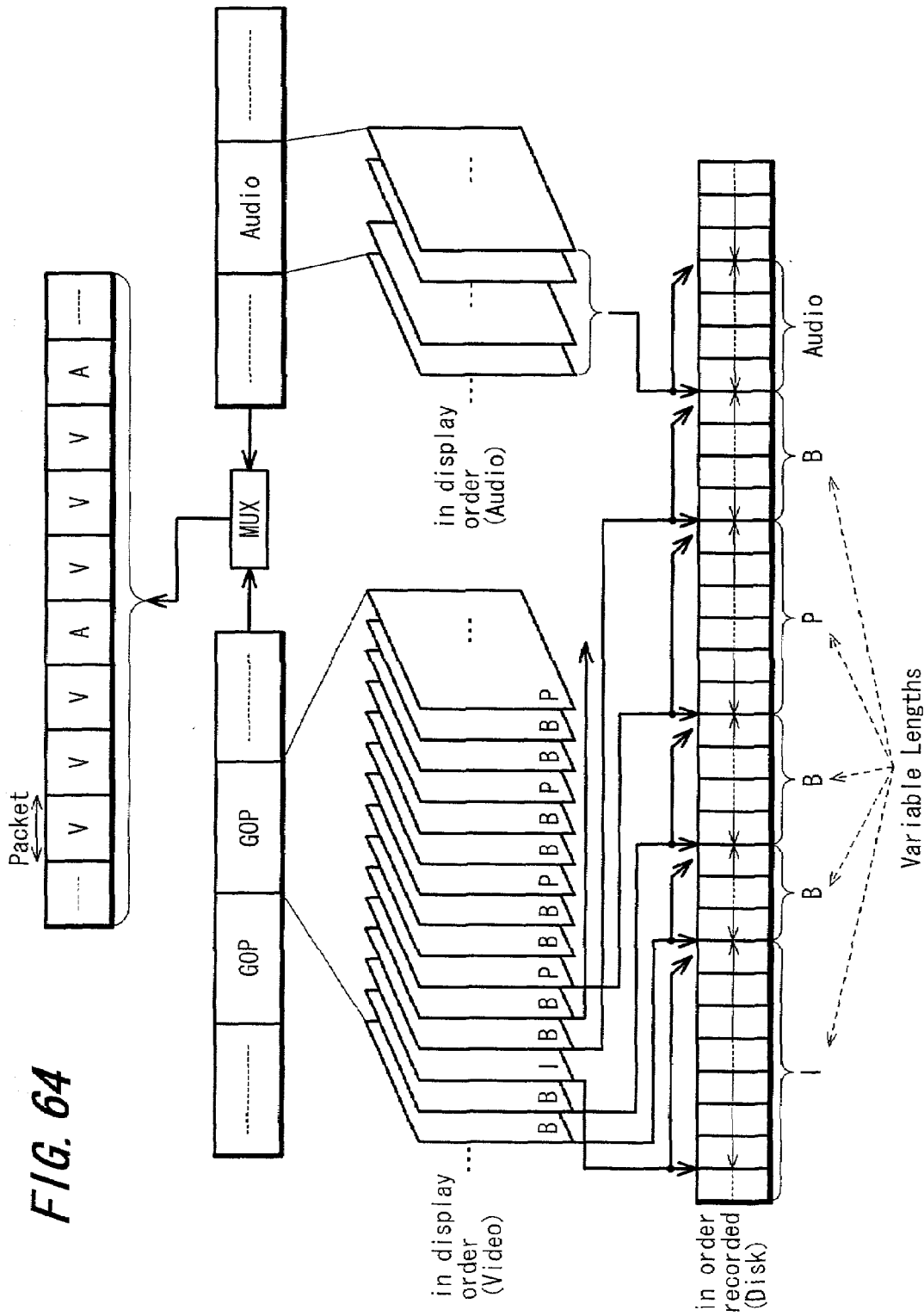
FIG. 64 is an illustrative view showing how MPEG data as a variable-length coding technique is recorded on a disk.

For example, as shown in FIG. 63, if EU#0 is deleted, it is no longer necessary to renew the values of 'RLBN of VU' in <Address LUT> when using this <Address Offset>.

That is, by subtracting the <Address Offset> value from the address in <Address LUT>, the correct value can be obtained. Accordingly, the relative address of a VU from the start of EUS can be determined finally by the following formula:

RLBN of VU'=RLBN of VU-Address Offset.

In contrast, <RLBN of PRU> represented in the relative address system based on the start of the PRS file in <Address LUT> needs to be modified when the front part of PRS was deleted. Specifically, <Address LUT> should be renewed by subtracting the number of deleted PRU logical blocks from each piece of information represented in the relative address system based on the start of the PRS in <Address LUT>. However, the records in PRUs are audio data, hence the size of data is small compared to video data. Therefor, when an arbitrary PRU is desired to be deleted, update of PRU Status in PRU Information is able to produce the same effect as the delete of the PRU, without actual modification of the PRS file. Further, when, for example, audio dubbing data already recorded is discarded and replaced with new audio dubbing, renewal of audio dubbing data can be made by extracting from PRU Information a piece of PRU Information corresponding to the EU over which audio dubbing will be made and recording audio dubbing on the PRU at the position designated at <RLBN of PRU>.

In the second embodiment, an embodiment of <Address LUT> for a case where PRUs, i.e., data areas for audio dubbing, are recorded as an extra file or extra area other than that for the MPEG stream over which audio dubbing is made, has been described in combination with part of the first embodiment, but modifications other than the data area for audio dubbing described in the first embodiment can be added appropriately also in this embodiment.

As has been described, according to the first aspect of the present invention, in a multimedia data stream, the positional information of an arbitrary frame on the recording medium can be easily obtained without the necessity of complex calculation.

According to the second aspect of the present invention, in a multimedia data stream, the positional information of a first unit of data, which is the minimum editable unit for an arbitrary frame, on the recording medium can be easily obtained without the necessity of complex calculation.

According to the third aspect of the present invention, in a multimedia data stream, the positional information of a second unit of data required for access to an arbitrary frame, on the recording medium can be easily obtained without the necessity of complex calculation.

Further, since positional information of second units of data which are frequently referenced is given as management information, it is possible to refer to management information efficiently without the necessity of calculation of the positional information.

According to the fourth aspect of the present invention, in a multimedia data stream, the positional information of a second unit of data required for access to an arbitrary frame on the recording medium as well as the positional information of a first unit of data, which is the minimum editable unit for an arbitrary frame, on the recording medium can be easily obtained without the necessity of complex calculation.

According to the fifth to seventh aspects of the present invention, the positional information of post recording audio data on the recording medium, which should be reproduced in synchronization with the predetermined data, can be easily obtained in relation with the positional information of the individual units of data without the necessity of complex calculation.

According to the eighth to tenth aspects of the present invention, the positional information of post recording audio data on the recording medium, which should be reproduced in synchronization with the predetermined data, can be easily obtained without the necessity of complex calculation.

According to the eleventh aspect of the present invention, reading and writing of a plurality of pieces of management information can be done in a short period of time.

According to the twelfth aspect of the present invention, since the data area and the management information area are separated clearly, no file of management information will be created in the data area. Therefore, contiguous arrangement of data in the data area can be realized.

According to the thirteenth aspect of the present invention, the data to be reproduced is arranged in proximity to the management information so that it is possible to realize an increased processing speed.

According to the fourteenth aspect of the present invention, since the management information area is provided for a recording medium having a higher access speed than the data recording medium, it is possible to realize a faster response.

According to the fifteenth and sixteenth aspects of the present invention, the data recording media managing device, in a data recording medium in which the base unit of data is divided into the first units of data and the second units of data based on playback time, manages the reference position information and the first relative distance information in the management information area. Therefore, the managing device, using time information as the key information, can convert it into positional information by a simple process, thus making it possible to have easy access to an arbitrary frame in the unit of data.

Further, even when a plurality of pieces of management information should be read or written, it is possible to have it done in a short period of time. Since the data area and the management information area are separated clearly, no file of management information will be created in the data area. Therefore, contiguous arrangement of data in the data area can be realized.

According to the seventeenth aspect of the present invention, since the positional information of post recording audio data can be also obtained by a simple process, using time information as the key information, post recording audio data can be reproduced efficiently.

According to the eighteenth aspect of the present invention, the data to be reproduced is arranged in proximity to the management information so that it is possible to realize an increased processing speed.

According to the nineteenth aspect of the present invention, this configuration will not make the stream composition complex, so makes it easy to access the other units of data.

According to the twentieth aspect of the present invention, since when some front part of the multimedia stream has been deleted, the positional information of the deleted data is recorded as management information, i.e., the offset value, this makes it unnecessary to renew each piece of positional information in various pieces of management information, thus making it possible to save the editing job.

According to the twenty-first aspect of the present invention, since the playback rate of video data in the first unit of data can be determined by calculation, it is possible to grasp the playback rate of data beforehand, without reproducing the video data.

According to the twenty-second aspect of the present invention, since the playback rate of video data in the second unit of data can be determined by calculation, it is possible to grasp the playback rate of data beforehand, without reproducing the video data.

According to the twenty-third aspect of the present invention, since start addresses are given in a relative address representation, which disregards the divided arrangement of the stream on the recording medium, the data amount of the data managed by the first or second unit can be known from the relationship between one start address and the next.

According to the twenty-fourth aspect of the present invention, since upon data reproduction it is possible to grasp whether post recording audio data should be read out in advance, this makes the process more efficient.

According to the twenty-fifth aspect of the present invention, since upon data reproduction it is possible to grasp whether post recording audio data should be read out in advance for every first unit, this makes the process more efficient.

According to the twenty-sixth aspect of the present invention, since upon data reproduction it is possible to grasp whether post recording audio data should be read out in advance for every second unit, this makes the process more efficient.

According to the twenty-seventh aspect of the present invention, since it is possible to grasp whether the observed first unit is arranged logically and contiguously to the previous first unit, on the recording medium, without referring to the logical filesystem information, this makes the process more efficient.

According to the twenty-eighth aspect of the present invention, before reproduction of a second unit of data, it is possible to grasp whether it is necessary to access to the previous second unit in order to perform correct reproduction of the frames in the GOP within the second unit of data.

According to the twenty-ninth aspect of the present invention, each of the second units of data is allowed to manage not a fixed number of frames but an arbitrary number of frames.

According to the thirtieth aspect of the present invention, since the amount of data to be read from the start of the second unit of data to the target reference picture can be grasped in advance, this facilitates achievement of special playback.

According to the thirty-first aspect of the present invention, when a recording medium having a high enough access performance is used, the target reference pictures can be read selectively based on the positional information from which data should be read. This feature facilitates achievement of special playback.

According to the thirty-second aspect of the present invention, since the start addresses of all the frames are managed, it is possible to easily determine the amount of data of each frame from the difference from the start address to the next frame and to selectively read out the data of an arbitrary frame when a recording medium having a high enough access performance is used. Therefore, these features facilitate achievement of special playback.

According to the thirty-third aspect of the present invention, since upon data reproduction it is possible to grasp whether post recording audio data should be read in advance, this makes the process more efficient.

INDUSTRIAL APPLICABILITY

As has been described heretofore, the invention is suitable for an access position locating method and recording media managing device for locating access positions on a recording medium such as a disk or the like on which variable-length coded data such as MPEG data has been recorded.

The invention claimed is:

1. A data access position locating method for locating access positions in a data recording medium in which a data sequence of a continuous recording period in a first data stream having video data is managed as a base unit of data, comprising the steps of:

based on presentation time information as to a specified piece of video data and reference time information related to reference position information of a target base unit of data, determining a relative time from the reference time information to the presentation time information;

identifying a target subunit of data including the specified piece of video data by operation based on the relative time as to the specified piece of video data and playback time of a subunit of data; and identifying start position information of the target subunit of data from relative distance information stored beforehand in a management information area, wherein the base unit of data comprises a plurality of subunits of data, each having an identical playback time within a single base unit of data, and for each of the base units of data, reference position information that is start position information of the base unit of data and relative distance information from the reference position information to start position information of each of the subunits of data in the base unit of data are stored beforehand in the management information area of a recording medium.

2. The data access position locating method according to claim 1, wherein the subunit of data is a first unit of data that is an independently editable minimum unit of data.

3. The data access position locating method according to claim 2, wherein the data recording medium has in association with the first units of data, audio data recording units for post recording for storing post recording audio data, which differs from the original audio data associated with video data and is recordable and reproducible in synchronization with the video data and the management information area has stored beforehand third relative distance information as the start position information of the audio data recording unit for post recording for each base unit of data, the method further comprising the step of identifying the start position information of the target audio data recording unit for post recording corresponding to the target first unit of data, based on the third relative distance information stored in the management information area.

4. The data access position locating method according to claim 3, wherein the third relative distance information is relative distance information from the reference position information to the start position information of the audio data unit for post recording.

5. The data access position locating method according to claim 3, wherein the third relative distance information is relative distance information from the start position information of the first unit of data to the start position information of the audio data unit for post recording.

6. The data access position locating method according to claim 3, wherein the audio data unit for post recording is provided inside each first unit of data.

7. The data access position locating method according to claim 3, wherein the audio data unit for post recording is provided outside the base units of data.

8. The data access position locating method according to claim 1, wherein the subunit of data is a second unit of data that is an independently reproducible minimum unit of data, and a plurality of the second units of data each having an identical playback time constitute one first unit of data that is an independently editable minimum unit of data, and a plurality of the first units of data each having an identical playback time within a single base unit of data.

9. The data access position locating method according to claim 8, further comprising the step of identifying start position information of the first unit of data, using start position information of the second units of data.

10. The data access position locating method according to claim 1, wherein the management information area is provided inside the data recording medium.

11. The data access position locating method according to claim 1, wherein the management information area is provided in a recording medium outside the data recording medium.

12. The data recording media managing device according to claim 11, wherein the controller manages data contiguousness information that indicates whether the data corresponding to the first unit of data and the data corresponding to the subsequent first unit of data, which are continuous temporally, are arranged logically and contiguously on the recording medium, in a manner that allows it to be written in or read out from the management information area.

13. A data access position locating method for locating access position in a data recording medium in which a data sequence of a continuous recording period in a first data stream having video data is managed as a base unit of data, comprising the steps of:

based on presentation time information as to a specified piece of video data and reference time information related to reference position information of a target base unit of data, determining a relative time from the reference time information to the presentation time information;

identifying a target first unit of data including the specified piece of video data, by operation based on the relative time as to the specified piece of video data and a playback time of a first unit of data; and identifying start position information of a target audio data unit for post recording, corresponding to the target first unit of data, from third relative distance information stored beforehand in a management information area, wherein the base unit of data comprises a plurality of first units of data, each having an identical playback time within a single base unit of data and being an independently editable minimum unit of data, the data recording medium has in association with the first units of data, audio data units for post recording for storing post recording audio data, which differs from original audio data associated with the video data and is recordable and reproducible in synchronization with the video data, for each of the base units of data, the third relative distance information that is start position information of each of the audio data units for post recording is stored beforehand in the management information area of a recording medium.

14. The data access position locating method according to claim 13, wherein the third relative distance information is relative distance information from reference position information representing the start position information as to the base unit of data to the start position information of the audio data unit for post recording.

15. The data access position locating method according to claim 13, wherein the third relative distance information is relative distance information from start position information of the first unit of data to the start position information of the audio data unit for post recording.

16. A data recording media managing device for managing a data sequence of a continuous recording period in a first data stream having video data as a base unit of data, comprising a controller which manages the data by the steps of:

constructing the base unit of data with a plurality of first units of data, each being an independently editable minimum unit of data;

constructing the first unit of data with a plurality of second units of data each being an independently reproducible minimum unit of data;

making the first playback time for reproducing each of the first units of data identical within a single base unit of data and controlling the second playback time for reproducing each of the second units of data to be identical within a single first unit of data; and managing for each base unit of data, reference position information as the start position information of the base unit of data and first relative distance information from the reference position information to start position information of a first unit of data in the base unit of data, in a manner that allows them to be written in, or read out from, the data recording medium or the management information area arranged somewhere with respect to a holder of the data recording medium.

17. The data recording media managing device according to claim 16, wherein the controller constructs in the data recording medium an audio data unit for post recording for storing post recording audio data, which differs from the original audio data associated with the video data and is recordable and reproducible in synchronization with the video data, and manages third relative distance information from the reference position information to the start position information of the audio data unit for post recording, in association with each of the first units of data, in a manner that allows it to be written in or read out from the management information area.

18. The data recording media managing device according to claim 17, wherein the audio data unit for post recording is provided inside the first unit of data.

19. The data recording media managing device according to claim 17, wherein the audio data unit for post recording is created outside the base units of data.

20. The data recording media managing device according to claim 17, wherein the controller manages post recording presence/absence information that indicates whether the post recording audio data to be reproduced in synchronization has been stored in the audio data unit for post recording in a manner that allows it to be written in or read out from the management information area.

21. The data recording media managing device according to claim 17, wherein the controller manages post recording presence/absence information that indicates whether the post recording audio data to be reproduced in synchronization with the first unit of data has been stored the an audio data unit for post recording in a manner that allows it to be written in or read out from the management information area.

22. The data recording media managing device according to claim 17, wherein the controller manages post recording presence/absence information that indicates whether the post recording audio data to be reproduced in synchronization with the second unit of data has been stored in the audio data unit for post recording in a manner that allows it to be written in or read out from the management information area.

23. The data recording media managing device according to claim 16, wherein the controller manages offset information that gives an offset value for positional information in a manner that allows it to be written in, or read out from the management information area.

24. The data recording media managing device according to claim 16, wherein the controller is able to compute a data playback rate of the first unit of data, based on the first relative distance information and the first playback time.

25. The data recording media managing device according to claim 16, wherein the positional information is given in a relative address representation which disregard any divided arrangement on the recording medium.

26. The data recording media managing device according to claim 16, wherein the controller manages information that indicates whether or not a GOP at the front of the second unit of data is a closed GOP, in a manner that allows it to be written in or read out from the management information area.

27. The data recording media managing device according to claim 16, wherein the controller manages video frame information that indicates the number of video frames of MPEG data to be managed in the second unit of data, in a manner that allows it to be written in or read out from the management information area.

28. The data recording media managing device according to claim 16, wherein the controller manages a video frame of MPEG data to be managed in a second unit of data by allowing end position information that represents an end address of a reference picture on the recording medium to be written in or read out from the management information area.

29. The data recording media managing device according to claim 16, wherein the controller manages reference picture start position information that represents a start address on the disk of a reference picture for the video frame of MPEG data to be managed in a second unit of data and reference picture end position information that represents an end address thereof, in a manner that allows them to be written in or read out from the management information area.

30. The data recording media managing device according to claim 16, wherein the controller manages a video frame of MPEG data to be managed in the second unit of data by allowing start position information that represents a start address of a reference picture on the recording medium to be written in or read out from the management information area.

31. A data recording media managing device for managing a data sequence of a continuous recording period in a first data stream having video data as a base unit of data, comprising a controller which manages the data by the steps of:
  constructing the base unit of data with a plurality of first units of data, each being an independently editable minimum unit of data;
  constructing the first unit of data with a plurality of second units of data each being an independently reproducible minimum unit of data;
  making the first playback time for reproducing each of the first units of data identical within a single base unit of data and controlling the second playback time for reproducing each of the second units of data to be identical within a single first unit of data; and
  managing for each base unit of data, the reference position information as the start position information of the base unit of data and second relative distance information from the reference position information to the start position information of a predetermined second unit of data in the base unit of data, in a manner that allows them to be written in, or readout from, the data recording medium or the management information area arranged somewhere with respect to a holder of the data recording medium.

32. The data recording media managing device according to claim 31, wherein the controller is able to compute a data playback rate of the second unit of data, based on the second relative distance information and the second playback time.

33. A data recording media managing device for managing a data sequence of a continuous recording period in a first data stream having video data as a base of data, wherein the base unit of data comprises a plurality of subunits of data, the device comprising a controller which manages each base unit of data in a manner that reference position information as start position information of the base unit of data, relative distance information of each of individual subunits of data in the base unit of data from the base position information to the start position information of the individual subunit of data and post recording presence/absence information that indicates whether post recording audio data to be reproduced in synchronization has been stored in a post recording audio data unit, are allowed to be written in or read out from, the data recording medium, or the management information area arranged somewhere with respect to a holder of the data recording medium.

* * * * *